United States Patent
Mundra et al.

(10) Patent No.: US 10,999,263 B2
(45) Date of Patent: May 4, 2021

(54) CRYPTOGRAPHIC ENGINE, SCHEDULER, PACKET HEADER PROCESSOR, INGRESS INTERFACES, AND BUFFERS

(71) Applicant: TEXAS INSTRUMENTS INCORPORATED, Dallas, TX (US)

(72) Inventors: Amritpal Singh Mundra, Allen, TX (US); Denis Roland Beaudoin, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/721,005

(22) Filed: Dec. 19, 2019

(65) Prior Publication Data
US 2020/0127984 A1  Apr. 23, 2020

Related U.S. Application Data

(62) Division of application No. 16/112,277, filed on Aug. 24, 2018, now Pat. No. 10,567,358, which is a
(Continued)

(51) Int. Cl.
*H04L 29/06* (2006.01)
*H04L 9/06* (2006.01)
(Continued)

(52) U.S. Cl.
CPC .......... *H04L 63/0485* (2013.01); *G06F 7/588* (2013.01); *G06F 21/72* (2013.01);
(Continued)

(58) Field of Classification Search
CPC . H04L 63/0485; H04L 9/0625; H04L 9/0631; H04L 9/0637; H04L 9/0643;
(Continued)

(56) References Cited

U.S. PATENT DOCUMENTS

| 5,613,146 A | 3/1997 | Gove |
| 6,047,375 A | 4/2000 | Easter |

(Continued)

OTHER PUBLICATIONS

Traboulsi et al., "An Efficient Hardware Architecture for Packet Re-sequencing in Network Processors MPSoCs", Aug. 2009, 12th Euromicro Conference on Digital System Design, Architectures, Methods and Tools, pp. 11-18 (Year: 2009).*

(Continued)

*Primary Examiner* — Kenneth W Chang
(74) *Attorney, Agent, or Firm* — Lawrence J. Bassuk; Charles A. Brill; Frank D. Cimino

(57) ABSTRACT

An electronic circuit (200) includes one or more programmable control-plane engines (410, 460) operable to process packet header information and form at least one command, one or more programmable data-plane engines (310, 320, 370) selectively operable for at least one of a plurality of cryptographic processes selectable in response to the at least one command, and a programmable host processor (100) coupled to such a data-plane engine (310) and such a control-plane engine (410). Other processors, circuits, devices and systems and processes for their operation and manufacture are disclosed.

15 Claims, 16 Drawing Sheets

Related U.S. Application Data division of application No. 15/728,035, filed on Oct. 9, 2017, now Pat. No. 10,110,573, which is a division of application No. 15/387,030, filed on Dec. 21, 2016, now abandoned, which is a division of application No. 15/205,487, filed on Jul. 8, 2016, now abandoned, which is a division of application No. 15/045,948, filed on Feb. 17, 2016, now Pat. No. 9,503,265, which is a division of application No. 14/712,396, filed on May 14, 2015, now Pat. No. 9,305,184, which is a division of application No. 13/165,190, filed on Jun. 21, 2011, now Pat. No. 9,141,831.

(60) Provisional application No. 61/362,393, filed on Jul. 8, 2010, provisional application No. 61/362,395, filed on Jul. 8, 2010.

(51) Int. Cl.
```
H04L 9/32      (2006.01)
H04W 12/06     (2021.01)
G06F 21/72     (2013.01)
H04L 12/851    (2013.01)
G06F 7/58      (2006.01)
H04L 9/08      (2006.01)
H04L 9/30      (2006.01)
```

(52) U.S. Cl.
CPC .......... *H04L 9/065* (2013.01); *H04L 9/0625* (2013.01); *H04L 9/0631* (2013.01); *H04L 9/0637* (2013.01); *H04L 9/0643* (2013.01); *H04L 9/0869* (2013.01); *H04L 9/3013* (2013.01); *H04L 9/32* (2013.01); *H04L 9/3236* (2013.01); *H04L 9/3239* (2013.01); *H04L 9/3242* (2013.01); *H04L 47/2441* (2013.01); *H04L 63/0428* (2013.01); *H04L 63/08* (2013.01); *H04W 12/0609* (2019.01); *G06F 2221/2107* (2013.01); *H04L 2209/125* (2013.01); *H04L 2209/38* (2013.01)

(58) Field of Classification Search
CPC ......... H04L 9/065; H04L 9/0869; H04L 9/32; H04L 63/08; H04W 12/0609; G06F 7/588; G06F 21/72
See application file for complete search history.

(56) References Cited

U.S. PATENT DOCUMENTS

| | | | |
|---|---|---|---|
| 6,101,255 A | 8/2000 | Harrison | |
| 6,218,969 B1 | 4/2001 | Watson | |
| 6,965,615 B1* | 11/2005 | Kerr | H04L 49/3072 370/474 |
| 7,003,118 B1 | 2/2006 | Yang | |
| 7,191,341 B2 | 3/2007 | Paaske | |
| 7,369,657 B2 | 5/2008 | Eldeeb | |
| 7,512,780 B1 | 3/2009 | Milliken | |
| 7,685,436 B2 | 3/2010 | Davis | |
| 8,244,790 B2 | 8/2012 | Satoh | |
| 8,321,659 B2 | 11/2012 | Haneda | |
| 2001/0025036 A1 | 9/2001 | DeLuca et al. | |
| 2001/0037443 A1 | 11/2001 | Liu | |
| 2002/0057712 A1* | 5/2002 | Moriwaki | H04L 49/101 370/463 |
| 2002/0080871 A1 | 6/2002 | Fallon | |
| 2002/0108048 A1 | 8/2002 | Qi | |
| 2002/0138747 A1 | 9/2002 | Clarke | |
| 2002/0164019 A1 | 11/2002 | Fairclough | |
| 2002/0191790 A1 | 12/2002 | Anand | |
| 2002/0199101 A1 | 12/2002 | Krishna | |
| 2003/0023846 A1 | 1/2003 | Krishna | |
| 2003/0026260 A1* | 2/2003 | Ogasawara | H04L 29/06 370/392 |
| 2003/0039354 A1 | 2/2003 | Kimble | |
| 2003/0046532 A1 | 3/2003 | Gast | |
| 2003/0091185 A1 | 5/2003 | Swindlehurst | |
| 2003/0149883 A1 | 8/2003 | Hopkins | |
| 2003/0179755 A1 | 9/2003 | Fraser | |
| 2003/0196081 A1 | 10/2003 | Savarda | |
| 2004/0005061 A1 | 1/2004 | Buer | |
| 2004/0010612 A1 | 1/2004 | Pandya | |
| 2004/0123120 A1 | 6/2004 | Buer | |
| 2004/0250059 A1 | 12/2004 | Ramelson | |
| 2004/0268148 A1 | 12/2004 | Karjala | |
| 2005/0069130 A1 | 3/2005 | Kobayashi | |
| 2005/0180568 A1 | 8/2005 | Krause | |
| 2005/0213756 A1 | 9/2005 | Hubert | |
| 2006/0014522 A1 | 1/2006 | Krischer | |
| 2006/0056406 A1 | 3/2006 | Bouchard | |
| 2006/0140201 A1* | 6/2006 | Kumar | H04L 47/564 370/412 |
| 2006/0274789 A1 | 12/2006 | Pong | |
| 2007/0071007 A1* | 3/2007 | Ross | H04L 63/164 370/392 |
| 2007/0110053 A1 | 5/2007 | Soni | |
| 2007/0226795 A1 | 9/2007 | Conti | |
| 2007/0288615 A1 | 12/2007 | Keohane | |
| 2007/0294496 A1 | 12/2007 | Goss | |
| 2008/0044012 A1 | 2/2008 | Ekberg | |
| 2008/0101374 A1 | 5/2008 | West | |
| 2008/0112416 A1 | 5/2008 | Hsieh | |
| 2008/0114993 A1 | 5/2008 | Shankar | |
| 2008/0123660 A1 | 5/2008 | Sammour | |
| 2008/0159528 A1 | 7/2008 | Feghali | |
| 2008/0212769 A1 | 9/2008 | Patel | |
| 2008/0279185 A1 | 11/2008 | Zhang | |
| 2009/0028327 A1 | 1/2009 | Pinder | |
| 2009/0060197 A1 | 3/2009 | Taylor | |
| 2009/0079597 A1 | 3/2009 | McCanne | |
| 2009/0285096 A1 | 11/2009 | Yousef | |
| 2009/0300350 A1 | 12/2009 | Gai | |
| 2010/0043061 A1 | 2/2010 | Martin | |
| 2010/0138857 A1 | 6/2010 | Gondkar | |
| 2010/0158044 A1 | 6/2010 | Ray | |
| 2010/0161959 A1 | 6/2010 | Sood | |
| 2010/0265950 A1 | 10/2010 | Foxworthy | |
| 2010/0322415 A1 | 12/2010 | Gondkar | |
| 2011/0078386 A1 | 3/2011 | Tiedens | |
| 2011/0280314 A1 | 11/2011 | Sankaran | |

OTHER PUBLICATIONS

Papaefstatiou, et al., Packet Processing Acceleration With a 3-Stage Programmable Pipeline Engine, Mar. 2004,IEEE Communications Letters, vol. 8, No. 3, pp. 183-185.

Junaid et al., Per Packet Authentication for IEEE 802.11 wireless LAN, Dec. 2008, IEEE International Multitopic Conference, INMIC 2008, pp. 207-212.

Cisco. Connection Handling with the Cisco Application Control Engine Module Hardware, Undated. Downloaded Jul. 2, 2010, 12pp. Figs. 1-11.

Kunze et al., Symerton—Using Virtualization to Accelerate Packet Processing, Dec. 2006, ACM/IEEE Symposium on Architecture for Networking and Communications Systems, pp. 133-142.

Spracklen, L., Sun's 3rd generation on-chip UltraSPARC security accelerator, Aug. 2009, IEEE Hot Chips 21Symposium, pp. 1-25.

Thomas et al., "Adaptive DMA-based 1/0 Interfaces for Data Stream Handling in Mult-grained Reconfigurable Hardware Architectures", Sep. 2004, 17th Symposium on Integrated Circuits and Systems Design, pp. 141-146 (Year: 2004).

Goh et al., "A multi-protocol cryptographic framework for the authentication of digital streams", Sep. 2000, TEN CON Proceedings Intelligent Systems and Technologies for the New Millennium, vol. 3, pp. 130-135 (Year: 2000).

\* cited by examiner

CRYPTOGRAPHIC ENGINE, SCHEDULER, PACKET HEADER PROCESSOR, INGRESS INTERFACES, AND BUFFERS

CROSS-REFERENCES TO RELATED APPLICATIONS

This application is a divisional of application Ser. No. 16/112,277, filed Aug. 24, 2018, now U.S. Pat. No. 10,567,358, issued Feb. 18, 2020;

Which was a divisional of application Ser. No. 15/728,035, filed Oct. 9, 2017, now U.S. Pat. No. 10,110,573, issued Oct. 23, 2018;

Which was a divisional of prior application Ser. No. 15/387,030, filed Dec. 21, 2016, now abandoned;

Which was a divisional of prior application Ser. No. 15/205,487, filed Jul. 8, 2016, now abandoned;

Which was a divisional of prior application Ser. No. 15/045,948, filed Feb. 17, 2016, now U.S. Pat. No. 9,503,265, issued Nov. 22, 2016;

Which was a divisional of prior application Ser. No. 14/712,396, filed May 14, 2015, now U.S. Pat. No. 9,305,184, issued Apr. 5, 2016;

Which was a divisional of prior application Ser. No. 13/165,190, filed Jun. 21, 2011, now U.S. Pat. No. 9,141,831, issued Sep. 22, 2015;

Which is related to provisional U.S. patent application "Security Processing Engines, Circuits and Systems and Adaptive Processes and Other Processes" Ser. No. 61/362,393, filed Jul. 8, 2010, for which priority is claimed under 35 U.S.C. 119(e) and all other applicable law, and which is incorporated herein by reference in its entirety.

And is also related to provisional U.S. patent application "Mode Control Engine (MCE) For Confidentiality and Other Modes, Circuits and Processes" Ser. No. 61/362,395, filed Jul. 8, 2010, for which priority is claimed under 35 U.S.C. 119(e) and all other applicable law, and which is incorporated herein by reference in its entirety.

This application is related to U.S. Patent Application Publication 2004/0025036, "Run-time firmware authentication" dated Feb. 5, 2004, which is incorporated herein by reference in its entirety.

This application is related to U.S. Patent Application Publication 2007/0294496, "Methods, Apparatus, and Systems for Secure Demand Paging and Other Paging Operations for Processor Devices" dated Dec. 20, 2007, which is incorporated herein by reference in its entirety.

This application is related to U.S. Patent Application Publication 2008/0114993, "Electronic Devices, Information Products, Processes of Manufacture And Apparatus For Enabling Code Decryption in a Secure Mode Using Decryption Wrappers and Key Programming Applications, and Other Structures" dated May 15, 2008, which is incorporated herein by reference in its entirety.

This application is related to U.S. Patent Application Publication 2007/0110053 "Packet Processors and Packet Filter Processes, Circuits, Devices, and Systems", dated May 17, 2007, which is incorporated herein by reference in its entirety.

This application is related to U.S. Patent Application Publication 2007/0226795, "Virtual Cores and Hardware-Supported Hypervisor Integrated Circuits, Systems, Methods and Processes of Manufacture" dated Sep. 27, 2007, which is incorporated herein by reference in its entirety.

This application is related to U.S. Patent Application Publication 2010/0138857, "Systems and Methods for Processing Data Packets" dated Jun. 3, 2010, which is incorporated herein by reference in its entirety.

This application is related to U.S. Patent Application Publication 2010/0322415, "Multilayer Encryption of a Transport Stream Data and Modification of a Transport Header" dated Dec. 23, 2010, which is incorporated herein by reference in its entirety.

This application is related to U.S. patent application Ser. No. 12/815,734 "Slice Encoding and Decoding Processors, Circuits, Devices, Systems and Processes", filed Jun. 15, 2010, which is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND

This invention is in the field of information and communications, and is more specifically directed to improved processes, circuits, devices, and systems for information and communication processing and/or protection against unauthorized interception of communications, and processes of operating, protecting and making them. Without limitation, the background is further described in connection with communications processing and wireless and wireline communications, and security processing.

Wireless communications, of many types, have gained increasing popularity in recent years. The mobile wireless (cellular) telephone has become ubiquitous around the world. Mobile telephony can communicate video and digital data, in addition to voice. Wireless devices, for communicating computer data over a wide area network, using mobile wireless telephone channels and techniques are also available. Ethernet and other wireline broadband technologies support many office systems and home systems.

Wireless data communications in wireless local area networks (WLAN), such as that operating according to the well-known IEEE 802.11 standard, has become especially popular in a wide range of installations, ranging from home networks to commercial establishments. Short-range wireless data communication according to the Bluetooth technology permits computer peripherals to communicate with a personal computer or workstation within the same room.

Security is essential to protect retail and other commercial transactions in electronic commerce. Security is vital to protect medical data, medical records, and other storage and transfer of personal data, or in any context in which personal privacy is desirable. Security is fundamental for both wireline and wireless communications and at multiple layers in communications, such as transport layer, network layer, and other layers. Added features and increasing numbers of security standards add further processing tasks to communications systems. These potentially involve additional software and hardware in systems that already face cost and power dissipation challenges. Even the ability of the system itself to keep up with the task load and rate of information flow may be jeopardized.

Each of the data communication security standards like IPSEC, SRTP, TLS, WiMax, Wireless 3G and Wireless 4G uses its own form of data cryptography and source authentication. (Refer to TABLE 1 Glossary of acronyms.) To make data communication more secure each security standard defines its own additional level of processing beyond standard cryptographic algorithmic processing (AES, 3DES, Kasumi etc). This additional processing called "mode operation" is different for each application and different within a given application depending upon current mode of operation and peer capabilities. This mode processing is sometimes very complex and calls for repeated cryptographic processing for a same data block. Some popular examples of the confidentiality modes that use AES or 3DES cores are CBC, OFB, CFB, CTR, GCM, and CCM which may be used in IPSEC applications. To secure wireless data traffic, transmitted via antenna, Kasumi-F8 and Snow3G-F8 are used in 3GPP technology, for a couple of examples.

This cryptographic "mode operation" processing presents a huge technological challenge, given that performance and chip area vitally matter, to support so many different types of processing in hardware even though the modes include the basic cryptography AES, 3DES, etc., in the process. Moreover, as security standards evolve, new modes are added continually to overcome or mitigate security issues as and when found in mode processing, thereby leading to a further problem of technologically keeping up with new modes of security processing in hardware.

If system hardware is to support multiple security standards at extremely high processing speeds and transfer rates (called bit-rates), more cryptography standards must be supported with high performance even though each standard defines its own data cryptography processes, authentication methods and operational encryption modes.

Hardware implementation of confidentiality modes like CBC, OFB, CFB, CTR, GCM, and CCM, conventionally calls for custom logic for each mode even when they may use the same cryptographic process (AES, 3DES etc). Performance and chip real estate area suffer. Competitive issues and market demands add yet further dimensions of performance, chip area, and QoS (Quality of service) to the challenge of implementing so many security standards. Moreover, as security standards evolve, new modes are invented continually in the industry to overcome or mitigate newly-detected types of attacks.

Departures for more efficient ways of handling and/or protecting packet and non-packet data, voice, video, and other content are needed for microprocessors, telecommunications apparatus and computer systems.

SUMMARY OF THE INVENTION

Generally, and in one form of the invention, an electronic circuit includes one or more programmable control-plane engines operable to process packet header information and form at least one command, one or more programmable data-plane engines selectively operable for at least one of a plurality of cryptographic processes selectable in response to the at least one command, and a programmable host processor coupled to such a data-plane engine and such a control-plane engine.

Generally, and in another form of the invention, a security context cache module is for use with a host processor and an external memory. The module includes a local cache memory, a local processor coupled with the local cache memory, an ingress circuit having an input for ingress of a packet stream including an ingress packet having a security context pointer, and an auto-fetch circuit responsive to such ingress packet and operable to automatically fetch a security context from the external memory to the local cache memory using the security context pointer, and to associate the security context in the local cache memory with the packet stream, the auto-fetch circuit operable for multiple such packet streams and ingress packets, whereby to allow simultaneous security connections.

Generally, and in a further form of the invention, a streaming interface for packet data includes a buffer circuit for a packet stream including a packet having an associated request field for thread identification, the buffer circuit operable to provide a ready signal indicating that the buffer circuit currently has at least a predetermined amount of space to accept data; and a data transfer circuit responsive to the request for thread identification to transfer data to a particular target thread, the data transfer circuit including a control circuit responsive to the ready signal, and responsive to a start-of-packet indicator and an end-of-packet indicator and a drop-packet indicator, and further responsive to a multi-bit thread identification of a thread that is currently occupying the buffer circuit.

Generally, yet another form of the invention involves a control method for packet processing. The control method includes host-loading a first storage area with a context including control data and processing instructions for processing at least part of a packet, supplying a stream of packets including a particular packet to a packet processing subsystem, the particular packet including a pointer to a context in the first storage area; operating the packet processing subsystem to access the context from the first storage area for use in the packet processing subsystem in accordance with the pointer, and processing the stream of packets in the packet processing subsystem in accordance with the control data and processing instructions in the context.

Generally, another further form of the invention involves an electronic method of processing packets. The method includes providing a set of accelerator engines and at least one separate control engine, receiving packets from a stream using an electronic interface, electronically chunking the packets into chunks in a memory, the chunks being generally shorter than their packets and at least one of the chunks having associated control information, operating the separate control engine in response to the control information to electronically generate and store a sequence of engine identifications representing a pipelined process by selected ones of the accelerator engines one after another according to the sequence; and coupling and operating the accelerator engines responsive to the stored sequence of engine identifications so that a first accelerator engine having the first engine identification in the sequence processes a series of the chunks to produce resulting chunks, and a second accelerator engine having the second engine identification in the sequence processes the resulting chunks from the first accelerator engine beginning substantially as soon as the first of the resulting chunks comes from the first accelerator engine, whereby the stream of packets is pipeline-processed.

Generally, and in still another form of the invention, a packet interface circuit includes a control circuit operable to receive packets each having a header and a payload, some of the packets representing a first stream, and some others of the packets representing a second stream, the control circuit operable to assign thread identifications identifying each such stream, a memory, and a chunking circuit operable, when a given such packet has a payload exceeding a predetermined length, to store chunks in the memory so that the chunks have the predetermined length or less, and the chunking circuit operable to load chunk control information into the memory, the control information indicating start of packet (SOP), middle of packet (MOP), and end of packet (EOP), depending on the position in the payload of data in a given stored chunk.

Generally, a further process form of the invention involves a communication method for control communication between processors. The communication method includes electronically breaking ingress packets into smaller chunks, one of the chunks for a packet being a start-of-packet chunk having associated control information, operating one or more programmable control-plane engines to process such a start of packet chunk and form at least one command to organize a set of data plane engines into a particular pipeline topology, and selectively operating the data-plane engines programmably to process the chunks in accordance with the command, whereby to effectuate at least one of a plurality of packet processing modes.

Generally, and in a yet further form of the invention, an electronic buffering circuit includes at least three processors each having inputs and outputs and identified by respective engine identifications, and at least one of the processors operable to generate particular engine identifications of at least two of the processors; a plurality of buffers at least equal in number to the plurality of processors; and a selection circuit responsive to controls based on the engine identifications of the processors for any-order interconnection of a selected processor-buffer-processor topology.

Generally, and in another additional form of the invention, a packet-processing electronic subsystem includes a first data interface for first streaming data, a second data interface for second streaming data, a scheduler circuit coupled to the first and second data interfaces and including a packet memory, a security context cache module coupled for input from, and output to, the scheduler circuit, the security context cache module including a cache controller and a cache storage for at least one security context, a packet header processing module coupled for input from, and output to, the scheduler circuit, an authentication module coupled for input from, and output to, the scheduler circuit; and an encryption module coupled for input from, and output to, the scheduler circuit and the encryption module including control circuitry and encryption accelerators responsive to a security context in the security context cache module to operate the encryption module and the authentication module as specified by the security context and the packet header processing module.

Other processors, circuits, devices and systems and processes for their operation and manufacture are disclosed and claimed.

Corresponding numerals in different Figures indicate corresponding parts except where the context indicates otherwise. A minor variation in capitalization or punctuation or spacing, or lack thereof, for the same thing does not necessarily indicate a different thing. A suffix .i or .j refers to any of several numerically suffixed elements having the same prefix.

DETAILED DESCRIPTION OF EMBODIMENTS

Figure 1:
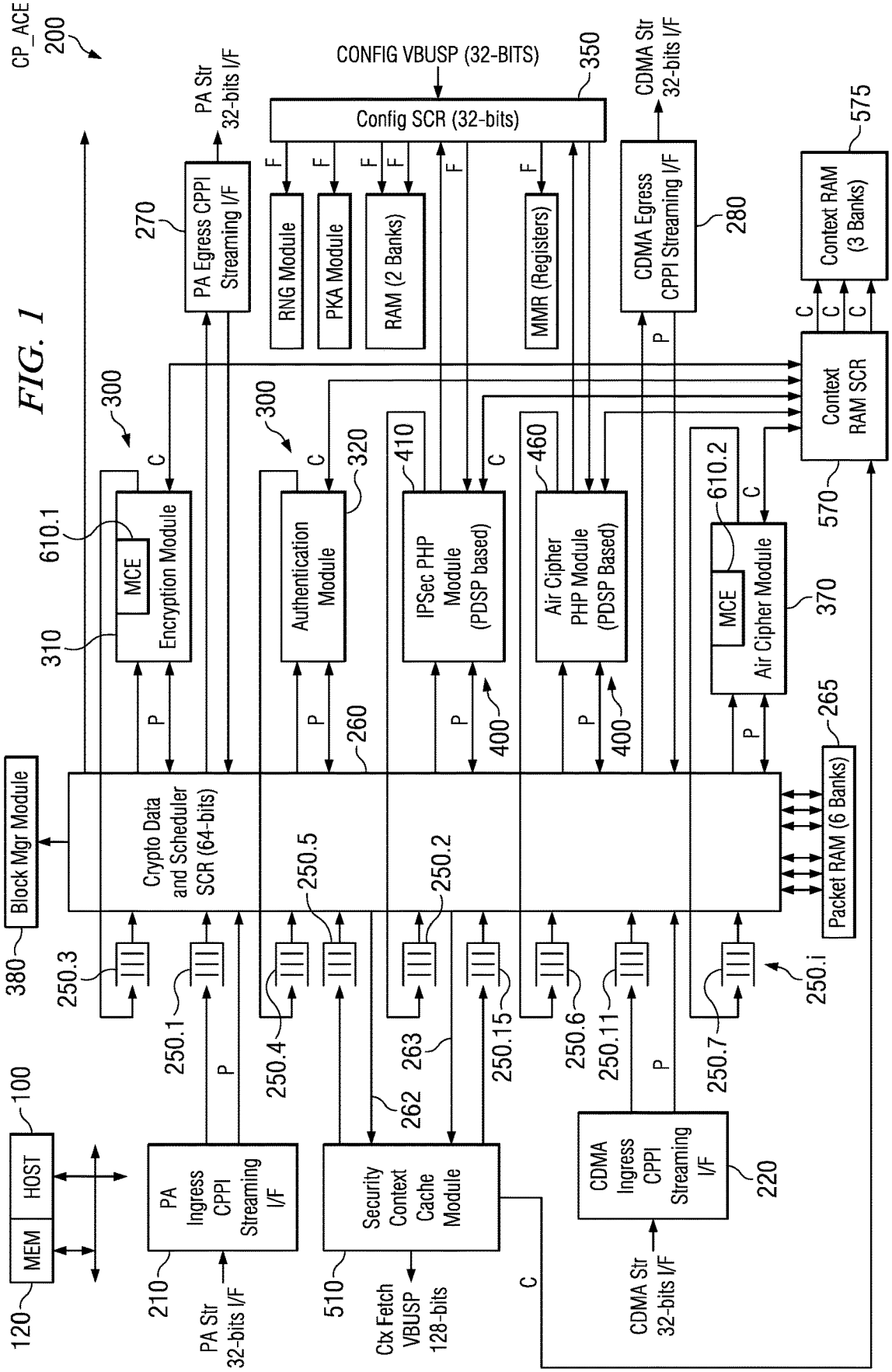
FIG. 1 is a block diagram of an inventive subsystem for efficient cryptographic acceleration.

To solve the above noted problems and other problems, smart, scalable high performance, configurable cryptographic engines (occasionally referred to as CP_ACE herein) provide an example of a remarkable, adaptive subsystem category of embodiments, allowing multiple security standards like IPSEC, SRTP, TLS, WiMax, wireless 3G and wireless 4G to be processed concurrently and efficiently using the same processing engines. The subsystem embodiment of FIG. 1 is adaptive, adapted, or adaptable by allowing firmware-controlled security header processing and hardware-driven, any-order data staging, cipher block formatting and cryptographic processing.

Such subsystem embodiments can satisfy extremely high bit-rate demands and provide a rich feature set to accommodate industry cryptography standards to carry out content encryption and authenticity validation for wire-side and wireless-side traffic. Moreover, these embodiments can provide anti-replay protection and resist other types of security attacks.

A form of the subsystem employs multiple engines that primarily process streams of data and controllably separates or segregates them from one or more additional engines that primarily perform control functions and responses to conditions—thereby establishing a data plane and a control plane herein. The separation desirably avoids or obviates blocking effects that might otherwise arise between control plane processing and data plane processing, while the control plane schedules and otherwise controls the data plane. The separable data planes and their independent control avoid stalling of either plane by the other plane. A host processor is also provided that can call the subsystem and further is free to itself selectively use the data plane and bypass the control plane, e.g. without engaging control plane components. Two-way register access between control plane and data plane promotes monitoring, control of blocks and their topology, and controllable separation. The cut-through structure separates the data plane from the control plane, or generally provides a parallel control information transfer path in one circuit half or control plane as compared with a data transfer path in another circuit half or data plane for true pipelined processing. That way, no stall arises even if delays occur in either the control plane or data plane.

The subsystem preserves and enhances Quality of Service (QoS) by automatically breaking a data packet into small chunks and scheduling these data chunks based on configured or requested QoS level. Such QoS level indicates or represents packet stream priority and is used by the subsystem to control and/or establish subsystem latency (packet throughput delay) and data rate, for instance. This important ability to switch within-a-packet allows QoS preference, such as to give higher priority to packets of another type or QoS level, to be effective immediately. Some modes or packet types may automatically have a particular QoS level associated with them in the configuration.

The high performance, adaptive, and configurable cut-through embodiments with internal data chunking allow multiple security standards to be processed concurrently at high bit rate and low latency. Mere updates to firmware for the subsystem confer the ability to support new standards in the field. Such subsystem processes packets in data chunks thereby giving ability to switch within-a-packet to a new higher priority packet, thereby preserving and enhancing Quality of Service.

Figure 8:
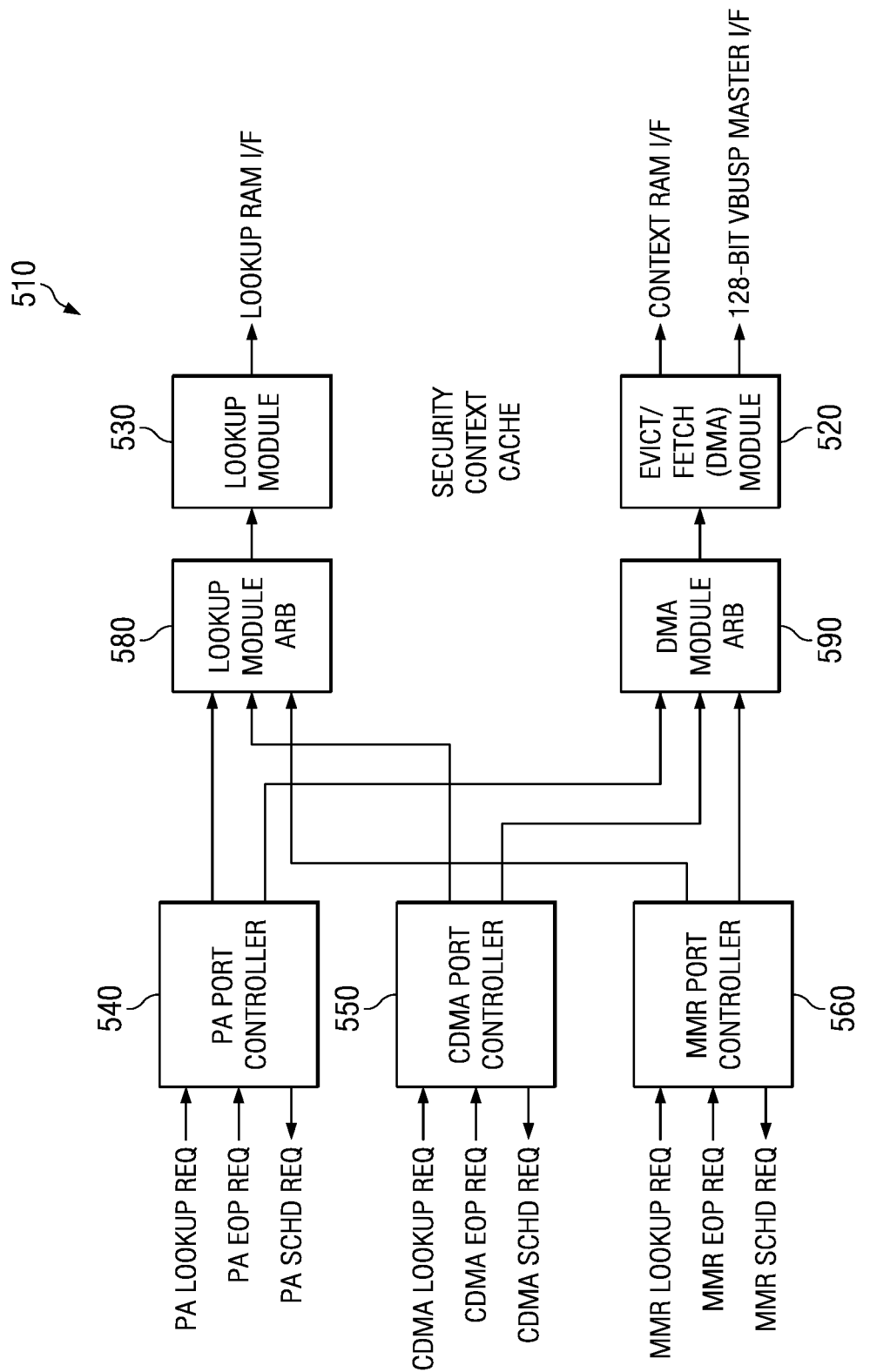
FIG. 8 is a block diagram of an inventive security context cache for the security context data structures such as those of FIGS. 6 and 7.

The subsystem of FIG. 1 hosts a security context cache module of FIG. 8 that fetches and evicts a respective control data structure for each security context that holds information like cryptographic keys and modes from external memory 120 on demand basis. This information is fanned out to the data processing engine(s) automatically by hardware before data is processed. Optionally the control structure itself can be encrypted to safeguard access to keys in external memory 120. Arbitrated port controllers are coupled to a data lookup cache portion and to a security context cache portion, further effectuating the parallelism of control plane and data plane in the cache structure of such subsystem embodiments.

The subsystem circuitry partially constructs a security context as a control plane operation in the local context cache store by an access to host memory. The circuitry also acts to process an incoming packet into packet chunks each including a portion of data from an incoming packet and to affix control information into at least one such chunk. The subsystem provides a further contribution to the construction of the security context in the local context store from the control information in the packet chunk in the data plane. Interlocked security is thus flexibly provided by operations in both the control plane and the data plane.

Figure 1A:
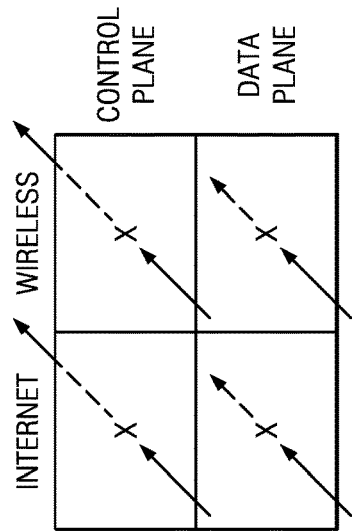
FIG. 1A is a four-quadrant diagram of processing parallelism of the inventive subsystem of FIG. 1, e.g., in Internet and wireless, and in a control plane and a data plane.

Moreover, the subsystem introduces both control plane/data plane parallelism and cryptographic parallelism such as for Internet and wireless concurrently. This constitutes a two-dimensional streaming parallelism in four quadrants (see FIG. 1A) for control/data and Internet/wireless cryptographic and other processing that can with dramatic efficiency securely handle the real-life applications that users care about now and in the future.

Cryptography processing is conventionally very expensive and burdensome on a main CPU (or array of CPU's) at least because new security standards require more data and instruction bandwidth and processing in conjunction with the high incoming packet rate. The subsystem embodiments described herein offer tremendous advantage since the process of operation offloads data security related processing from the main CPU (host processor or array, see FIG. 20) and at the same time supports multiple security standards at high performance. The subsystem also provides a direct mode in which one or more such CPUs can directly engage hardware cryptographic cores to process non-packet (non-standard) data.

The field of Cryptography processing has numerous acronyms, and TABLE 1A provides a Glossary for some of them. TABLE 1A also illustrates the diversely extensive numerousness of these processing operations demanded for execution at high rates.

TABLE 1

GLOSSARY OF CRYPTOGRAPHY AND COMMUNICATIONS

| Acronym | Description |
| --- | --- |
| AAD | Additional authenticated data (for Galois) |
| AES | Advanced Encryption Standard |
| AES-CMAC | Advanced Encryption Standard Cipher-based Message Authentic'n Code |
| Air Cipher | Cipher to protect wireless over-the-air communications |
| AH | Authentication Header, part of IPSEC |
| CBC* | Cipher Block Chaining |
| CBC-MAC | Cipher Block Chaining - Message Authentication Code |

TABLE 1-continued

GLOSSARY OF CRYPTOGRAPHY AND COMMUNICATIONS

| Acronym | Description |
|---|---|
| CCM* | Counter with CBC-MAC |
| CFB* | Cipher Feedback |
| Cipher | Procedure for performing encryption or decryption |
| CTR* | Counter. An encryption mode. |
| DES | Data Encryption Standard |
| DFC | Decorrelated Fast Cipher |
| DSL | Digital Subscriber Line, type of wired network over telephone line |
| ECB | Electronic Code Book |
| Ethernet | Type of wired network using cabling on premises between computers |
| ESP | Encapsulating Security Payload, part of IPSEC packet protection |
| A5/3 | GSM key stream generator |
| F8# | A confidentiality process in UMTS, uses Kasumi |
| F9# | An integrity process in UMTS, uses Kasumi |
| ECB | Electronic Code Book |
| FIPS | Federal Information Processing System |
| GCM* | Galois Counter Mode |
| GMAC | Galois Message Authentication Code |
| GPRS | General packet radio service. A wireless standard. |
| HMAC | Hashed Message Authentication Code |
| IETF | Internet Engineering Task Force |
| IKE | Internet Key Exchange |
| IPSEC | Internet Protocol Security |
| Kasumi | Block cipher in UMTS, GSM, GPRS. An Air Cipher. |
| LAN | Local Area Network |
| MACSEC | Media Access Control Security, IEEE 802.1AE, e.g., for Ethernet |
| MD5 | Message Digest 5 |
| NIST | National Institute of Standards and Technology |
| OFB* | Output Feedback. An encryption mode. |
| RFC | Request for Comment |
| SHA | Secure Hash Algorithm |
| Snow3G | Word-oriented stream cipher, an Air Cipher |
| SRTP | Secure Real-time Transport protocol |
| SS | Subscriber Station |
| SSL | Secure Socket Layer |
| TLS | Transport Layer Security |
| UMTS | Universal Mobile Telecommunications System. A wireless standard. |
| WLAN | Wireless Local Area Network |
| 3DES | Triple DES |
| 3GPP | 3rd Generation Partnership Project |

*Examples of confidentiality modes that use AES or 3DES cores are CBC, OFB, CFB, CTR, GCM, and CCM, which are used in IPSEC applications.
Kasumi-F8 and Snow3G-F8 are used in 3GPP technology to secure data traffic transmitted via antenna, hence the phrase Air Cipher herein.

TABLE 1B provides another Glossary for acronyms used to describe the embodiments.

TABLE 1B

GLOSSARY OF BLOCKS AND DATA STRUCTURES

| Acronym | Description |
|---|---|
| CDMA | CPPI DMA controller (distinct from wireless CDMA next) |
| CDMA | Wireless code division multiplex for telecom |
| CMD | Command |
| CPPI | Communication Processor Peripheral Interface |
| CP_ACE | Accelerated Cryptographic Engine. Subsystem example of embodiment. |
| CTR | Counter |
| CTX | Context |
| ctxcach | Context Cache |
| DDR | Double Date Rate, type of RAM |
| DMA | Direct Memory Access, peripheral circuit |
| EMIF | External Memory Interface |
| EOP | End of Packet |
| FW | Firmware, e.g. software stored in flash non-volatile memory. |
| HFN | Hyperframe Number |
| HW | Hardware |
| IV | Initialization Vector, for key derivation |
| LSB | Least Significant Bit |
| MCE | Mode control engine, another type of embodiment |
| MMR | Memory Mapped Register |
| MOP | Middle of Packet |
| MSB | Most Significant Bit |
| PA | Packet accelerator |
| PHP | Packet header processor |
| PDSP | Packed Data Structure Processor, another type of embodiment: programmable engine for parsing a packet header, trailer, and payload |
| PKA | Public Key Accelerator |
| RAM | Random Access Memory |
| RISC | Reduced Instruction Set Computing or Computer |
| RNG | Random Number Generator |
| ROC | Rollover Counter |
| SC | Pointer Security context pointer holding data structure in host memory |
| SCCTL | Security context control word, TABLES 19, 10. |
| SCID | Security context ID |
| SCIDX | Security index |
| SCPTR | Security context pointer |
| SOP | Start Of Packet |
| sw | Software or firmware |
| SW | Software Word |
| VBUSP | VBUS Protocol bus signaling protocol |

Embodiments exemplified by the subsystems described at length herein are flexible and adaptive thereby allowing new security standards and application-specific encryption operational modes to be updated in the field. Various embodiments provide a high performance, loosely coupled packet engine to encrypt, decrypt and authenticate data on-the-fly thereby maintaining a suitably-specified wire-rate or wireless rate, and to perform a threshold level of security monitoring on inbound traffic to provide sanity and integrity checks to protect host processor 100 from unwanted traffic. Minimal intervention from host 100 is involved to process data, but at same time the host 100 is fully in control of such processing. The subsystem can cache high-speed connections keys and control, thereby promoting efficient high speed execution. Auto-fetch keys and control structures from host memory are provided in secure fashion as and when appropriate, so that the system is secure when caching high-speed connections keys and control. Some embodiments provide direct cryptographic processing acceleration to host 100 to encrypt/authenticate raw data (non-packet), especially for multi-media applications.

A public key accelerator (PKA) aids host 100 for key generation/derivation mainly for IKE and other similar processes. A non-deterministic true random number generator (TRNG) is provided and is host-accessible. A high performance, link-list based, descriptor-driven scatter-gather CPPI DMA (direct memory access) can queue packets. Firmware is updatable in the field to enhance/support new processing features such as new header processing features and other features.

The system has a remarkable structure and process to update micro-instructions in the field to support new encryption operation modes like CCM etc.

High Level protocols supported include 1) transport mode for both AH and ESP processing for IPSEC protocol stack, 2) tunnel mode for both AH and ESP processing, 3) full header parsing and padding checks, 4) Construct initialization vector IV from header, 5) anti-replay attack resistance, 6) SRTP protocol stack to support F8 mode of processing and replay protection, 7) WiMax encryption, 8) 3GPP protocol stack, 9) Wireless Air cipher standard, 10) A5/3 mode, 11) firmware enhancements for SSL and MACSEC.

TABLE 2

PERFORMANCE EXAMPLE

| Protocol | Mbits/sec |
|---|---|
| IPSEC – ESP | 1400 |
| IPSEC – AH | 1400 |
| 3GPP | 400 |
| SRTP | 400 |
| Legal co-existence | |
| IPSec + SRTP | 1800 (Total) |
| IPSec + 3GPP | 1800 (Total) |

In the keys and control structure, host 100 forms a security context under which the hardware encrypts and decrypts keys, provides connection-specific control flags, anti-replay windows, and firmware parameters, and establishes static connection values such as a nonce or a salt. (A nonce is a security string or number used once. A salt is a random value input used along with a password in key derivation.)

The system in one example supports up to 32,768 (or $2^{15}$) simultaneous connections or more. Setup is as easy as sending packet pertaining to that connection. Host 100 can lock high-speed connections. Any connection can be smoothly torn down.

A control structure is auto-fetched on a demand basis, as and when requested, to cache up to 64 security contexts or more. A security context is cached permanently if locked by host 100. Also, host 100 is operable to automatically evict old connections to make room for new connections.

Some embodiments secure the security context itself, and/or fetch the connection in secure mode using secure infrastructure.

In FIG. 1, hardware 200 in one embodiment has a Two-Plane architecture herein including a data plane 300 and a control plane 400. The data plane 300 supports cryptographic payload processing by providing and utilizing modules for authentication processing 320, encryption processing 310, air ciphering 370, public key acceleration PKA, and a true random number generator TRNG. Further, as shown in FIGS. 1, 10, 11, 12, 13, and 14, the planes cut through each of the just-noted modules and the packet header processing PHP modules 410 and 460. The data plane involves the blocks or sub-blocks primarily involved with handling packets "p" (packet data). The control plane involves the sub-blocks primarily involved with handling packets "c" for control data, packets "_" (unmarked) for scheduler data, and packets "f" for configuration data. PKA and TRNG by having lines marked "f" represent a slight legend exception to the foregoing generalization, and PKA and TRNG partake of data-plane. The basic structure and benefits of the distinction between planes are nonetheless consistent throughout.

The control plane includes one or more packet header processing PHP modules and provides Ingress header checks and Egress header updating. The special CPPI IO's along with these data and control planes provide a high-performance streaming interface.

In both control plane and data plane, shared hardware crypto core hardware is provided for IPSec, SRTP and Transport layer, thereby saving integrated circuit real estate expense. The architecture segregates the data plane 300 from the control plane 400 (or generally provides a parallel control information transfer path in upper half as compared with data path in lower half in FIGS. 10, 11, 12, 13, and 14) for true pipelined processing, so no stall arises even if delays occur in either the control plane or data plane. The fully-pipelined engine, or structure e.g. of FIG. 1, supports Encryption and Authentication simultaneously, and also provides any-order staging, such as AES followed by SHA or SHA followed by AES, or AES1 followed by AES2, for some examples.

In data plane 300 (or cut-through data-related portion in FIGS. 10, 11, 12, 13, and 14), a cryptographic payload processing module provides authentication 320 processing for SHA1 and AES (used for authentication too), MD5, and SHA2, for instance. Keyed HMAC (Hashed Message Authentication Code) operation via hardware core using MD5, SHA1, SHA2-224 and SHA2-256, and support for truncated authentication tag are included.

Block data encryption is supported via respective hardware cores for processing AES, DES, 3DES, and Galois multiplier, see module 310. Supported Air Ciphers include Kasumi and Snow3G for stream data encryption, see module 370. Security context architecture has on-chip cache (FIG. 8) with auto-fetch and can cache 64 contexts and auto-Evict or auto-Fetch a Security context on a demand basis. A Public Key Accelerator module includes a high performance, public key engine for large vector math operation and supports a modulus size up to 4096-bits or more for public key computations. Further, the Cryptographic Payload processing module(s) in the data plane has a True Random Number Generator TRNG, is non-deterministic and FIPS compliant. Null cipher and null authentication support debugging.

Further in FIG. 1, the independent control plane and data plane architecture allows host 100 to selectively use only data plane 300 components while bypassing the control plane 400. In a cut-through mode of operation, packets are processed as and when received, without waiting for the complete packet to finish. Packets are processed in chunks thereby ensuring that all the hardware engines are fully engaged. The context cache module 510 is coupled for auto fetch of security context based on current state of an engine, and pre-fetch security context is based on information available from an ingress FIFO. An option allows storage of security context within an engine for high performance connections. Auto-eviction of security context is based on unavailability of space within the context cache in FIG. 8. Fully pipelined engines for parallel processing allow multiple processing on a same payload by auto-forwarding to next engine.

Figure 11:
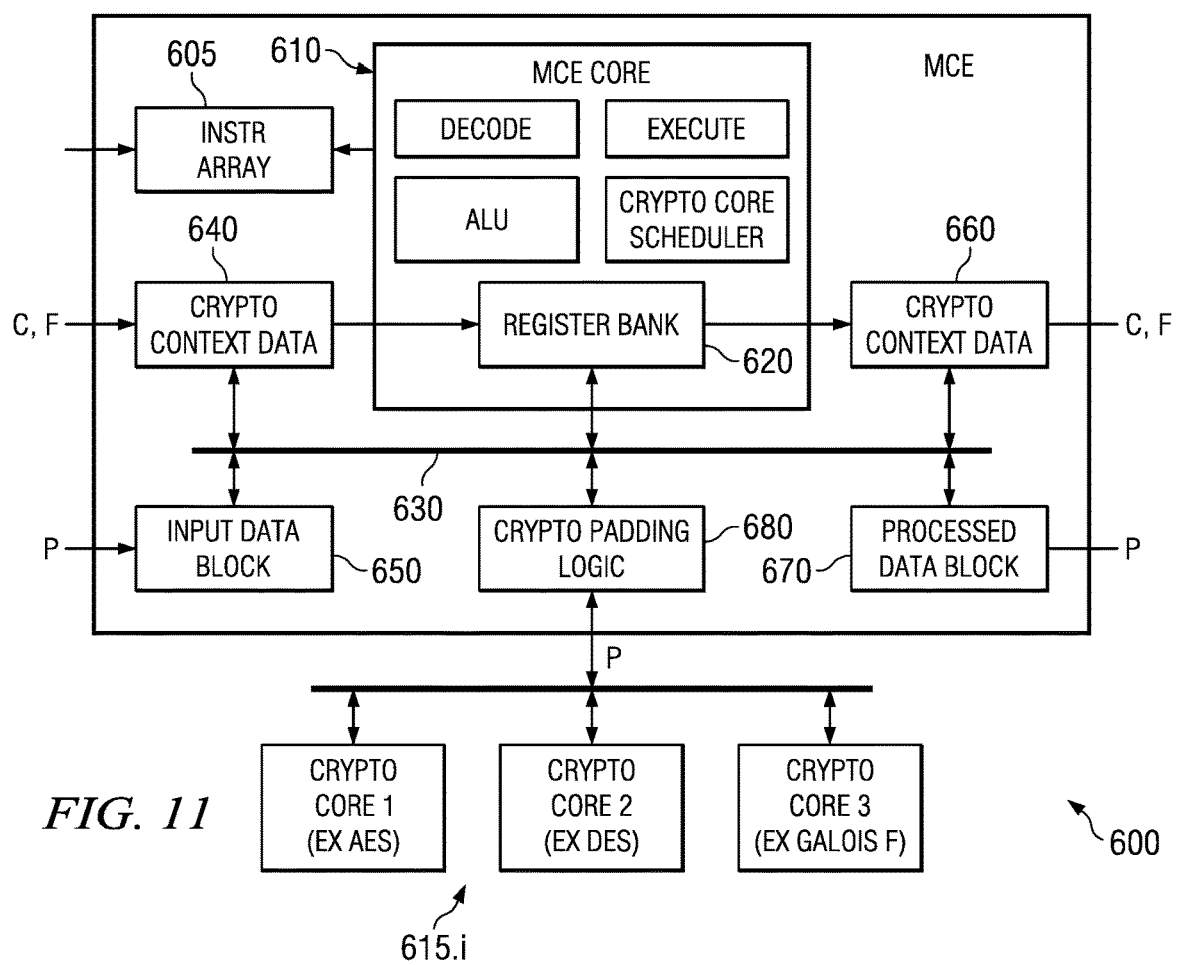
FIG. 11 is a block diagram of an inventive mode control engine (MCE) for use in the encryption module of FIG. 10 and in the Air Cipher module of FIG. 14.

To avoid limitlessly accumulating mode-specific hardware cores for multiple modes like CBC, OFB, CFB, CTR, GCM, CCM and other modes, a remarkable programmable Mode Control Engine MCE of FIG. 11 herein sequences various logical and arithmetic operations and other instructions to achieve each desired encryption/authentication operational mode and leverage the speed of associated hardware crypto cores. The sequence of operations is contained in a set of instructions that are stored as part of the security context in the memory. MCE also has registers (e.g., four registers each 128-bit such as in its Register Bank) to store the immediate result after each operation. In addition, the security context of FIG. 2 in memory stores encryption and authentication key and some other security parameters such as Initial Vector (IV), encryption mode, authentication tag length and location, date offset and security process details. Many of the MCE instructions as in TABLE 13 are also specifically set up to have direct access to these parameters.

Figure 12:
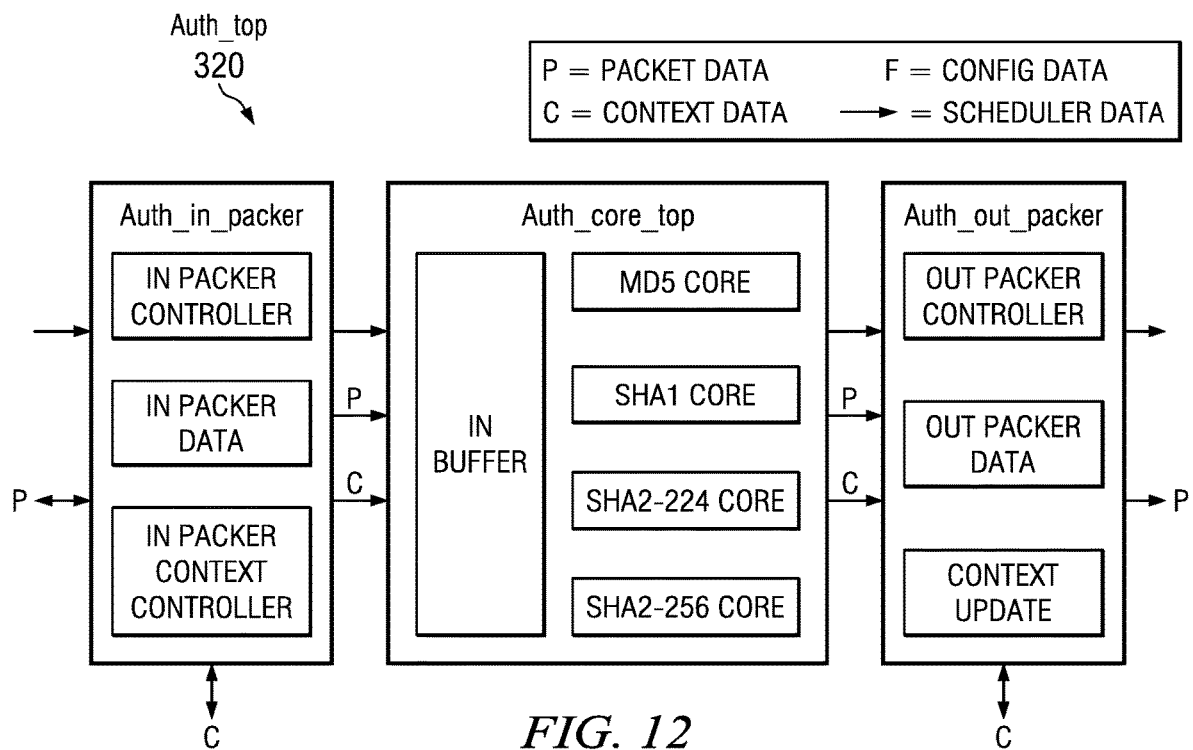
FIG. 12 is a block diagram of an inventive authentication module in the subsystem embodiment of FIG. 1.
Figure 13:
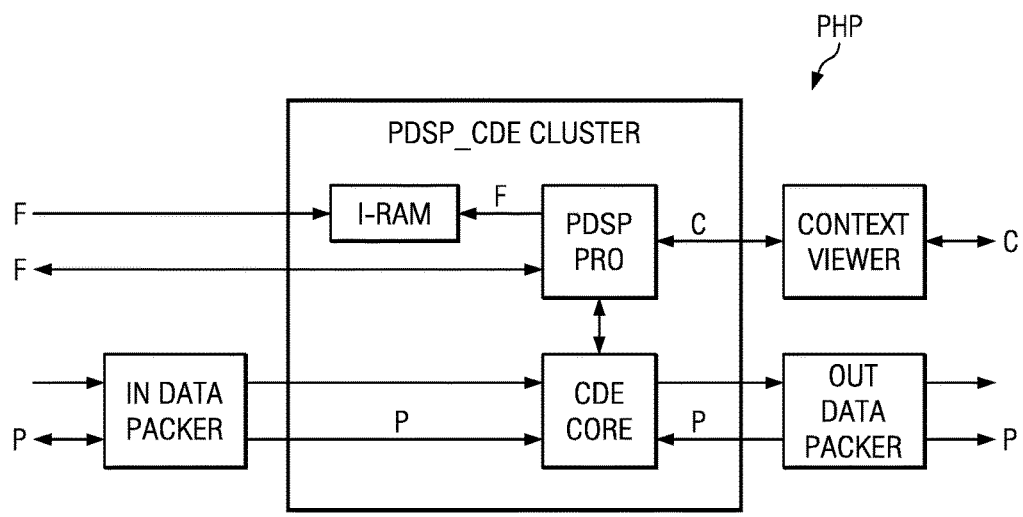
FIG. 13 is a block diagram of an inventive packet header processing (PHP) module in the subsystem embodiment of FIG. 1.

In the control plane 400 (or cut-through control-related portion in FIGS. 10, 11, 12, 13, and 14), a cryptographic control plane processing module includes two instances 410, 460 of a PHP (Packet header processor) of FIG. 13 and has a 32-bit Low gate count RISC CPU (PDSP) header processing engine for programmable protocol-related packet header and trailer and payload parsing for true 64K bytes packet processing, padding checks, security procedure control and decode, 16K of instruction RAM, and 8K scratch-pad RAM in one set of RAM size parameters for an implementation example. A hardware-accelerated security context viewer module is provided, as well as a hardware-accelerated packet viewer module. A special data engine designated CDE is beneficial for packet type application and allows hardware accelerated bytes insertion and removal from any packet.

Software and firmware architecture includes firmware for IPSEC, firmware for SRTP, and firmware for 3GPP, and firmware that schedules the processing for the hardware engines. A driver layer is provided.

Figure 2:
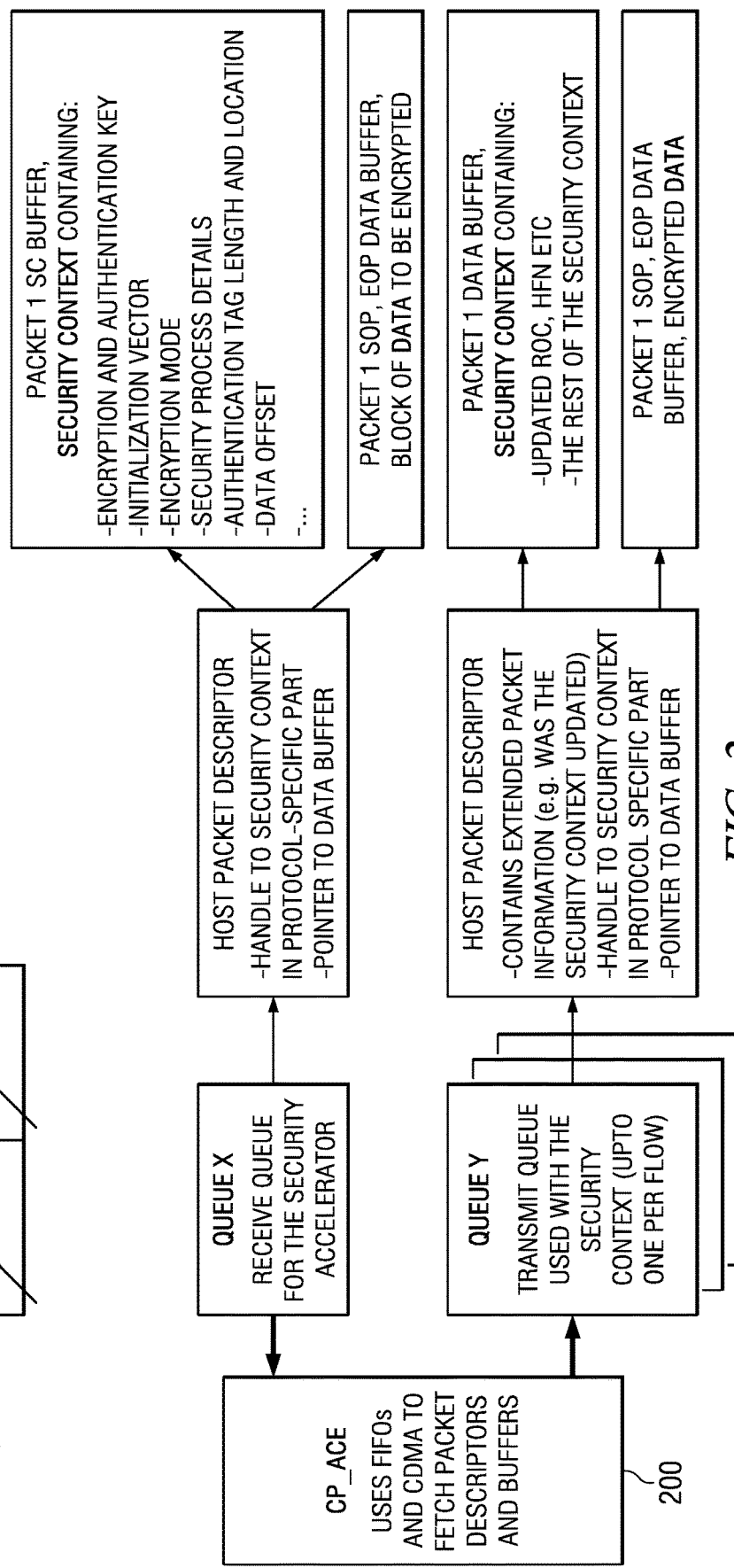
FIG. 2 is a diagram of memory spaces related by pointers, and including inventive security data structures acting as a data sink receive queue at top and data source transmit queue at bottom which are established or supported by a host processor and the subsystem embodiment of FIG. 1.
Figure 20:
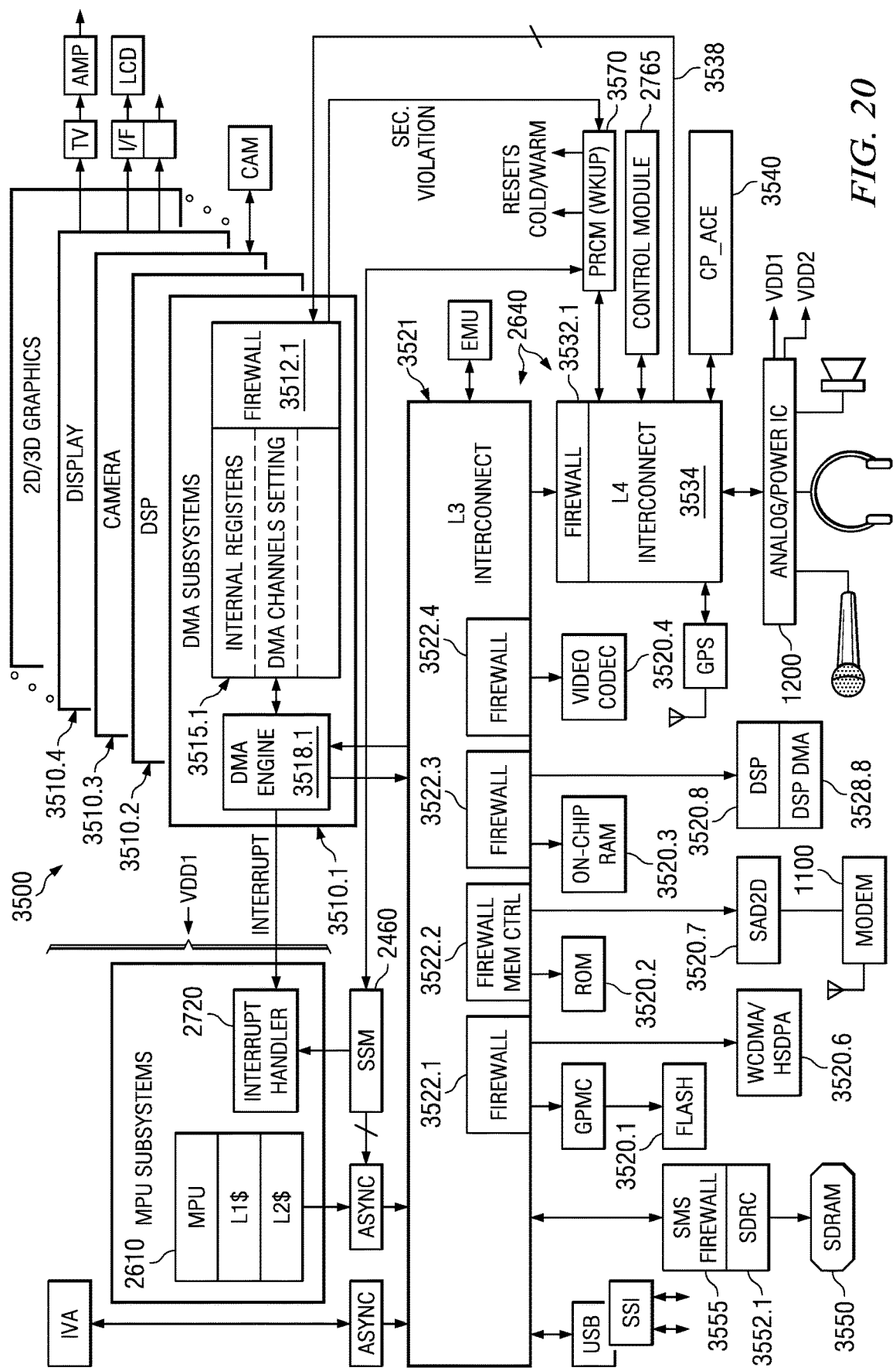
FIG. 20 is a block diagram of an inventive secure telecommunication and processing system combination with structures and processes as disclosed herein.

In FIGS. 1 and 2, the subsystem 200 includes and uses FIFOs and CDMA (CPPI DMA Communication Processor Peripheral Interface direct memory access controller) to fetch packet descriptors and buffers contents from a system 3500 such as in FIG. 20. In FIG. 2, subsystem 200 (3540) maintains a receive queue (Queue X) for ingress for the security accelerator. Receive queue holds one or more Host Packet Descriptors that each have 1) a handle to access a security context buffer in a protocol-specific part, and 2) a pointer to a Data Buffer for data or from which to access data. The security context (SC) buffer holds security context information that is collectively called a Security Context. The Security Context includes information such as encryption and authentication key, initialization vector (IV), encryption mode, authentication tag length and location, and data offset and other security process details. The Data Buffer holds SOP (start of packet), EOP (end of packet), and a block of data to be cryptographically processed such as by encryption, decryption, authentication, or otherwise according to the encryption mode.

In FIG. 2, subsystem 200 also maintains a transmit queue (Queue Y) used for egress with the security context, and multiple transmit queues are established for multiple concurrent security contexts. A transmit queue holds a Host Packet Descriptor that contains 1) a handle to access the security context buffer or an output security context buffer in the protocol-specific part, 2) a pointer to the Data Buffer or to an output data buffer from which to access data, and 3) extended packet information, such as to indicate whether the security context has been updated. The security context (SC) buffer for transmit purposes not only holds the Security Context as already described but also any updated ROC (rollover count), HFN (hyperframe number), etc. The Data Buffer for transmit purposes holds SOP (start of packet), EOP (end of packet), and a block of output data resulting from the cryptographic processing.

Figure 3:
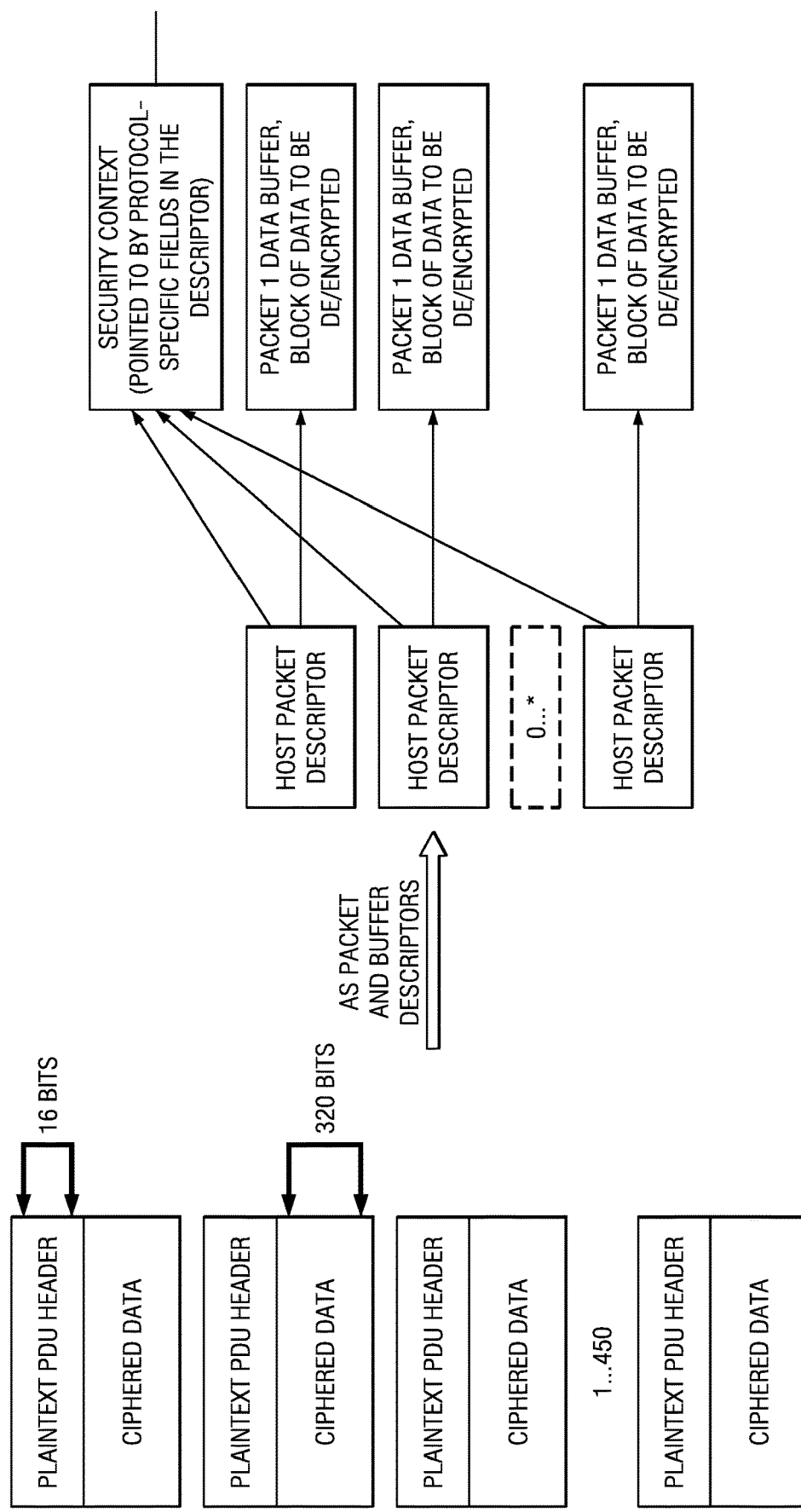
FIG. 3 is a composite diagram of packets and descriptors therein together with storage spaces for a security context and data buffer space(s) used for the inventive security data structures of FIG. 2.

In FIG. 3, receive operations relate to that receive queue of FIG. 2 and involve ingress of a series of packets each having a plaintext PDU (Protocol Data Unit) header and packet payload data arriving for cryptographic processing. Host Packet Descriptors correspond to the packets and have a pointer that points to the data buffer block of data to be decrypted or encrypted. Such Host Packet Descriptor has one or more protocol-specific fields that point to the Security Context or fields therein. These receive operations also relate to the chunking of the packets by subsystem 200, i.e. breaking a data packet on ingress into smaller data chunks.

Figure 4:
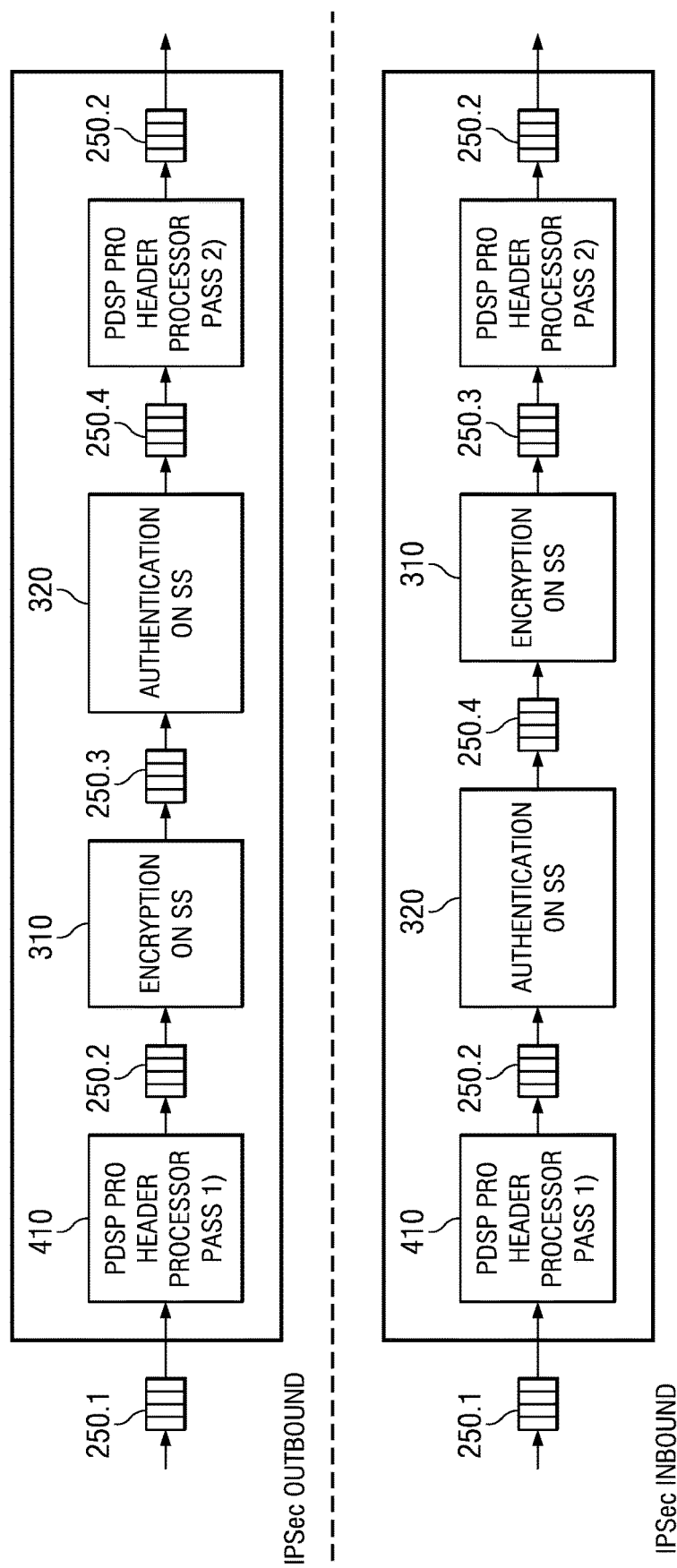
FIG. 4 is a partially block, partially flow, diagram wherein the inventive subsystem of FIG. 1 adaptively organizes a programmable structure called a logical topology for IPSEC outbound and IPSEC inbound packets.

In FIG. 4, the subsystem 200 of FIG. 1 adaptively organizes a programmable structure called a logical topology for IPSEC outbound and IPSEC inbound packets using its IPSEC PHP 410 in FIG. 1. (See FIG. 13 for a PHP detail that is used in each of the IPSEC PHP and Air Cipher PHP and that uses a processor PDSP.) For IPSEC outbound packets, first pass packet header processing by IPSEC PHP 410 is followed in FIG. 4 by Encryption SS 310, then Authentication SS 320, and then IPSEC PHP pass 2 processing. See also the associated security context of FIG. 6 and FIG. 3. For IPSEC inbound packets, first pass packet header processing by IPSEC PHP 410 is followed in FIG. 4 by Authentication SS 320, then Encryption SS 310 (decryption), and then IPSEC PHP pass 2 processing. If one IPSEC packet stream is outbound while another IPSEC packet stream is inbound, then both forms of processing in FIG. 4 can be set up and executed concurrently. Buffering 250.i supports the logical topology, such as cascade or serial nature of the outbound and inbound processes. Indeed, the subsystem of FIG. 1 not only effectively supports either of those FIG. 4 processes individually but also is or can be relatively evenly loaded while supporting both of those FIG. 4 processes concurrently. This is because the chunks (FIG. 9) are likely to be of similar size, and the differing order of operations for outbound and inbound readily have a FIG. 1 encryption block 310 running for outbound while an authentication block 320 is running for inbound, and vice versa. Notice that the buffers 250.i in FIG. 4 are some of the FIFO buffers at the inputs of Crypto Data and Scheduler SCR 260 of FIG. 1 and any buffers in the blocks or modules themselves. Under the configured or programmably established logical topology, those buffers of FIG. 1 are re-arranged or selectively multiplexed into whatever operational order (such as in the examples of FIGS. 4 and 5) is specified to establish a particular currently-employed process or future process. These processes can be in one security context or in plural security contexts such as represented by any one or more of various forms of FIGS. 6 and 7 and FIGS. 2 and 3.

Figure 5:
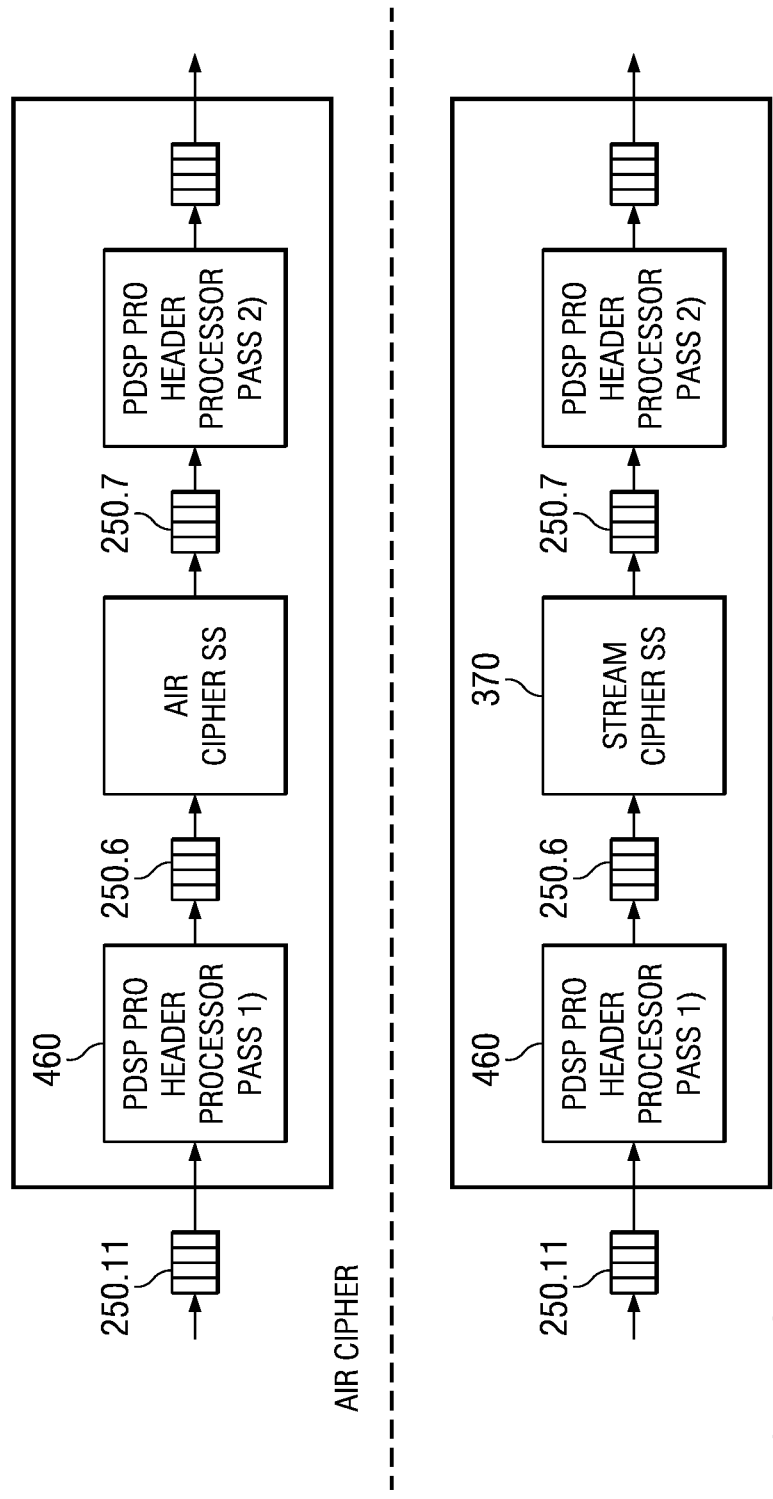
FIG. 5 is a partially block, partially flow, diagram wherein the inventive subsystem of FIG. 1 adaptively organizes a programmable structure (logical topology) for Air cipher/Stream cipher.

When FIG. 1 is considered in light of FIGS. 4 and 5, the logical topologies of FIGS. 4 and 5 or otherwise, are recognized as various programmably-helical paths (involving what are called "rounds" herein) that can be established adaptively in and in a sense form the structure of FIG. 1 into one or more coils (rounds) mediated by the Crypto Data and Scheduler SCR 260. Depending on context, the term "round" may also refer to a sequence of operations cycling through a same given subset of the modules among modules 410, 460, 310, 320, 370 and buffers 250.i. Notice the compatible lines for control plane and data plane throughout FIGS. 10-14. Multiple packet flows streaming into the PA and CDMA Ingress CPPI Streaming Interfaces are coiled at any given moment into logical topologies of approximately concurrent data flow and processing, and output data streams emerge out of the PA and CDMA Egress CPPI Streaming Interfaces. The various modules that concurrently participate in the different coils (rounds), and in what order for each coil (round), are established according to the Security Context Cache information and the Configuration SCR information. The operations of the modules are sequenced in a given coil (round). These operations appear to alternate or form other remarkable patterns of operation in space and time, as the remarkable CP_ACE subsystem 200 is configured and called and does its work.

In FIG. 5, the inventive CP_ACE subsystem 200 of FIG. 1 adaptively organizes a programmable structure (logical topology) for Air cipher/Stream cipher. For Air Cipher, first pass packet header processing by PDSP of FIGS. 1, 13 Air Cipher PHP 460 is followed in FIG. 5 by Air Cipher SS processing in the separate Air Cipher module 370 of FIGS. 1 and 14, and then further followed by FIG. 5 Air Cipher PHP 460 pass 2 processing. See also the associated security context of FIG. 7 and FIG. 3 and TABLE 5. Concurrently or otherwise for Stream cipher, first pass packet header processing by PHP 460 is followed in FIG. 5 by Stream Cipher SS in module 370, and then PHP 460 pass 2 processing. Buffering 250.i again supports the logical cascade or serial nature of these parallel processes so that the subsystem of FIG. 1 is relatively evenly loaded.

Notice that the logical topologies of both FIGS. 4 and 5 can be executed concurrently due to the additional level of parallelism of the subsystem 200. Accordingly, not only can subsystem 200 be characterized by control plane/data plane parallelism but also cryptographic parallelism such as illustrated for supporting Internet and wireless concurrently. Subsystem 200 embodiments thus also remarkably introduce a two-dimensional parallelism in four quadrants for control/data and Internet/wireless cryptographic and other processing to which the advantages commend them.

Figure 6:
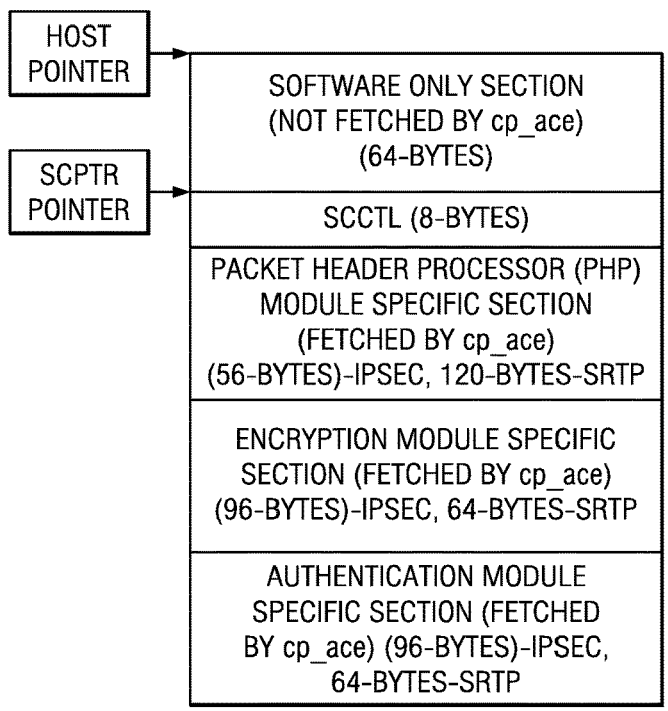
FIG. 6 is a storage space diagram of an inventive security context data structure for IPSEC in ESP mode, such as to support FIG. 4, or alternatively with an inventive security context for SRTP.
Figure 7:
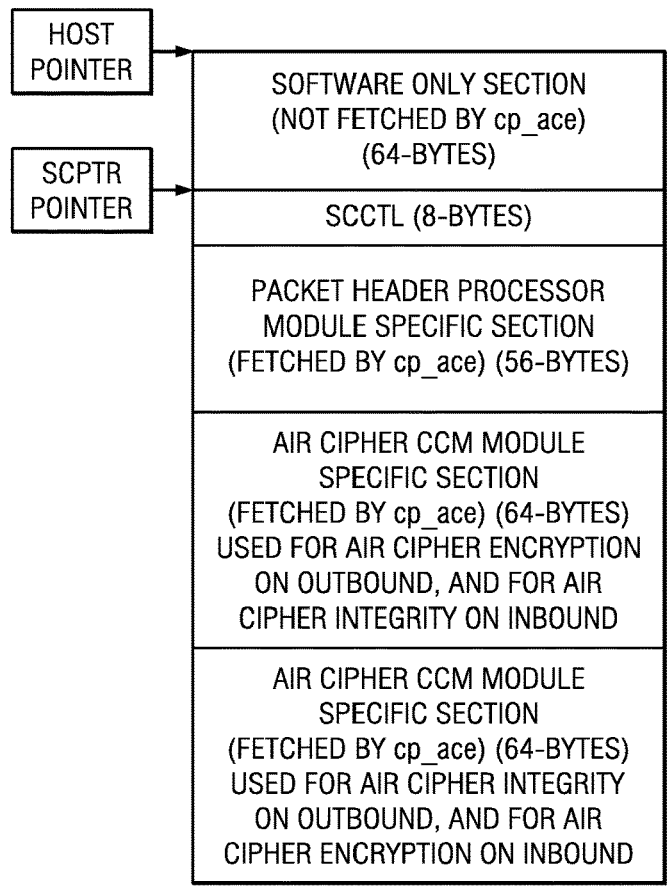
FIG. 7 is a storage space diagram of an inventive security context data structure that supports FIG. 5 for Air Cipher inbound and outbound. Notice that the order of integrity and encryption in the security context is reversed in this example depending on the Outbound or Inbound operation.

As illustrated by examples of FIG. 6 and FIG. 7, each individual security context per-connection accessible via Ctx Fetch VBUSP in FIG. 1 Host memory 120 (3520.3, 3550 in FIG. 20) is made up of three parts: Software-only section, PHP section, and data plane processing section. The Software only section holds the information that is used by software (DSP code) for managing security context and for storing connection-specific data, and this information does not need to be fetched by CP_ACE subsystem 200. The PHP section in FIG. 6 or 7 holds PHP control information used by each packet header processing (PHP) module 410 or 460 in subsystem 200 to maintain the current state of the connection along with data used to process packets. This PHP section in FIG. 6 or 7 is fetched and updated as needed using DMA 520 of FIG. 8. The third and fourth sections in FIG. 6 or 7 hold data plane processing (Encryption, Authentication, and/or Air Cipher) module-specific control and state information fetched by subsystem 200 as needed. Subsystem 200 does not need to write/update these data plane processing subsystem sections. To maximize the EMIF (external memory interface) efficiency, each FIG. 6 section starts at a 64-bytes aligned address, for instance. Hardware control structure is aligned to 64-bytes to allow cascading of multiple control structures.

In FIG. 6, a security context example is shown for IPSEC or SRTP in ESP mode as seen by DSP software. This context uses Authentication (SHA/MD5) and Encryption (AES/3DES). This flow is same for both Inbound and Outbound. A Host pointer points to a 64-bytes Software-only section that is not fetched by CP_ACE. The SCPTR pointer of TABLE 10 points to a section in FIG. 6 that has SCCTL (8-bytes), a Packet Header processor (PHP) module-specific section, followed by an encryption module-specific section, and further followed by an Authentication module-specific section. The 56-bytes Packet Header processor (PHP) module specific section is fetched by subsystem 200 and used for IPSEC header processing using PDSP and CDE engine and PHP Pass1/Pass2 Engine ID (TABLE 5). The 96-bytes Encryption module-specific section is fetched by subsystem 200 and used for IPSEC encryption using AES/3DES core and Encryption Pass1 Engine ID. See discussion of FIG. 10 and TABLES 11-12 later hereinbelow. The 96-bytes authentication module-specific section is also fetched by CP_ACE and used for IPSEC Authentication using SHA/MD5 core and Authentication Pass1 Engine ID. See discussion of FIG. 12 and TABLE 15 also.

In FIG. 6, for SRTP, the three module-specific sections are used in the same way but have different numbers of bytes than used for IPSEC. Thus, multiple modes for IPSEC and for SRTP respectively are analogously supported by the same FIG. 1 hardware for PHP, encryption, and authentication.

In FIG. 7, another example of security context is provided for Air cipher Outbound, where encryption (Kasumi-F8) is done first, followed by Authentication (Kasumi-F9). In this case a same hardware engine is used twice. The order of Authentication/Encryption sections is beneficially reversed in FIG. 7 for Air Cipher Inbound. A 56-bytes Packet Header processor (Air Cipher PHP) module-specific section is fetched by subsystem 200 and used for Air cipher header processing using PDSP and CDE engine and PHP Pass1/Pass2 Engine ID (TABLE 5). A 64-bytes Air cipher module specific section is fetched by subsystem 200 and used for Air cipher encryption using Kasumi/AES/Snow3G core (e.g., Kasumi-F8) and Air Cipher Pass1 Engine ID. A second 64 bytes Air cipher module-specific section is also fetched by CP_ACE and used for Air cipher integrity protection using Kasumi/AES/Snow3G core (e.g., Kasumi-F9) and Air Cipher Pass2 Engine ID. See discussion of FIG. 14 and TABLES 16-17 also.

FIG. 7 also is re-used as a Figure to show a separate example of security context (separately-stored in memory) for Air cipher Inbound, where Authentication (Kasumi-F9) is done first, and followed by Encryption (Kasumi-F8). In this case a same hardware engine is used twice. The order of Authentication/Encryption sections is reversed for Air Cipher Inbound relative to Air Cipher Outbound. In this way, two different Air cipher modes are supported, depending on the configuration or loading of the security context.

In FIG. 7, yet another security context applies analogously to CCM for Inbound or Outbound modes. The control bits track those of the Air Cipher description by analogy, except that for CCM an AES/3DES core is specified.

FIG. 8 shows a block diagram for the security context cache module 510 that is coupled to context RAM 570 in subsystem 200 of FIG. 1, and the block diagram also illustrates a flow of the security context cache working process. In FIG. 8, the security context cache 510 has a DMA module 520 that interfaces with the context RAM 570 and couples to a master interface with context fetch bus VBUSP to access security contexts (as in FIG. 2, 3, 6 or 7) in host memory 120 in FIG. 1. This portion operates as a control-plane structure. DMA 520 is operable for fetch and eviction operations with context RAM 570. A lookup module 530 interfaces with a storage called Lookup RAM for data read/write. Such storage is suitably provided in the context RAM 575 space in FIG. 1. Note also the FIG. 1 parallel buffers 250.5 and 250.15 which can be coupled to modules 520, 530 in FIG. 8 directly or multiplexer-coupled into the cache structure. Thus the cut-through organization is carried consistently into the cache structure.

Cache module 510 in FIG. 8 has three cache port controllers: 1) PA CPPI port controller 540, 2) CDMA CPPI port controller 550, and 3) MMR port controller 560. Arbitration logic 580 supports lookup module 530 by arbitrating any lookup contention for module 530 as between any of the port controllers 540, 550, 560. Arbitration logic 590 supports evict/fetch DMA module 520 by arbitrating any contention for DMA 520 as between any of the port controllers 540, 550, 560. Each of these three port controllers has a set of three control lines with a port prefix followed by _Lookup_Req to activate a lookup request, _EOP_Req to activate an end of packet request, and _Schd_Req to return a scheduling response output. (FIG. 1 shows these control lines in abbreviated manner simply by lines 262, 263 coupling crypto data and scheduler SCR 260 with security context cache module 510.) Each triplet of these control lines is designated by a prefix PA, CDMA, or MMR to indicate that it is coupled to PA CPPI, CDMA CPPI, or MMR block in FIG. 1. Each of the three port controllers 540, 550, 560 has two output lines to convey requests to lookup arbitration 580 and DMA arbitration 590. See, among other controls descriptions elsewhere herein: For PA, see TABLES 26, 28. For CDMA, see TABLES 25, 27. For MMR, see TABLES 21-24. For security context cache operations pertaining to setting up, tearing down, and evicting a security context, see FIGS. 16-18 and TABLE 9.

Figure 9:
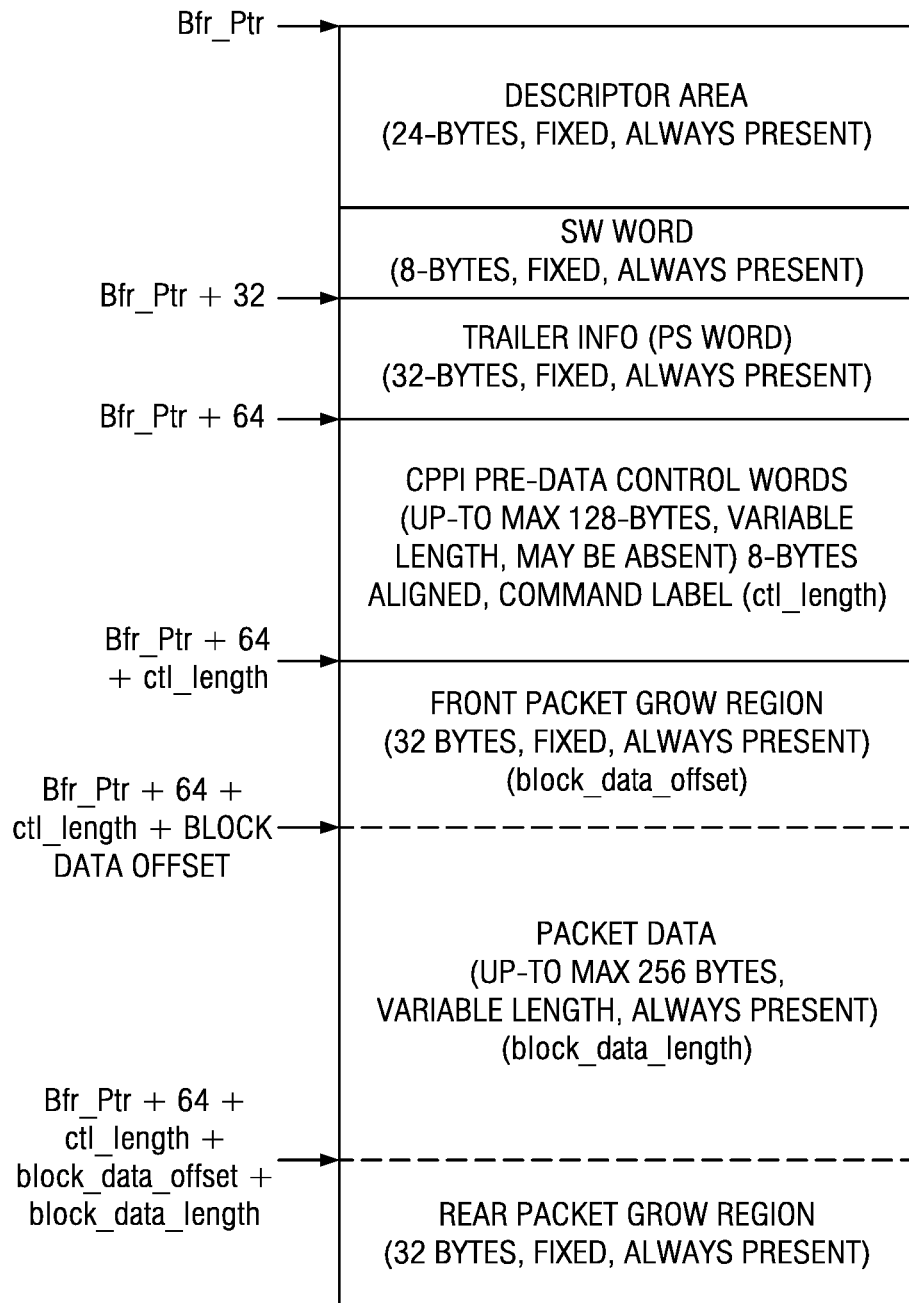
FIG. 9 is a storage space diagram of an inventive internal buffer format with associated buffer pointer positions and that is provided for an inventive process of chunking packets.

Turning to FIG. 9, an internal buffer format is depicted. A packet as received from CPPI 210 or 220 as part of ingress flow is chunked into smaller data blocks within subsystem 200 and packed into the buffer, e.g. 265, with the illustrated format. All of the data processing engines in FIG. 1 use and operate on the basis of this FIG. 9 format to access data for their respective processing. Packet data start position is variable and dependent upon length of the CPPI Pre-data Control words section in FIG. 9. If no CPPI Pre-data Control words are present, then packet data starts at offset of 64-bytes. In this example, CPPI Pre-data Control words as formed by Host 100 or PDSP software are 8-bytes aligned. Padding of zeroes is executed, if need be, to achieve 8-bytes alignment.

In FIG. 9, this internal buffer format or chunk buffer begins at a pointer address Buf_Ptr with a Descriptor area (e.g., 24 bytes). Refer also to FIGS. 2 and 3 Host Packet Descriptor discussion. Descriptor area is followed by a SW word area (e.g. 8 bytes, see also TABLE 3 and SW0, SW1). Trailer information called the PS word (32 bytes) and then up-to-128 bytes CPPI pre-data control words such as Command label(s) are next in succession. Then follow a Front Packet Grow region (32 bytes), an up-to-256 bytes chunk of variable length packet data, and a Rear Packet Grow region (32 bytes). (All of the numbers of bytes represent non-limiting examples.)

Each Grow region provides a guard band of buffer space. The Front Packet Grow region provides a degree of protection of CPPI Pre-data Control Words (e.g., Command label (s)) from an error or attack involving the Packet data section in FIG. 9. The Rear Packet Grow region provides a degree of protection of an adjacent chunk buffer space (beyond FIG. 9) from an error or attack that might affect or run-on the size of the Packet data section.

Returning to FIG. 1, data processing engines and security contexts are further detailed. The letter-code legends for lines used in FIG. 1 and FIGS. 10 and 12-14 are:
p=Packet Data
c=Context Data
f=Configuration Data
(none)=Scheduler Data.

In FIG. 1, the data planes and their independent control avoid stalling of either plane by the other plane. Also, host 100 is free to selectively use the data plane without engaging control plane components. Control plane processing in subsystem 200 is carried out in a Packet header processing (PHP) subsystem 410, 460 each as in FIG. 13 and equipped with PDSP (RISC CPU) and associated CDE engine to parse packet headers and define routing for the data plane. PHP PDSP thereby sets up any desired logical topology as illustrated in the FIGS. 4-5 examples and frees up Host 100. In some embodiments, the PHP PDSP program accesses and executes an adapted version of software that would otherwise burden the Host, so that PHP 410 or 460 controls the hardware modules 310, 320, 370 instead, based on the packet headers and based on the security context (e.g., FIGS. 6, 7, TABLE 19) and Ingress data (TABLE 31 and FIG. 9).

Firmware executed on PHP PDSP extracts and inspects security headers as per the security protocol stack (IPSEC/ SRTP/3GPP etc) in use to define the action to be carried out on the packet. If the packet passes the header integrity check, then packet header processor PHP subsystem (FIG. 13) sets the route for payload processing within subsystem 200. To set the route for payload processing, PHP adds a Command label CmdLbl in a pre-defined format (e.g. TABLES 4-6) in a data buffer holding a packet or chunk as in FIG. 9. Command label CmdLbl is used by an applicable other hardware module (e.g. Encryption, Authentication, Air Cipher) to forward the packet to the appropriate hardware engine in such module 310, 320 or 370. For instance, the packet can be sent to one of AES, DES, or Galois in Encryption module 310; and/or one of the SHA cores or MD5 in Authentication module 320; and/or one of AES, Kasumi or Snow3G core in Air Cipher module 370. The native processing to which each selected scheduled core is adapted then executes. The results are fed into, between and from modules according to the logical topology or topologies set up by PHP 410 or 460 or both.

In FIG. 1, Data plane processing is carried out by various data processing subsystems, or modules that are partitioned based on nature of processing done by such subsystem or module. Subsystem 200 has three major data processing subsystems, namely 1) Encryption module 310, 2) Authentication module 320 and 3) Air cipher module 370. Packets or chunks thereof are forwarded to the applicable individual data plane module by decoding the command label prefixed in front of the packet chunk (FIG. 9). The command label is attached by control plane, e.g. PHP 410 or 460. Host 100 also can leverage CP_ACE 200 flexibility by selectively engaging any data plane components by prefixing a Command label in or from the packet thereby bypassing PDSP based processing of PHP.)

Figure 10:
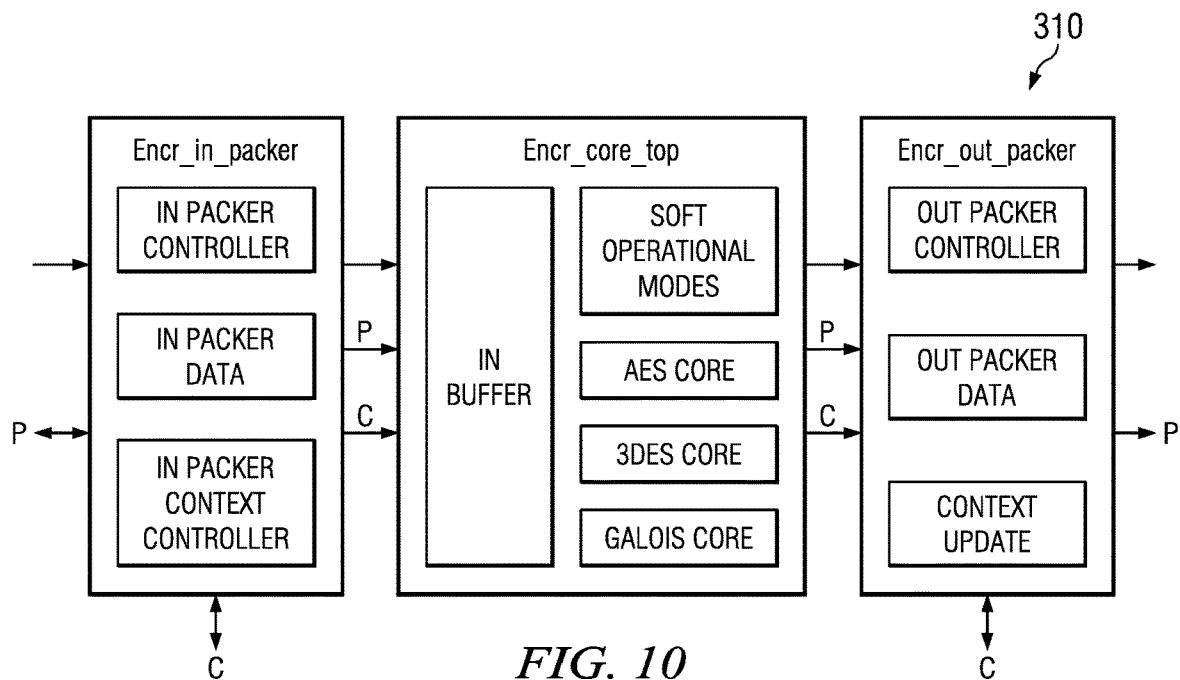
FIG. 10 is a block diagram of an inventive encryption module in the subsystem embodiment of FIG. 1.

The Encryption module 310 of FIGS. 1 and 10 supports confidentiality by carrying out the task of encrypting/decrypting a payload from desired offset using hardware encryption cryptographic cores. In FIG. 9, such offset is represented by the expression Bfr_Ptr+64+ctl_length+block data offset. Buffer pointer Bfr_Ptr points to the chunk, and the just-given offset expression points to portion of packet data payload in the chunk. Encryption subsystem 310 has an MCE (mode control engine, FIGS. 1, 11), an AES core, 3DES core and Galois multiplier core which are deployed by MCE. Mode control engine MCE in the encryption module 310 implements various confidentiality modes like ECB, CBC, CTR, OFB, GCM etc, see "Soft Operational Modes" block representing MCE operation in FIG. 10.

The Authentication module 320 of FIGS. 1 and 12 provides integrity protection. Authentication module 320 is equipped with SHA1 core, MD5 core, SHA2-224 core and SHA2-256 core to support keyed (HMAC) and non-keyed hash calculations electronically.

Figure 14:
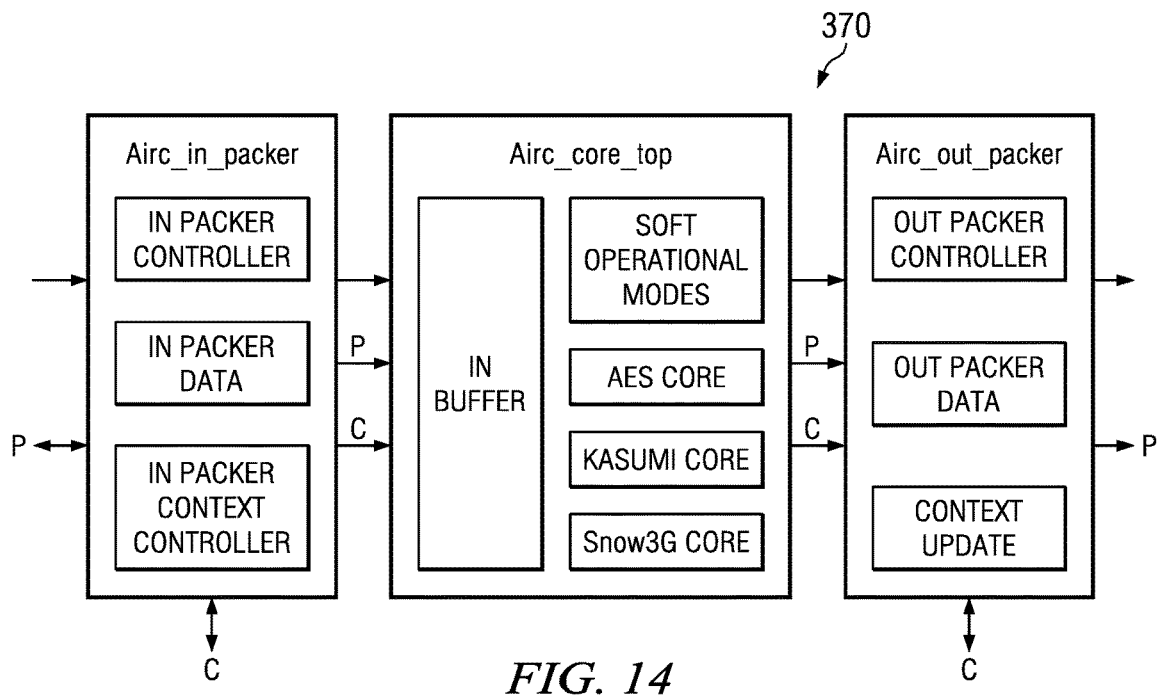
FIG. 14 is a block diagram of an inventive Air Cipher module in the subsystem of FIG. 1 and that uses the MCE embodiment of FIG. 11.

The Air cipher module 370 of FIGS. 1 and 14 secures data sent to a wireless device (such as modem 1100 in FIG. 20) over the air by using wireless-infrastructure-defined cryptographic cores like Kasumi or Snow3G. This module 370 is also used to decrypt the data as received from air interface modules.

Further in FIG. 1, the control and data plane processing engines 410, 460, 310, 320, 370 each have lines to context RAM 570 to access or store/update the control information pertaining to each logical connection. Context RAM 570 holds the information like Keys, IV, partial data, etc., for each active security context (e.g., as in FIG. 2, 3, 6, or 7). Cryptographic engine CP_ACE provides and can store up to e.g., 64 or more context-identifying numbers on-chip based on the desired performance. Context RAM 570 is coupled with Security Context Cache module 510 (FIG. 8) to fetch the context information from external memory 120 to populate the active context on a real-time demand basis.

In FIG. 1, subsystem 200 accepts packets on respective 32-bit PA and CDMA Streaming buses PA_Str and CDMA_Str respectively feeding a PA (packet accelerator) Ingress CPPI Streaming Interface port 210 and a CDMA Ingress CPPI Streaming Interface port 220 as part of ingress flow. Each packet destined to subsystem 200 is prefixed with at least 8-bytes of CPPI Software Word (for FIG. 9) that holds information about security context to uniquely identify security connection and associated security parameters. See TABLE 31. Coherency is maintained by CPPI DMA. Word order of operations is in-order so that each new packet starts after a last (previous) packet is completely fetched by CP_ACE. Egress is handled by a PA Egress CPPI streaming interface 270 and a CDMA Egress CPPI streaming interface 280 on other side or output side of the Crypto Data and Scheduler SCR 260 that has numerous 64-bit registers.

Regarding the input side of Crypto Data and Scheduler SCR 260, notice that nine FIFO (first in first out) buffers 250.i or queues support: A) the Security Context Cache module 510 with a pair of such buffers 250.5, 250.15 for important parallelism and control bandwidth, and B) one buffer for each of the two Ingress CPPI Streaming Interfaces for PA and CDMA, C) one buffer each (250.1, 250.11) for IPSEC PHP and Air Cipher PHP, and D) one buffer each (250.3, 250.4, 250.7) for the hardware modules or engines (e.g. Encryption 310, Authentication 320, Air Cipher 370) and buffers 250.2, 250.6 for the IPSEC PHP 410 and Air Cipher PHP 460 respectively.

Crypto Data and Scheduler SCR 260 has an associated Packet RAM 265 and an associated Block Manager Module 380. Crypto Data and Scheduler SCR 260 has respective outputs coupled to IPSEC PHP 410 and Air Cipher PHP 460, and to the Encryption, Authentication, and Air Cipher hardware modules 310, 320, 370, as well as outputs to the PA Egress CPPI streaming interface 270 and the CDMA Egress CPPI streaming interface 280, and an output line (when included) directly external to CP_ACE.

Security Context Cache module 510 has inputs for context Ctx Fetch by a 128-bit VBUSP bus, and two 64-bit wide lines 262, 263 from Crypto Data and Scheduler SCR 260. Security Context Cache module 510 has a context data line coupled to Context RAM 570, as do each of IPSEC PHP 410 and Air Cipher PHP 460, and the Encryption, Authentication, and Air Cipher hardware modules 310, 320, 370. Context RAM SCR 570 in turn is coupled to three banks of Context RAM 575.

A Configuration SCR 350 store receives 32-bits input from a Configuration VBUSP bus. Configuration SCR 350 supplies or is accessed for Configuration data for each of IPSEC PHP 410 and Air Cipher PHP 460, as well as providing Configuration data for each of RNG, PKA, MMR registers and two banks of Configuration RAM.

Packets are fetched to subsystem 200 via CPPI CDMA using, e.g., two ingress channels and sent out of CP_ACE via, e.g., 16 egress channels (threads). Crypto Data and Scheduler SCR 260 internally breaks up a received packet on-the-fly from either Ingress port (PA 210 or CDMA 220) into data chunks. Each data chunk can hold maximum of e.g. 256-bytes of packet payload. Six banks of packet RAM 265 support Crypto Data and Scheduler SCR 260. This chunking operation is provided to fully engage the hardware engines in modules 310, 320, 370 and to reduce internal buffer (RAM) spaces 250.i. Chunking also promotes efficient, low-latency cut-through mode operations in subsystem 200 wherein the packet data can thereby be processed and is processed as and when received without waiting for a given whole packet to be completely received and stored.

The initial route in Ingress flow within subsystem 200 is determined by an Engine ID that is extracted from the CPPI software word SW in FIG. 9 and described hereinbelow, see also TABLES 3 and 5. Subsequent sequence processing of the data chunk is determined by the command label prefixed to the chunk (FIG. 9, TABLES 4-6) by Host 100 or PHP (packet header processor) module 410 or 460 of FIG. 13. The command label (TABLE 4) holds the engine select codes of TABLE 5 with optional parameters. Multiple command labels can be cascaded (TABLE 6) to allow a chunk to be routed to multiple engines within subsystem 200 to form a logical processing chain. Optional parameters of a command label provide control information pertaining to each processing engine.

CP_ACE allows processing of interleaved data chunks, but always ensures that chunks of a given packet follow the same route within the system thereby maintaining packet data coherency. Chunks are routed to next engine based on command label, and a chunk can be routed back to a same engine for second stage processing. Once chunks are processed they are queued for Egress to exit subsystem 200. Subsystem 200 has two physical egress ports 270, 280 (PA and CDMA). Internal hardware structure ensures that packets entering PA Ingress port 210 can only exit PA Egress port 270; likewise packets entering CDMA Ingress port 220 can only exit CDMA Egress port 280. As packets internal to subsystem 200 are processed in chunks, chunks belonging to different packets may cross each other in time, i.e. a data chunk of a last received packet may come out first on Egress before a first packet data chunk. Hence, CP_ACE has 16 Egress CPPI DMA channels, and internal hardware ensures that all data chunks belonging to an individual packet go out on a same Egress CPPI DMA channel (thread). The internal hardware maintains packet data coherency on a given CPPI DMA channel.

Subsystem 200 also hosts TRNG (True Random Number Generator) and PKA (Public Key Accelerator) modules that can be accessed via Memory mapped registers by IPSEC PHP 410 PDSP, Air Cipher PHP 460 PDSP, or by Host 100 to aid key generation and computation.

CPPI software words SW are formed and attached to a packet (e.g., chunk in FIG. 9) by a packet queuing entity. SW Word0 and SW Word1 of CPPI hold the information to associate the current packet to a security context. SW Word2 is optionally used to specify destination CPPI queue.

In TABLE 3, a single bit is sufficient for Present info and each flag, otherwise multiple bits are provided.

TABLE 3

| CPPI SW Word0 | |
|---|---|
| Field | Width |
| CPPI Destination | |
| Info Present | |
| Command Label | |
| Present | |
| Command Label | |
| Offset | Multiple bits |
| Engine ID | Multiple bits |
| Evict, Tear, NoPayload | Flags |
| Security Context ID (SCID) | Multiple bits |

In TABLE 3, the CPPI Destination Info Present flag indicates that SW word2 is holding CPPI destination queue information thereby detailing the flow index on ingress and free queue number or thread to be used on egress when sending this packet out to CPPI after processing. (Compare also with TABLE 21 and with TABLES 25-28 _thread_id and _req_thread_id controls for CPPI I/Fs, and see TABLE 31 Word 2 Flow index description.) The Engine ID field selects the first processing accelerator engine within the subsystem 200. The Engine ID field is used, for instance, if host 100 is about to send data directly to one or more data plane processing engines (Encryption 310, Authentication 320, Air Cipher 370, or cores in any of them) without involving a control plane engine IPSEC PHP 410 or Air Cipher PHP 460. Host 100 may be programmed to insert a default engine ID code PA_ENG_ID or CDMA_ENG_ID that directs the hardware to select the first processing engine from the programmed memory-mapped register MMR (FIG. 1, TABLE 21) defined for that ingress interface. The Command label info field has the Command Label Present flag and multi-bit Command Label Offset. The most significant bit (MSB) of the command label info is the Command Label Present flag, indicating that command label has been formed by Host. The Command Label Offset (Cmd Label Offset, PS info) is defined from the start of the CPPI Pre-data Control words section (see FIG. 9, TABLES 3, 7) where an engine-specific command label (if any) has been formed. (CPPI Pre-data Control words section is called Control section for short, elsewhere herein.) Host 100 uses such command label when directly engaging the data processing engines without involving control plane engine 410 or 460. Command Label Offset is address aligned on and specified in 8-bytes units.

Evict, Teardown and No-Payload flags in TABLE 3 are used to override the default behavior of the context cache module 510 (FIG. 8).

In TABLE 3, Security Context ID (SCID) has MSB bit as its First Tier bit and the remaining bits as a security index (SCIDX). MSB bit (First Tier) being set indicates that this is a First Tier connection. Context cache module (FIG. 8) uses the multi-bit security Index (SCIDX) to search an internal table for a locally cached security context. If the search is successful, then the locally cached security context is used to process the packet, else a DMA fetch request is issued from a 32-bits security context pointer SCPTR in CPPI SW word 1 to internal cache memory to populate the security context. 32-bit security context pointer SCPTR in CPPI SW word 1 is a 64-bytes-aligned physical external memory address that is used to fetch a particular security context (e.g., as in FIG. 6 or 7) from external memory 120. (SCPTR also is in SCCTL of FIG. 6 and in TABLE 10.)

Optional CPPI SW word 2 has three fields utilized when host 100 is directly engaging data processing engines with no PHP involved. Egress CPPI Destination Queue number has multiple-bits to select the Egress destination CPPI Queue to be used after subsystem 200 processing and therefore the Host supplies this parameter to select CPPI destination queue. Egress CPPI Flow Index field holds a CPPI flow index for Egress CPPI transfers. Egress CPPI Status length field provides CPPI streaming status data, such as for the Authentication engine 320 (FIG. 12). This field specifies a number of 4-bytes aligned bytes to send as CPPI streaming status that appears in CPPI PS section at Host 100.

TABLE 4 shows a Command label format or structure for PHP PDSP or Host to issue to the data plane processing engines (Encryption 310, Authentication 320, Air Cipher 370 module in FIG. 1). The command label structure is PDSP friendly, so that each PHP can rapidly populate the fields in the command label structure. In FIG. 9, the first data block (chunk) of a packet is prefixed with a Command label that holds the information about the processing to be carried out on the payload by data plane processing engines 310, 320, or 370 and specified crypto cores therein. Non-first data blocks (chunks) of the packet can also optionally contain a Command label to pass in-line instructions to the selected data plane processing module 310, 320, or 370. The Command label contains a Next Processing Engine select code followed by the optional control information meant for selected data plane processing engine or crypto core. A Command label can be attached (prefixed) by the packet header processing PHP module or by Host 100 thereby setting the sequence of processing (logical topology, e.g. of FIG. 4 or 5) on header and payload within CP_ACE. Host prefixes the Command label when host 100 is to engage data plane processing components without involving control plane components within subsystem 200. In the TABLE 4 Command label, the Next engine select code is followed by length fields, offset fields, option encoding and option bytes. Up to e.g. three options can be specified in the option bytes field of the Command label. Each option ends at 8-bytes boundary. Padding of zeroes is added to align to a boundary of 8 bytes when padding is needed to do so. A first data block (FIG. 9 Packet data section in the chunk) follows the Command label.

TABLE 4

| COMMAND LABEL FORMAT | | | | | | | |
|---|---|---|---|---|---|---|---|
| Next Engine ID select code | Command label length | Length to be processed (16-bits) | | SOP bypass length | Options control info (24-bits) | | |
| Option A MSB byte byte 0 | Option A byte 1 | Option A byte 2 | Option A byte 3 | Option A byte 4 | Option A byte 5 | Option A byte 6 | Option A byte 7 (8-bits) |

TABLE 4-continued

COMMAND LABEL FORMAT

| Next Engine ID select code | Command label length | Length to be processed (16-bits) | SOP bypass length | Options control info (24-bits) | | | |
|---|---|---|---|---|---|---|---|
| Option A byte 8 | Option A byte 9 | Option A byte 10 | Option A byte 11 | Option A byte 12 | Option A byte 13 | Option A byte 14 | Option A LSB byte byte 15 (8-bits) |
| Option B MSB byte 0 | Option B Byte 1 | Option B byte 2 | Option B byte 3 | Option B byte 4 | Option B LSB byte 5 | Padding | |

TABLE 5 describes the bits of a Next Engine ID, used to decode the next processing. In some embodiments, Next Engine ID bit fields are substituted for any one, some or all of these Next Engine ID bits. Each activated bit is decoded to activate the corresponding engine that is signified. The decoder is responsive to activation of multiple bits to activate the corresponding engines.

TABLE 5

NEXT ENGINE ID BITS

| ENGINE ID BIT | ENGINE DESCRIPTION |
|---|---|
| Default Ingress Engine ID | Host inserts default engine ID select code, in this scenario the hardware picks up first processing engine from the programmed MMR memory-mapped register defined for that ingress interface. |
| Encryption Module Pass 1 | Engine to carry out Encryption/decryption. This engine has AES, DES, Galois core along with mode control engine MCE. |
| Encryption Module Pass 2 | Pass 2 for Encryption/decryption engine in CCM mode wherein two levels of encryption processing are executed. |
| Authentication Module Pass 1 | Engine to carry out Hashing operation has SHA1 MD5 and SHA2 cores. |
| Authentication Module Pass 2 | Code for Pass2 Authentication in case payload is routed again to Authentication module. |
| IPSEC Header processor Pass 1 | Engine to carry out IPSEC header packet processing holds PDSP that carries out IPSEC protocol-specific header operation. In Pass 1 the packet header is parsed and inspected. |
| IPSEC Header processor Pass 2 | Pass 2 for IPSEC header packet processing updates and acknowledges the result from payload processing module. |
| Output Port 1 Egress module 1. | This is used to send data out of subsystem 200. |
| Air Cipher Module Pass 1 | Engine for air cipher processing. Pass1 has, e.g. AES, Kasumi and Snow3G cores. |
| Air Cipher Module Pass 2 SRTP/Air cipher Header processor, Pass 1 | Pass2 for air cipher module, e.g. in GCM/CCM mode Engine to carry out SRTP/Air Cipher packet header processing. The engine holds PDSP to carry out SRTP/ Air cipher protocol-specific header operation. |
| SRTP/Air cipher Header processor Pass 2 | Pass 2 for SRTP/Air cipher header packet processing. Pass 2 updates and acknowledges result from payload processing module. Output Port 2 Egress module 2 is used to send data from subsystem 200. |

In TABLE 4, a multi-bit Engine Header Length field within a Command label indicates the engine-specific Command label length. This length mainly indicates total number of option bytes present plus (or beyond) the 8-bytes of command label. A longer multi-bit Length To Be Processed field allows the hardware engines to bypass data towards end of data block and indicates the total number of bytes to be processed after bypassing SOP Bypass Length for a current packet. Value of all one's implies that all valid bytes within the current packet are processed through end-of-packet EOP from given bypass length. A value of all zero's directs a skip over the current packet so it is skipped from processing. This length is valid in the SOP chunk.

SOP Bypass Length indicates numbers of bytes to be ignored from beginning of packet before processing the data. All data before SOP bypass length is bypassed. This length is specified in bytes. This feature allows hardware engine to bypass/ignore that data at start of packet.

Further in the Command label of TABLE 4, Options Control Info specifies the length and Context RAM offset of data that is carried in option bytes. Options Control Info is decoded by selected processing engine to extract the data from option bytes and populate context RAM 570, 575. Multiple different options can be specified in single command label to pass control/messaging information to selected processing engine. Options Control Info has the following multi-bit fields:

Option-A Length specifies the length in units of 8-bytes of option-A bytes present in an Option Bytes area of a Command label. Value of 0 implies option-A is not present. Value of all 1's implies an Option-A Length of 64-bytes.

Option-A Context Offset specifies the offset in units of 8-bytes from start of engine-specific security context section (e.g., Encryption module-specific section or other module-specific section in FIG. 6 or 7) where the Option Bytes area of a Command label is written. Option-B/Option-C Length and Option-B/Option-C Context Offset have analogous meanings as noted for Option-A. Option-A is packed first, then Option-B and then Option-C and then additional options, if any.

Option Bytes holds the data as specified in the engine option bytes encoding, and used to pass in-band control or message information from control plane processing components to data plane components on a per-packet or per-chunk basis. (In-band or in-line refers to control/message signaling sent with or accompanying the data to be processed.) Each option ends at an 8-bytes boundary, and zeroes are padded to align the data if the actual bytes are misaligned. Option bytes are extracted and populated into a security context before a packet is processed so that the specified option bytes are made effective for the current data packet.

Notice that this embodiment in effect uses the bytes after the Next Engine ID not only promotes packet processing efficiency but also communicates metadata or access data to control data extraction and writing of respective option data from the Command label into the corresponding engine-specific area of a security context, such as in FIG. 6 or 7. In this way, a type of sandwiched or interlocked process embodiment partially constructs or contributes to a security context for FIG. 6 or 7 directly, and also constructs the packet (or chunk) information of FIG. 9 that includes the Command label and the Software Word SW, and then further contributes to and completes the security context for FIG. 6 or 7 using the Command label and the Software Word SW of FIG. 9. Thanks to the interlocked process, the CPPI Pre-data Control words prefixed to the packet or chunk itself are remarkably used to contribute to the security context to which the software Word associates the packet or chunk, and thereby also enhance overall system security and resistance to attack. Moreover, neither the process contribution that partially constructs the security context nor the contribution from the CPPI Pre-data Control words that completes the security context is sufficient in itself to provide a security context with which successful cryptographic processing can occur. Furthermore, the particular instruction contents and instruction sequences executed by MCE provide even a third level of security and flexibility.

Some other embodiment might provide core ID (e.g. AES, DES, Galois, etc) and crypto mode parameters as what might be called option data for a particular engine ID. The security context for Authentication block 320 is populated somewhat that way, see description of FIG. 12 and TABLE 15. By contrast, this embodiment primarily or instead uses MCE software instructions based on a remarkable instruction set described later hereinbelow to flexibly handle such matters of core ID and establishing Crypto mode in modules 310 and 370, see e.g. TABLES 13, 14 and 32. Authentication block 320 lacks MCE and MCE instructions, although it can be called by an MCE, and the security context for Authentication 320 is completed in a somewhat different way than for the Encryption 310 and Air Cipher 370. Therefore, subsystem 200 may be characterized as a mixed embodiment or as actually including two embodiments for security context formation. Moreover, in a logical topology in which the Authentication is cascaded with encryption or decryption, system security is still further enhanced by the distinct additional step in the security context formation to support authentication. Put another way, the architectural diversity in the subsystem 200 embodiment contributes to security and flexibility.

Description at this point returns to the examples of command labels themselves.

In TABLE 6, multiple command labels are cascaded to allow a packet payload to be routed to multiple data plane processing engines within a subsystem to form a logical processing chain (a multi-turn coiled logical topology, cf. FIGS. 1, 4 and 5). As noted in connection with TABLE 4, a first data block (Packet data section protected by Front packet Grow region) follows in FIG. 9 after the Command label of TABLE 6.

Comparing the particular examples represented by TABLES 4 and 6, note that TABLE 4 shows a 16-byte Option A and a 6-byte Option B. TABLE 6 shows an 8-byte Option A, a 14-byte Option B (end-padded), and then a 16-bit Option C. In both Tables 4 and 6, the column headings "Next engine select code Options Control Info" are not included in the electronic form of the command labels. Many particular examples of command labels and cascaded command labels may be established without altering a given hardware implementation of subsystem 200.

TABLE 6

CASCADED MULTIPLE COMMAND LABELS

| Next engine select code | Command Label Length | Length to be Processed | | SOP Bypass Length | Options Control Info | | |
|---|---|---|---|---|---|---|---|
| Option A byte 0 MSB byte | Option A byte 1 | Option A byte 2 | Option A byte 3 | Option A byte 4 | Option A byte 5 | Option A byte 6 | Option A byte 7 LSB byte |
| Option B byte 0 MSB byte | Option B byte 1 | Option B byte 2 | Option B byte 3 | Option 2 byte 4 | Option 2 byte 5 | Option 2 byte 6 | Option 2 byte 7 |
| Option B byte 8 | Option B B byte 9 | Option B byte 10 | Option B byte 11 | Option B byte 12 | Option B byte 13 LSB byte | Padding | |

TABLE 6-continued

CASCADED MULTIPLE COMMAND LABELS

| Next engine select code | Command Label Length | Length to be Processed | | SOP Bypass Length | Options Control Info | | |
|---|---|---|---|---|---|---|---|
| Option C byte 0 MSB byte | Option C C byte 1 | Option C byte 2 | Option C C byte 3 | Option C byte 4 | Option C byte 5 | Option C byte 6 | Option C byte 7 |
| Option C byte 8 | Option C C byte 9 | Option C byte 10 | Option C byte 11 | Option C byte 12 | Option C byte 13 | Option C byte 14 | Option C byte 15 LSB byte |

In TABLE 7, a Scheduler Control Word is used to hand over each data block that is being transferred from one processing engine to another within the subsystem 200. This word is used by the hardware engines to decode the length and location of packet and security context along with other control information. This Scheduler Control Word is uniformly used by the hardware engines to communicate and pass each data block to each other, so PDSP is presented a reformatted, firmware-friendly view of this word. Notice that such passing in an embodiment can occur in the sense of control, with or without actually transferring a data block between different storage spaces within the subsystem 200.

TABLE 7

SCHEDULER CONTROL WORD

| FIELD NAME | DESCRIPTION |
|---|---|
| Block Data Length | Number of actual valid bytes present in Packet Data section of FIG. 9 buffer. |
| CTL Length | Number of actual valid bytes present in CPPI Pre-Data Control Words section of buffer. |
| PS Length | This field indicates the actual valid bytes present in Trailer Info (PS word) section of buffer. |
| Block Data Offset | Number of offset valid bytes present in Front Packet Grow Region of FIG. 9 buffer, used if non-first chunk data increases due to previously captured partial bytes. |
| Ingress Port | Ingress source port, 0 = PA port, 1 = CDMA port |
| Single Chunk Packet | Single chunk packet flag. |
| Drop Packet | Drop packet bit indicates to drop current packet at Egress, hence no processing. All data processing engines record this drop bit to bypass all chunks belonging to this packet. This bit is only set by Firmware and is not altered by any data processing engine. |
| Ramidx | Ram index is multi-bit context RAM 575 address value or index used to uniquely indentify and associate security context with packet/chunks in packet RAM 265. This value is established validly for every packet chunk. |
| Error Code | Error code is used to pass error condition from data processing engine to Firmware. TABLE 8 details error codes reportable by various data processing engines. All data processing engines bypass chunks of current packet if error code is non-zero. |
| Buffer ID | Buffer ID is used to locate internal data buffer for data processing engine to use to read chunk data such as from packet RAM 265. This address or index value is established validly for every packet chunk. |
| SOP | Start of Packet, bit when set indicates that current chunk is first chunk of given packet. Actuate parsing of buffer in FIG. 9 for more extensive Pre-data information. |
| EOP | End of Packet, bit when set indicates that current chunk is last chunk of given packet. |
| Egress Status Flags | These 4 bits are used to pass CPPI Error Code from Firmware. Error Codes (TABLE 8) can be changed even at last chunk of packet. Egress module reports last-reported Egress status flag as CPPI Error Code with EOP. |
| Cmd Label Offset | These 4 bits indicate the position in units of 8-bytes of Command label within Control CTL section of buffer (FIG. 9). |
| Command | |
| Label Present | This bit informs data processing engine if Command Label is present or not. If absent, data processing engine uses info from security context to process and forward current chunk. |
| Engine ID | Current engine ID used to route data chunk within subsystem 200. |

TABLE 8

ERROR CODES GENERATION

| Error Code | Description |
| --- | --- |
| ERR_CTX SOP | Context cache lookup failed for non-SOP lookup request, e.g., SOP chunk was marked as bad. In normal operation the non-SOP lookup does not fail as CP_ACE module 510 ensures that context is not evicted until all outstanding chunks are processed. |
| ERR_DMA_OWNERSHIP | Owner bit set to Host while fetching security context from host memory 120. Host 100 ensures that owner bit is set to "CP_ACE" before queueing any packets. |
| ERR_CTX_IDRECYCLE | Host ensures security context ID is properly recycled and no outstanding packets for recycled context ID remain. There error is generated if packets lookup request appear after context has been marked as "to be torn down" and CP_ACE has not yet completed the teardown operation. See also Tear Down process in FIG. 17. |
| ERR_CTX_AUTOFETCH | If context cache module 510, 570 is operated in Auto-fetch disabled mode, then host 100 ensures that security context is cached before packets arrive for that particular context. This error is generated if Auto-fetch is disabled and no locally cached security context is found. |
| ERR_ENCR_NOCMDLBL | Encryption module 310 received SOP data chunk with no command label at least for first data chunk. |
| ERR_AUTH_NOCMDLBL | Authentication module 320 received SOP data chunk with no command label at least for first data chunk. |
| ERR_AIRC_NOCMDLBL | Air Cipher module 370 received SOP data chunk with no command label at least for first data chunk. |

Description now details the Block Manager module 380 of FIG. 1. Block Manager module 380 allocates or frees internal buffer (blocks for use as in FIG. 9) and Thread-IDs (for use as in TABLES 25-28). Within the system each respective CPPI Ingress module 210, 220 requests Block Manager 380 for allocation of buffer blocks, e.g. in Packet RAM 265, to pack an incoming packet data stream for chunking. The corresponding CPPI Egress module 270 or 280 signals Block Manager 380 to return each used buffer block back to a free pool. Similarly, each CPPI Ingress module 210, 220 requests Block Manager 380 for a thread-ID if it encounters a packet having a size that is greater than e.g. 252-bytes, and each corresponding CPPI Egress module 270 or 280 subsequently signals Block Manager 380 to free-up the allocated thread-ID when such packet is fully processed. Block Manager module 380 has one slave VBUSP bus interface for such allocate requests and free-up signaling to be made via this interface. An allocate request (VBUSP Write) to address 0x0 is deemed by the Block Manager circuit to be from PA CPPI Ingress port 210, whereas an allocate request (VBUSP Write) to address 0x08 is deemed by the Block Manager 380 circuit to be from the CDMA CPPI Ingress port 220. A Free-up request (VBUSP Read) from either PA CPPI Egress port 270 or CDMA CPPI Egress port 280 is made to address 0x0. Block Manager module 380 maintains two independent pools or storage spaces, one for PA packet flow and other for CDMA packet flow, to ensure that a stall in one of the flows does not impact the other flow. For instance, if PA Egress 270 is back-logged due to descriptor unavailability, this will only impact PA path by exhausting all available free buffers from PA pool of Block Manager 380. But CDMA Egress 280 flow will continue to receive free buffers from its dedicated pool maintained by Block Manager 380. The number of free buffers in each pool is configurable via FIG. 1 memory mapped registers MMR. Block Manager 380 ensures that at least 4 buffers (1 bank) are allocated to each pool even if MMR configuration is set to 0 buffers for the selected pool.

Returning to FIG. 8, Security Context Cache module 510 populates FIG. 1 Context RAM SCR 570 based on ingress Security Context ID and type of context, and smart-evicts and fetches security context to/from external memory 120 as and when appropriate. Hardware based lookup of cached security context from context RAM 570, 575 increases speed of performance. The Context Cache module 510 supports two tiers of context. First Tier contexts have permanent residence in context RAM 570, 575 until affirmatively evicted (TABLE 9) by a processor such as Host external to module 510 and are not auto-evicted by module 520 therein. The module 520 can force eviction and force teardown of a security context by an auto-eviction process on contexts other than First Tier. The processes of populating and evicting of a security context are supported by and have associated memory management register MMR fields, see e.g. TABLES 23-24. An Ownership bit (TABLE 10) for cache coherency is checked and updated.

In FIG. 8, Security Context Cache module 510 of FIG. 1 operates to auto-fetch security context from external memory 120 and associates the security context with an ingress packet using SCPTR. This context cache module 510 beneficially allows any number of simultaneous security connections by not only caching up to a limited number of contexts on-chip (in subsystem 200 blocks 570, 575) but also fetching other contexts as and when requested for processing. Context cache module 510 does the task of fetching and associating a security context with each ingress packet. Context cache module 510 populates Context RAM 570, 575 with data to/from the external memory 120 based on the security context parameters. Context cache module 510 carries out auto-evict and auto-fetch operations to allow free space for new connections.

As discussed hereinabove, context cache module 510 allows two tiers of security connections to facilitate fast retrieval for performance critical connections. Each security context of the First Tier has permanent residence within Context RAM 570, 575 for fast retrieval and is not evicted automatically by context cache module 510. Instead, Host 100 has the option to force eviction (TABLE 9). First Tier connection is established by setting a First Tier bit (TABLE 3, in SCID) while setting up the security context. Second Tier connections are maintained or kept while space is available within Context RAM 570, 575. Then if the context RAM space becomes full, a new fetch request for a new security context automatically evicts (FIG. 8 module 520) one or more of the Second Tier connections into external memory 120 to allow free space to populate the new security context into the context RAM space. Each access request to Context Cache module 510 along with security parameter SCIDX triggers a search in an internal cache table to determine the action. If lookup 530 fails, then a DMA 520 operation is started to populate the requested security context into the context RAM space of the cache; else if lookup 530 succeeds, the already-cached version of the requested security context is used for processing the packet for which that security context is requested.

In FIGS. 1 and 8, the Context Cache hardware 510, 570, 575 employs a process to manage caching of security context. This hardware implements a four-way cache where the LSB 4-bits of SCIDX in context-ID (SCID) act as the cache way-select control. Once the cache way has been identified, then four comparisons are performed within the selected cache way to look for a security ID match. If security ID (SCIDX) matches with any of the four stored cache ways, then the security context is recognized as locally cached. But if lookup/match fails, then security context is fetched by DMA 520 using pointer SCPTR from FIG. 9 CPPI SW word 1, and the first empty cache way is marked with data from current security context. If lookup finds no empty slot within the selected cache way, then module 520 hardware evicts the last non-active security context which is non-First Tier. In order to avoid deadlock, hardware does not allow marking all four contexts within a given cache way as First Tier. The last First Tier request is ignored if remaining three contexts are First Tier. In order to efficiently use the caching mechanism, a linear incremented security context ID is used for new connections. It should be understood that other context cache policies are also feasible in various embodiments.

Context cache module 510 has or is provided with the security context pointer SCPTR (see, e.g., FIG. 9 in SW1, FIG. 6 in SCCTL, TABLE 10), and the security context ID (SCID, TABLE 3), along with control flags and other data with each cache access request by an engine 310, 320, 370, 410, or 460. Security context pointer SCPTR is a physical external memory 120 address that is used to fetch security context. The format of the security context is in FIG. 6 or 7 and the format of the security context control word SCCTL is defined in TABLE 10. SCPTR is a 64-bytes aligned system address, for instance. Security context ID (SCID) has MSB bit as First Tier bit and remaining 15-bits as security index SCIDX, see also discussion of TABLE 3. Context cache module 510 uses 15-bits security Index (SCIDX) to search an internal table for a locally cached security context. If search is successful, then the locally cached security context is used to process the packet associated to it; else a DMA 520 fetch request is issued from or based on the 32-bits security context pointer (SCPTR) to populate the requested security context from host memory 120 into internal cache memory 570, 575. Context cache module 510 supports passing control flags along with a request to it to override its default behavior. Control flags are named Force Evict, Force Tear Down and SOP.

TABLE 9 describes the action taken by context cache module 510 based on control flags Force Evict and Force Tear Down. Host 100 is programmed suitably to ensure that security context ID is properly recycled and no packets for a recycled security context ID remain outstanding.

TABLE 9:

CONTROL FLAGS FOR ACTIONS BY CONTEXT CACHE MODULE 510

Figure 17:
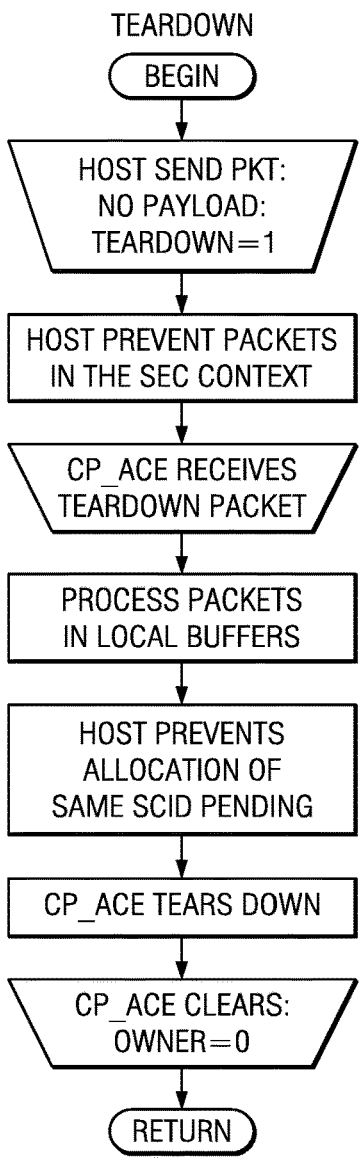
FIG. 17 is a flow diagram of an inventive process for tearing down a security context for the subsystem embodiment of FIG. 1.
Figure 18:
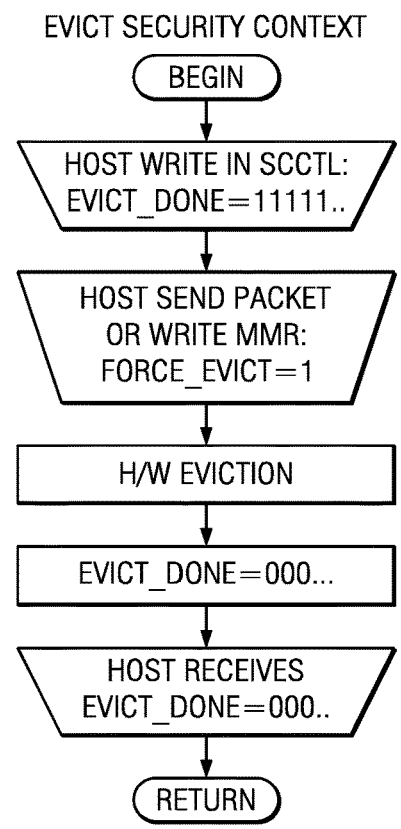
FIG. 18 is a flow diagram of an inventive process for evicting a security context in FIGS. 1 and 8 for the subsystem embodiment of FIG. 1.

| Force Evict | Force Tear Down | Action |
|---|---|---|
| 0 | 0 | Normal operation |
| 0 | 1 | Teardown current security context after all outstanding packets within CP_ACE system 200 pertaining to this particular security context have been processed. In this mode context, cache module 510 clears Owner bit in SCCTL header in external memory 120 thereby handing security context ownership back to Host 100. Clearing of Owner bit by hardware 520 is indication to Host 100 that Teardown operation has been completed. For instance, context cache module can write 32 bytes and then clear the Owner bit. See also FIG. 17 illustrating Teardown. |
| 1 | 0 | Evict current security context to external memory 120 after all outstanding packets within CP_ACE system 200 pertaining to this particular security context have been processed. In this mode, context cache module 510 looks at Evict PHP Count in SCCTL to determine the numbers of bytes (0, 64, 96 or 128) to be evicted. Clearing of Evict Done bits by hardware 520 is indication to Host 100 that Evict operation has been completed. Evict operation will free a currently-occupied context cache 570, 575 location. See also FIG. 18 illustrating eviction process. |
| 1 | 1 | Teardown and Evict current security context after all outstanding packets within CP_ACE system 200 pertaining to this particular security context have been processed. In this mode, context cache module 510 clears Owner bit and Evict Done bits in SCCTL header in external memory 120 thereby handing security context ownership back to Host 100. Clearing of Owner bit and Evict Done bit by hardware 520 is indication to Host 100 that Teardown/Evict operation has been completed. In this mode, Context Cache module 510 looks at Evict PHP Count in SCCTL to determine the numbers of bytes (0, 64, 96 or 128) to be evicted. If Evict Count is 0, then context cache module 510 writes 32-bytes and then clears the Owner bit. See also both FIGS. 17 and 18. |

The security context structure in host memory 120 (DDR3/L2 e.g., 3550, 3520.3 in FIG. 20) is fetched by Context Cache module 510 on a demand basis. Given a particular EMIF architecture for DDR3 memory, the data structure is arranged to have maximum EMIF efficiency while fetching and updating security context. In FIG. 1, each processing engine or module (Encryption, Authentication, Air Cipher module and PHP (packet header processing) is coupled to a security context RAM SCR 570, 575 that holds the control information to process ingress data blocks. This Context RAM 570, 575 is populated by cache control module 510 of FIG. 8 by module 510 splitting, or copying and processing and adding module-specific sections to, the host unified data structure on a per-connection basis into an engine-specific data structure for storage by the context RAM 570, 575.

In TABLE 10, a first fetchable section of security context has security context control word (SCCTL, see also FIGS. 6-7 and SW word 1 in FIG. 9) that details the size, ownership and control information pertaining to security context and including an Owner bit, an Evict Done bit-field, an a Fetch/Evict control field. This information is populated by Host 100. Other SCCTL bit fields that can be provided include a SCID filled by hardware, and a SCPTR filled by hardware.

p=Packet Data
c=Context Data
f=Configuration Data
(none)=Scheduler Data.

In FIG. 10, Encryption module 310 encrypts or decrypts payload from desired offset in FIG. 9 using hardware encryption cryptographic cores. Encryption module has an AES core, 3DES core, and Galois multiplier core and a Soft Operational Modes block occupied for example by a mode control engine MCE of FIG. 11. Mode control engine MCE implements various confidentiality modes like ECB, CBC, CTR, OFB, GCM etc., as environment for and employing the AES, 3DES, or Galois multiplier core(s).

TABLE 10

SECURITY CONTEXT CONTROL WORD SCCTL

| | |
|---|---|
| Owner | Context Ownership bit, 0 = Host, 1 = CP ACE HW 200. Host 100 hands over ownership to CP_ACE 200 before pushing any packet for given context. After Teardown, CP_ACE 200 relinquishes ownership back to Host 100 by clearing this bit. Host 100 can only set this bit, CP ACE 200 can only clear the bit. Context cache module 510 monitors this bit during fetch operation. If this bit is zero (0) then the packets are marked as error and forwarded to default queue. |
| Evict Done | All 7-bits are set to zero when evict operation is completed. Controllable by either Host 100 or hardware 200. |
| Fetch/Evict Size | Host controlled. Info byte details sections within security context information to fetch /evict. Bit fields in this byte and two bits codes used by each of them:<br>Fetch PHP Bytes (2 bits)<br>Fetch Encr/Air Pass1 (2 bits)<br>Fetch Auth bytes or Encr/Air Pass2 (2 bits)<br>Evict PHP bytes (2 bits)<br>00 = Reserved<br>01 = 64 bytes<br>10 = 96 bytes<br>11 = 128 bytes |
| SCID | Security context ID, filled by Hardware. |
| SCPTR | Security context pointer, filled by Hardware. |

FIGS. 10 and 12-14 respectively detail processing engines in FIG. 1 for Encryption 310 (FIG. 10), Authentication 320 (FIG. 12), Packet Header Processing PHP 410 or 460 (FIG. 13), and Air Cipher 370 (FIG. 14). Each processing engine has pipeline stages to carry out its module-specific task(s). Multiple engines can be cascaded by using cascaded Command Labels as in TABLE 6 to realize protocol-specific end-to-end cryptographic processing, see e.g. FIGS. 4 and 5 logical topologies. The letter-code legends for lines used in FIGS. 10 and 12-14 are same as for FIG. 1:

In FIG. 1, Context RAM 570 supports processing engines in FIG. 1 for Encryption (FIG. 10), Authentication (FIG. 12), Packet Header Processing PHP (FIG. 13), and Air Cipher (FIG. 14). A data structure of TABLE 11 is stored, e.g. by IPSEC PHP 410, in the encryption module-specific section in FIG. 6 in context RAM 570 before the information is used by encryption module 310 to process a data block from FIG. 9 packets forwarded for a particular context ID (SCID). (For analogous Context RAM data structures adapted for Authentication or Air Cipher, see TABLE 15 or TABLE 16.)

TABLE 11

DATA STRUCTURE FOR ENCRYPTION MODULE USE

| Field Name | Write Access | Description |
|---|---|---|
| EncryptionModeSel | s/w (ctxctrl) | 0 = Actual crypto processing, 1 = NULL |
| Default Next Engine-ID | s/w (ctxctrl) | Bit field to Default Next engine, used if Cmd Label Absent Error is generated or Use Default Eng-ID is encountered in Cmd label. |
| EncryptionModeCtrlWord | s/w (ctxctrl) | Multiple bytes specify encryption mode processing to implement GCM, ECB, CBC, xPON CTR, NIST CTR etc. |
| EncryptionKeyValue | s/w (key) | Multiple bytes. Key used for cipher operation. This key also loadable in-band via option bytes. |
| EncryptionAux 1 | s/w (Aux 1) | Stores second key for e.g., CCM. |
| EncryptionAux 2 | s/w (Aux 2) | Used when encryption mode involves IV. |

TABLE 11-continued

DATA STRUCTURE FOR ENCRYPTION MODULE USE

| Field Name | Write Access | Description |
| --- | --- | --- |
| EncryptionAux 3 | s/w (Aux 3) | Used when encryption mode involves Nonce. |
| EncryptionAux 4 | (Aux data 4) | Stores intermediate mode control data used for next block. Not loaded from host. |
| (The above fields EncryptionAux1-4 store optional multiple bytes fields for auxiliary data. Each such Aux field can be loaded in-band. Mode control engine MCE does not alter Aux 1 and may alter Aux2-4.) | | |
| PreCryptoDataStore | h/w | Multiple bytes. The data stored in this context is used next time the context is active to create crypto block size quanta for AES/3DES engine core. |

The TABLE 11 Encryption Mode Control Word has a format set out in TABLE 12. Write access is by s/w (ctxctrl).

TABLE 12

ENCRYPTION MODE CONTROL WORD FORMAT

| Field Name | Description |
| --- | --- |
| Update Trailer | |
| In Every Chunk. | Bit, if set, updates trailer data to FIG. 9 Trailer section in every FIG. 9 chunk, including SOP chunk. |
| Update Trailer | |
| After Length Processed. | Bit, if set, updates trailer data to FIG. 9 Trailer section of buffer only after last crypto block has been processed. This trailer data is repeated for subsequent chunks of same packet. |
| Packet Data | |
| Section Update | Bit, if set, updates processed data to FIG. 9 Packet Data section of buffer. |
| Encrypt/Decrypt | Bit (0/1). |
| EncryptionBlkSize | 0 = 8 bytes, N = 8 bytes × 2^N. |
| ModeCtrlInstrOffset | 12-bits Instruction offset for SOP, MOP and EOP data block. |
| ModeCtrlInstrs | Multiple bytes for Mode Control instructions. |

In FIG. 11, a Mode Control Engine (MCE) 610 promotes a higher level of security and more flexibility to accommodate each engine or module circuit 600, e.g. for module 310 or 370 to various different encryption/decryption modes. Basic encryption processing by cryptographic cores 615.*i* is complemented with encryption operational modes by MCE 610, such as a first MCE 610.1 in module 310 and a second MCE 610.2 in Air Cipher module 370. Encryption operational modes define an additional level of processing or staging before cryptographic cores 615.*i* are engaged. Encryption operational modes are either specified by NIST publications or are defined by the application specification. Some of the NIST modes are CBC, OFB, ECB and CTR (Counter) whereas a few popular application modes are GCM, CCM, F8, CMAC etc. As more and more encryption operation modes are developed in the industry, there is need to achieve the encryption operational modes via a software controlled programmable engine that can be updated to support each new encryption operational mode. An embodiment module 600 with MCE 610 and crypto cores 615.*i* answers this need.

This programmable mode control engine MCE embodiment has a programmable micro-instructed engine to carry out Mode Processing, all as described herein, and can be updated in the field to support new modes. Some of implemented modes are ECB (Electronic code book), CBC (Cipher block chaining), CFB (Cipher feedback), OFB (Output feedback), CTR (Counter), F8, F9, CBC-MAC (Cipher block chaining-Message authentication code), CCM (Counter with CBC-MAC), GCM (Galois counter mode), GMAC, and AES-CMAC.

The MCE hardware embodiment 600 of FIG. 11 creates an environment around native cryptographic cores 615.*i* (AES, 3DES, Galois multiplier, etc. in FIG. 10) that allows additional software- or firmware-defined custom processing before or after crypto processing by the native cores 615.*i*. MCE 610 also enables storing of parameters for subsequent rounds of execution, thereby conferring the ability to process crypto data based on a previous round (history) rather than based on only current round. Note in FIG. 11 the two-way register access between control plane and data plane, such as for monitoring and control.

In FIG. 11, this remarkable mode control engine MCE handles mode processing via a programmable engine that provides flexibility of realizing various types of cryptographic mode processing while at the same time delivering performance beyond or greatly exceeding that of a general purpose programmable processor. Mode control engine MCE programmably sequences or schedules various logical, arithmetic and cryptographic operations to achieve, e.g., a specified confidentiality mode and continually keeps one or more cryptographic hardware cores engaged. MCE is fast because it creates an environment around and uses one or more of these fast, native hardware cryptographic (Crypto) cores (AES, 3DES etc). MCE is flexible and economical of chip real estate because MCE programmably executes firmware (see, e.g., discussion of FIG. 22) based on an instruction set (TABLE 13) specifically for cryptographic application, and that permits updates to add custom processing before or after crypto processing by the Crypto core(s). MCE also enables storing of parameters for subsequent rounds thereby conferring the ability to process crypto data based on each previous round (history) rather than based on only a current round.

In FIG. 11, the MCE has an MCE core 610 including decode logic and execute logic that respectively decodes and executes micro-instructions of TABLE 13, which are devised especially for cryptographic mode processing. Sequences of these micro-instructions are loaded beforehand into the Instruction Array block 605 and are accessed by the decode logic. The execute logic is supported by an ALU (arithmetic logic unit) and a Register Bank 620 in the MCE core. Bit fields from the instructions in the instruction array 605 or instruction decoder, and controls decoded from an instruction by the instruction decoder, can be suitably transferred directly to any other block in the MCE as appropriate to effectuate any operations that the instructions are coded to represent. Crypto core scheduler logic is provided in the MCE core 610 to respond to instructions and to handshake with Crypto cores 615.i.

In FIG. 11, notice the structural parallelism in the MCE hardware to support the control plane and data plane structures of MCE. Context data and configuration data (c, f) are fed by a first MCE input bus from context RAM 570, 575 to a Crypto Context Data input storage block 640 that in turn is coupled to the Register Bank 620. Packet data (p) are fed by a second MCE input bus to an Input Data Block 650. A first MCE output (c, f) bus emanates from a Crypto Context Data output storage block 660 that in turn is coupled to and fed from the Register Bank 620. A second MCE output bus emanates from a Processed Data Block 670 and conveys processed data (p) from MCE core or its Crypto cores. A Crypto Padding Logic block 680 is also controlled by the MCE core and Proc_Pad instruction and selectively couples the MCE core to any one, some or all of its Crypto cores, and padding operation is supported when appropriate. (In FIG. 10 particular crypto cores are coupled to MCE, e.g., as shown in FIG. 11. In FIG. 14, another such MCE as in FIG. 11 is coupled with AES, Kasumi, and Snow3G cores instead.) A shared data bus 630 of MCE is controllably used to couple (or isolate) any two, several or all six of the Crypto Context Data input block 640, Register Bank 620, Input Data Block 650, Crypto Context Data output block 660, Processed Data Block 670, and the Crypto Padding Logic 680. In all these ways the control plane and data plane structures are endowed with controllably parallel operations for data transfers respective to each of them.

The sequences of micro-instructions tune the operations of flexible hardware of FIGS. 10-11 at run-time to implement a given mode which may include cryptographic algorithmic processing (AES, 3DES etc). These micro-instructions can be altered or added while a device with MCE is in the field to endow MCE with newly defined modes.

Each instruction is e.g., 12-bits wide, where the first 4-bits are the opcode and remaining 8-bits serve as operands. The instructions execute sequentially for every encryption block and the data-out is produced at the last instruction. Since the start, middle and end of block (SOP, MOP, EOP) in a packet may need a different sequence of operations, Mode Control Engine also allows three different starting points for instructions execution.

In FIG. 11, MCE parallel processes the mode operations with native cryptographic core processing. It uses 128-bit registers and 128-bits arithmetic operations to realize a specified operational mode. MCE also can trigger multiple cryptographic engines and cores (e.g., AES, 3DES and Galois multiplier of FIG. 10) on same data block to achieve confidentiality processing (encryption 310) and source authentication (hashing 320) in a single MCE pass.

An assembler process for MCE is described later hereinbelow using FIGS. 21-22.

MCE is a programmable engine that sequences various logical and arithmetic operations to achieve each encryption operational mode with high performance. Encryption mode operation is specified by EncryptionModeCtrlWord of TABLES 11-12 that has the format of TABLE 12 and is stored within the encryption module-specific section of the security context of FIG. 6. Security context holds the instructions for Soft Mode Control Engine to specify the sequence of logical operation to achieve each desired encryption operational mode.

EncryptionModeCtrlWord, detailed in TABLE 12, is made up of offset fields ModeCtrlInstrOffset and an actual instructions field ModeCtrlInstrs. The ModeCtrlInstrOffset offset fields are: SOP offset (4-bits), MOP (Middle) offset (4-bits), EOP offset (4-bit). The actual instructions field ModeCtrlInstrs holds a Mode Control engine MCE instruction with a number of bits given by (MaxModeInstr*12) bits, e.g. with MaxModeInstr is set to 16. (This MaxModeInstr can be instantiated as the size of the Instruction Array hardware, or alternatively in some embodiments be included as a parameter MaxModeInstr in EncryptionModeCtrlWord.) Because the mode processing is different (as described for FIG. 22) for start of packet SOP, middle packet MOP, and end of packet EOP, soft Mode Control Engine MCE allows three different starting points for instructions execution. These starting points are specified in SOP offset, Middle offset and EOP offset, e.g., bit fields in ModeCtrlInstrOffset of TABLE 12.

In FIG. 11, the Mode Control engine MCE has four 128-bit registers that are used as a buffering Register Bank 620 as well as TABLE 13 instruction-specifiable processing registers Reg0-3. These registers also receive the FIG. 11 context "c" information such as TABLE 11 "Data-in" (EncryptionModeSel, Default Next Engine-ID, EncryptionModeCtrlWord) via context RAM 570 and Crypto Context Data register 640 from PHP 410 or 460 or Host 100 to realize any mode function. These registers also receive FIG. 11 configuration data "f" as crypto parameters in TABLE 11 like Key (EncryptionKeyValue), EncryptionAux 1, EncryptionAux 2, EncryptionAux 3. On every new round, the Data-in (e.g., Plaintext) is automatically loaded into register Reg0, and similarly the EncryptionAux 1, Aux 2, Aux 3 are auto-loaded to registers Reg1, Reg2 and Reg3 respectively. EncryptionAux 4 restores the value of register Reg3.

Depending on embodiment or configuration, the Data-in can be auto-loaded as a predetermined number of data bytes (e.g. 16 bytes as in TABLE 32) for processing. This means that in some embodiments fewer than all the packet data bytes (e.g. 256 bytes in Packet Data section of FIG. 9) are processed in each round, so that multiple rounds are used to process a chunk in such cases. Also, the embodiment of FIG. 1 can process an e.g. 16-byte portion of one chunk while concurrently processing a respective other 16-byte portion of that chunk or each of one or more other chunks in other engines or cores in subsystem 200. Various other embodiments may process all the Packet data bytes in a chunk in one round or even process all the Packet data bytes in more than one chunk in one round.

The MCE instructions as described using TABLE 13 are carefully devised keeping various encryption operational modes in view to balance the architectural and computational complexity and performance.

In FIG. 11, Instructions for MCE arrive via an Instruction Array or buffer and are passed to the instruction decoder in MCE. The following TABLE 13 teaches and describes the remarkable instructions and their instruction format according to which the instruction decoder of mode control engine MCE of FIG. 11 is straightforwardly implemented to convert any instruction to control signals for execution circuits that themselves, and/or together with a scheduler for the hardware crypto cores, electronically carry out the operations that each instruction is coded to represent. Each instruction is 12-bits wide, where the first 4-bits are opcode and remaining 8-bits serve as operands. This regularity in the instruction width and format of all instructions allows structuring the instruction store in rectangular form of an Instruction Array in FIG. 11 as well as economical, swift decoding of instructions from the Instruction Array by the Decode logic. The first column in TABLE 13 is opcode, followed by three fields that can be used to specify source and destination. Certain instructions like WAIT OUT are special instructions that are geared towards performance and carry out multiple operations in a single cycle.

Among its other remarkable instructions, the MCE has PROC, PROC_MASK and PROC_PAD instructions that orchestrate the hardware crypto cores that the MCE programmably controls. PROC, PROC_MASK, and PROC_PAD instructions activate the MCE Crypto Core Scheduler circuit in FIG. 11 to cause instruction-designated crypto core(s) to operate and handshake with the Crypto Core Scheduler Circuit. PROC_PAD also activates the Crypto Padding Logic in FIG. 11. WAIT, OUT and OUTSET are a trio of instructions that interrelate MCE operations and crypto core operations as described in the tabulation and use the handshake with the Crypto Core Scheduler Circuit.

The remarkable PROC_MASK instruction in encryption module's MCE engine (FIG. 11) supports partial bytes in GCM mode, such as for WiMax mesh networking. A remarkable pad instruction PROC_PAD is provided in the MCE engine to ease, or reduce burden on, Firmware from padding.

Furthermore, a JUMP instruction is remarkably based on packet logic responsive to: SOP, MOP, EOP, or Not-EOP. JUMP circuitry has a SOP detector, MOP detector and EOP detector coupled to the packet buffer and/or register associated therewith. The Field0 value for SOP, MOP, EOP or not-EOP in the JUMP instruction is decoded to provide an enable for the respective SOP detector, MOP detector and EOP detector. The MCE has a Program Counter (PC) that ordinarily is incremented by MCE clock to generate addresses to MCE instruction array RAM space, thereby to sequence through the MCE software program. When a JUMP instruction is encountered in the program, the enabled SOP detector, MOP detector or EOP (or Not-EOP) detector provides an output signal active. That detector output signal enables a jam circuit that jams the jump address in, or pointed to by, the JUMP instruction into the Program Counter (PC) of the MCE to cause a jump by MCE to the jump address. Specifically, in the tabulated JUMP instruction of TABLE 13, the jump address is formed by an adder that increments the PC by an instruction Offset value in fields 2 and 1 of the JUMP instruction. TABLE 12 or 17 can also provide a bit field ModeCtrlInstrOffset defining Offset for SOP, MOP and EOP data block. Some embodiments provide the detectors as comparators associated with a packet parser that finds a SOP, MOP or EOP packet field. Some embodiments provide a MOP detector as logic that responds after SOP has occurred and currently not-SOP and not-EOP for the packet. Another embodiment has a MOP detector as a comparator fed with a packet byte counter so that that detects when the data stream for the packet has reached a certain programmed byte-count value in a field of TABLE 12 or 17 representing a particular position that indicates e.g., MOP as start-of-payload or some other significant MOP position in the packet or offset from starting byte of the packet. Logic detects if that bit field is non-zero, and if so, uses that bit-field instead of a default value for the comparator. In any of these ways, the remarkable MCE with its special JUMP instruction facilitates processing of packets where the desired operations are specific to, or depend on, the SOP, MOP, and EOP position or status in a packet. An unconditional (Always) jump code can also be put in Field0.

The MCE instruction set (ISA) combines with the foregoing a powerful set of ALU instructions for bit-wise XOR, AND, OR, and INC; a shift instruction LSFT; two load instructions CP (copy) and LD (load), and no-op NOP. Bit-wise XOR is important, among other things, for providing XOR for crypto operations as well as using XOR to perform a comparison. An instruction is called blocking that pauses MCE core until a given Crypto core signals Done, and a non-blocking instruction leaves MCE core free to run during execution by a Crypto core.

In an example TABLE 13, the Mode Control Engine (MCE) has 16 instruction opcodes assigned distinct binary values. See also assembler example TABLE 32 with FIGS. 21-22 description later hereinbelow. Each opcode has multi-bit fields Field2, Field1, Field0. To avoid repetition of verbiage in TABLE 13 note that, unless otherwise, Field 2 throughout TABLE 13 can indicate a destination (Dst) register Reg0, 1, 2, 3 by a corresponding 2-bit representation. Also, unless otherwise, Fields 1, 0 throughout TABLE 13 can each indicate a particular one of multiple Source 2 (Src2) or Source 1 (Src1) categories each with four registers Reg j=0, 1, 2, 3 and with j=4=Key[127:0] or j=5=Key[255: 128] by corresponding multi-bit representation. (Numerals like j=0, 1, 2, 3, . . . 7 represent possible values j for an entry to a given Fieldi, a particular such value j electronically entered with j in binary form.) Depending on the applicable EngineID (encryption 310, authentication 320, air cipher 370) to which the MCE OUTSET information pertains, references to an Aux in TABLE 13 refer to an EncryptionAux of TABLE 11, an AuthenticationAux of TABLE 15 or to an AirCipherAux of TABLE 16.

TABLE 13

INSTRUCTION FORMAT FOR MODE CONTROL ENGINE MCE
Opcode (4-bits) Field2 (2-bits) Field1 (3-bits) Field0 (3-bits) Description

| | |
|---|---|
| PROC | Process instruction to activate selected crypto core using data from Src1 for crypto processing. Use Src2 for Core-and-Key Select to select crypto processing core along with Key select, whereas Core-Misc provides data to selected crypto core of a module where MCE resides- -see TABLE 14 (or TABLE 18 for Air Cipher). PROC is a non-blocking command thereby providing ability to prepare for next round while selected crypto core executes. |

TABLE 13-continued

INSTRUCTION FORMAT FOR MODE CONTROL ENGINE MCE
Opcode (4-bits) Field2 (2-bits) Field1 (3-bits) Field0 (3-bits) Description

| | |
|---|---|
| PROC_MASK | Same as PROC except output data of PROC_MASK is masked based on actual valid bytes present that particular round.<br>Field2: Core-Misc, see TABLE 14 (or TABLE 18 for Air Cipher).<br>Field1 : Core-and-key select; TABLE 14; or TABLE 18 for Air Cipher.<br>Field0: Src1: 0 = Reg0, 1 = Reg1, 2 = Reg2, 3 = Reg3, 4 = Key[127:0], 5 = Key[255:128]. |
| PROC_PAD | Applies selected padding to last block of packet based on number of valid bytes in last crypto block. Executed with FIG. 11 Crypto Padding Logic 680.<br>Field2: Dst Reg0-3.<br>Field1 : Padding sequence. 0 = 000 . . . , 1 = 010 . . . , 2 = 1000 . . . ,3 = 1100 . . .<br>Field0: Src1: 0 = Reg0, 1 = Reg1, 2 = Reg2, 3 = Reg3. |
| WAIT | Blocking instruction until crypto core finishes the current run, whereupon Src1 is stored to Dst. WAIT Field1 entry can also be 6 = Data from crypto core. WAIT Field0 entries are either 6 = Data from crypto core, or 7 = Data from crypto core XOR'ed with Src2 (Field 1). |
| OUT | Outputs all the fields (IV, nonce, data-out) as pre-set by OUTSET instruction thereby completing the current iteration. OUT is last instruction executed for a current run of MCE. |
| WOUT | WAIT and OUT are combined for high performance.<br>Also called WAIT_OUT. |
| OUTSET | Sets source that goes out as Aux 3, Aux 2 and data-out. Non-blocking instruction thereby gives ability to prepare the output before Done is sensed from crypto core. If WAIT_OUT is next after OUTSET, blocks until crypto core issues Done. When Done, all fields are output from crypto core and current iteration is marked as complete. OUTSET is executed as last instruction for current run of MCE. Field2, 1, 0 are specified as follows.<br>Field 2: Aux-3 Select: 0 = Reg0, 1 = Reg1, 2 = Reg2, 3 = Reg3.<br>Dst Reg: 0 = Reg0, 1 = Reg1, 2 = Reg2, 3 = Reg3.<br>Field1: Aux-2 Select: 0 = Reg0, 1 = Reg1, 2 = Reg2, 3 = Reg3.<br>4 = Data from crypto core.<br>5 = WAIT_OUT instruction Src1 XOR'ed with WAIT_OUT instruction Src2.<br>6 = Data from crypto core XOR'ed with WAIT_OUT instruction Src1.<br>7 = Data from crypto core XOR'ed with WAIT_OUT instruction Src2.<br>0 = Reg0, 1 = Reg1, 2 = Reg2, 3 = Reg3,<br>4 = Aux1[127:0], 5 = Aux1[255:128],<br>6 = Data from crypto core, 7 = Zeroes.<br>Field0: Same way as Field1 above except provides Dataout-select instead of Aux-2 Select; and Src2 code 7 instead means Data from crypto core XOR'ed with Src2. |
| JUMP | Jump instruction. Fields 2, 1 form Immediate value, instruction offset. Field0 is a Condition code: 0 = Always, 1 = Jump if SOP, 2 = Jump if MOP, 3 = Jump if EOP, 4 = Jump if no EOP. |
| XOR | Bitwise-XOR Src1 with Src2 and store result in Dst. |
| AND | Bitwise-AND Src1 with Src2 and store result in Dst. |
| OR | Bitwise-OR Src1 with Src2 and store result in Dst. |
| CP | Copy Src1 content to Dst. (Src2 not involved.) |
| INC | Increment value in Src1 and write to Dst. |
| LD | Immediate instead of Src2, 1. Load Dst with constant value. |
| LSFT | Left shift Src1 based on Shift value in Src2. |
| NOP | No operation instruction. |

TABLE 14

CORE AND KEY TABLE FOR PROC_MASK INSTRUCTION
OF MCE IN ENCRYPTION MODULE

| Core and Key Select [3bits] (Field1) | Core-Misc [2bits] (Field2) |
|---|---|
| [2:0] = 0 => Null | 00 |
| [1:0] = 1 => AES Core | 00 = 128 bits key |
| [2] = 0 => AES Key from Key-in | 01 = 192 bits key |
| [2] = 1 => AES Key from Aux 1 | 10 = 256 bits key |
| [1:0] = 2 => DES/3DES | |
| [2] = 0 => DES/3DES Key from Key-in | 00 = DES mode |
| [2] = 1 => DES/3DES Key from Aux 1 | 01 = 3DES mode |
| [1:0] = 3 => Galois Multiplier core | |
| [2] = 0 => Galois Key from Key-in | 00 |
| [2] = 1 => Galois Key from Aux 1 | |

Note:
Aux 1 refers to EncryptionAux 1 of TABLE 11 and in Encryption module-specific section of Security Context of FIG. 6. Regarding Key-in, see TABLE 11 EncryptionKeyValue and TABLE 13 Key[:].

In FIG. 12, Authentication module 320 provides data integrity protection and source authentication to security packets. The authentication subsystem hosts SHA1, MD5, SHA2-224 and SHA2-256 hashing hardware cores to compute a digest that is used for data integrity checks. Authentication module 320 also supports keyed hashed computation as per HMAC to provide source authentication used with any of the supported hardware hashing cores.

For high performance, particularly for small packets, some embodiments only support HMAC from pre-computed inner/outer hash. The host 100 processor carries out an initial key preparation stage to generate an inner pad and outer pad. Suitable data structure and sequence of processing are provided and implemented.

The data structure is stored beforehand by PHP 410 or 460 or by Host 100 in Context RAM 570 for use by the Authentication module 320. Authentication module 320 uses this information to process the FIG. 9 data block when packets are forwarded for a particular Security Context ID. TABLE 15 sets forth a data structure example. See also the Authentication module-specific section in FIG. 6, or applicable Air Cipher integrity section in FIG. 7.

In some other embodiments, Authentication module 320 is also provided with its own processor such as MCE for handling or controlling involved authentication operations now and in the future. FIG. 12 economically lacks such MCE.

TABLE 15

DATA STRUCTURE FOR AUTHENTICATION MODULE 320

| Field Name | Write Access | Description |
|---|---|---|
| AuthenticationModeSel | s/w (ctxctrl) | Bit: 1 = NULL, 0 = Actual Hash processing. |
| Default Next Engine-ID | s/w (ctxctrl) | Multi-bit. Default Next engine, used if Cmd Label Absent Error is generated or Use Default Eng-Id is encountered in Cmd label. |
| AuthenticationSWControl | S/w(ctrl) | Bit fields:<br>Bit A: Upload hash every chunk.<br>1 => Upload hash in Trailer section of every data chunk. Initial data chunks will have partial computed hash.<br>0 => do not upload Trailer section in every chunk.<br>Bit B: Computed hash upload control.<br>1 => Upload computed hash to Trailer TLR section only after complete specified length has been processed. Completed hash repeated for all subsequent chunks in same packet.<br>0 => Do not upload computed hash to Trailer TLR section of buffer.<br>Bit C: HMAC or basic hash. 0 => HMAC, 1 => basic hash bits.<br>Bits D: Authentication core select field selects core for authentication operation.<br>0 => NULL, 1 => MD5, 2 => SHA1, 3 => SHA2-224 , 4 => SHA2-256. |
| AuthenticationLength | S/w(ctrl) | Multiple bytes.<br>1 = Authentication length is overridden for EOP packet or chunk via firmware.<br>0 = Let hardware calculate the length based on actual bytes hashed. |
| AuthenticationKey Value | s/w (key) | Multiple bytes. Master Key or Pre-computed inner digest for HMAC Hash(Key XOR Inner Constant). The inner pad is padded to 256 bits by adding padding bits towards LSB. |
| AuthenticationAux1 | s/w (Aux 1) | Optional Multiple bytes. Pre-computed outer pad 'opad' for HMAC, hash carries over opad, i.e. Hash(Key XOR Outer Constant). Outer digest is padded to 256 bits by adding padding bits towards LSB. |
| AuthenticationAux2 | s/w (Aux 2) | Optional multiple-bytes field stores partial hash if current block lacks complete packet. This value is restored into authentication core when next block of same packet is active. |
| PreCryptoDataStore | h/w | Multiple-bytes data to be stored in this context that is used the next time the context is active to create crypto block size quanta for the AES/3DES and/or SHA/MD5 engine. |

An Air Cipher PHP 460 structure for the control plane is the same as or similar to that of IPSEC PHP 410 of FIG. 13, so FIG. 13 is re-used as a diagram of Air Cipher PHP 460 with analogous description except for Air cipher processing.

In FIG. 14, Air cipher module 370 provides an Air cipher interface that carries out the task of encrypting/decrypting FIG. 9 payload consistent with 3GPP air interface security. The air cipher subsystem 370 does data plane processing using AES, Kasumi or Snow3G cores. Software-operable Mode Control Engine MCE is re-used from or analogous to MCE in encryption subsystem 310 to allow F8, CBC or F9 processing using Kasumi, AES or Snow3G mode.

To support Air Cipher module 370 processing of a FIG. 9 data block, Air Cipher PHP 460 (or Host 100) stores a data structure for the applicable inbound or outbound Air Cipher module-specific section of FIG. 7 beforehand in context RAM 570 of FIG. 1 before FIG. 9 packets or chunks are forwarded to Air Cipher module 370 for a particular Security Context ID. This data structure to support Air Cipher is detailed in TABLE 16. The reader may compare and contrast TABLE 16 with the separate data structure TABLE 11 in RAM 570 and FIG. 6 for supporting encryption module 310.

TABLE 16

DATA STRUCTURE FOR AIR CIPHER MODULE 370

| Field Name | Write Access | Description |
|---|---|---|
| AirCipherModeSel | s/w (ctxctrl) | Bit: 0 = Actual crypto processing, 1 = NULL. |
| Default Next Engine-ID | s/w (ctxctrl) | Multi-bit Default Next engine, used if Cmd Label Absent Error is generated or Use Default Eng-ID is encountered in Cmd label. |
| AirCipherModeCtr1Word | s/w (ctxctrl) | Multiple bytes specify AirCipher mode processing for modes: GCM, ECB, CBC, xPON CTR, NIST CTR, etc. See TABLE 17. |
| AirCipherKeyValue | s/w (key) | Multiple bytes used for cipher operation. This key can also be loaded in-band via option bytes. |
| AirCipherAux 1 | s/w (Aux 1) | Optional multiple bytes field used to store auxiliary data to support Air Cipher modes like CCM to store second key. Can be loaded in-band via option bytes in Cmd label. Mode control engine MCE cannot alter the value of this field. |
| AirCipherAux 2 | s/w (Aux 2) | Optional second Aux multiple bytes field used if AirCipher mode involves IV. This value is alterable by Mode Control Engine MCE and loadable in-band via option bytes. |
| AirCipherAux 3 | s/w (Aux 3) | Optional third Aux data multiple bytes field used if the AirCipher mode involves Nonce. This value is alterable by Mode Control Engine MCE and loadable in-band via option bytes. |

TABLE 16-continued

DATA STRUCTURE FOR AIR CIPHER MODULE 370

| Field Name | Write Access | Description |
| --- | --- | --- |
| AirCipherAux 4 | (Aux data 4) h/w | Multiple bytes Aux data 4 to store intermediate mode control data to be used for next block. This space cannot be loaded from main host, but can be loaded in-band via option bytes. |
| PreCryptoDataStore | h/w | Multiple bytes data to be stored in this context that is used the next time the context is active to create crypto block size quanta for AES/Kasumi/Snow3G engine. |

TABLE 17 tabulates the format of the important TABLE 16 word designated AirCipherModeCtrlWord.

TABLE 17

FORMAT OF AirCipherModeCtrlWord

| Field Name | Description |
| --- | --- |
| Update Trailer | |
| In Every Chunk. | Bit, if set, updates trailer data to FIG. 9 Trailer section in every FIG. 9 chunk, including SOP chunk. |
| Update Trailer | |
| After Length Processed. | Bit, if set, updates trailer data to FIG. 9 Trailer section of buffer only after last crypto block has been processed. This trailer data is repeated for subsequent chunks of same packet. |
| Packet Data | |
| Section Update | Bit, if set, updates processed data to FIG. 9 Packet Data section of buffer. |
| Encrypt/Decrypt | Bit (0/1). |
| EncryptionBlkSize | 0 = 8 bytes, N = 8 bytes × 2^N. |
| ModeCtrlInstrOffset | 12-bits Instruction offset for SOP, MOP and EOP data block. |
| ModeCtrlInstrs | Multiple bytes for Mode Control instructions. |

In FIG. 14, the Air Cipher data plane module 370 somewhat resembles the Encryption module 310 of FIG. 10. Air Cipher module 370 has an In-Packer and Out-Packer flanking a central execution core Air_core_top. This execution core has a Soft Operational Modes block. For this block, a soft Mode Control Engine MCE like that in FIG. 11 and TABLE 13 is provided to achieve a high level of security, but wherein Air cipher encryption by AES, Kasumi, or Snow3G hardware cryptographic cores is mostly complemented with Air Cipher operational modes, which the flexible MCE in FIG. 14 readily establishes. The Air Cipher operational modes define an additional level of processing or staging before the cryptographic cores are engaged. The flexibility of MCE beneficially complements the speed of the cryptographic cores. Air Cipher operational modes that can be specified for module 370 include the NIST modes CBC, OFB, ECB and CTR(Counter), and some other supported application modes are CCM, F8, CMAC etc. (See AirCipherModeCtrlWord in TABLES 16-17.) As more and more air cipher operation modes are developed in the industry, mode control engine MCE answers a need to achieve the air cipher operational modes flexibly via its software controlled programmable engine that can be updated to support new air cipher operational modes. MCE is a programmable engine that sequences various logical and arithmetic operations to achieve air cipher operational modes with high performance essential to execute such modes flexibly.

Air Cipher mode operation is specified by AirCipherModeCtrlWord (see TABLES 16, 17 and 12) that is stored in Context RAM 570 as part of the security context that holds the instructions for soft Mode Control Engine in FIG. 14 and FIG. 11 to specify the sequence of logical operation to achieve each desired air cipher operational mode.

Details of Mode Control Engine MCE for Air Cipher module 370 of FIG. 14 and its instruction format are the same as in the description of FIG. 11 and are the same as in TABLE 13 except that the PROC_MASK instruction for Air Cipher MCE in FIG. 14 is specified using TABLE 18 Core and Key select information to support TABLE 13 description of the instruction set.

TABLE 18

CORE AND KEY SELECT FOR PROC_MASK INSTRUCTION OF MCE IN AIR CIPHER MODULE 370

| Core and key select (3-bits) (Field1) | Core-Misc (2bits) (Field2) |
| --- | --- |
| [2:0] = 0 => Null | 00 |
| [1:0] = 1 => AES Core | 00 = 128 bits key |
| [2] = 0 => AES Key from Key-in | 01 = 192 bits key |
| [2] = 1 => AES Key from Aux 1 | 10 = 256 bits key |
| [1:0] = 2 => Kasumi Core | |
| [2] = 0 => Kasumi Key from Key-in | 00 for all |
| [2] = 1 => Kasumi Key from Aux 1 | |
| [1:0] = 3 => Snow3G core | |
| [2] = 0 => Snow3G Key from Key-in | [0] = 1 => Init Key |
| [2] = 1 => Snow3G Key from Aux 1 | [1] = 1 => Store Snow3G state |

Note:
Aux 1 refers to AirCipherAux 1 of TABLE 16 and in Air Cipher module-specific section of Security Context of FIG. 7.

The FIG. 14 Snow3G core in Air Cipher module 370 saves and restores an internal state of, e.g., 76-bytes while processing intermediate chunks. Hence, this 76-bytes state value is stored in an Authentication part (EngineID=Authentication Module code-value) of the security context (See FIG. 6). Air Cipher 370 using Snow3G core uses the encryption section (engine ID=Encryption Module code-value). As part of key initialization for Snow3G core, a multi-byte IV (Initialization Vector for key derivation) is picked or obtained from register Reg1 of MCE register bank 620. Therefore, MCE instructions ensure that an Initialization Vector IV is stored at register Reg1 before issuing a PROC instruction (TABLE 13) that involves key initialization.

Returning to FIG. 13, each Packet header processor (PHP) Module 410 or 460 is part of the control plane of FIG. 1 that parses and inspects security headers to establish the sequence of processing to be carried out on the packet. The Header processing PHP subsystem hosts a PDSP RISC CPU to carry out control plane operations. PDSP Pro in FIG. 13 is connected to tightly coupled memories to allow faster access to packet data. Packet header processor PHP module has an instruction RAM that is populated by host 100 as part of initialization. This firmware holds the control plane code as per IPSEC, SRTP or 3GPP standards to parse and inspect ingress packet headers.

A Descriptor information word (see FIGS. 2, 3 and 9) provides control information about the current data chunk thereby providing various lengths and other fields. The format and definition of each field is suitably specified.

In FIG. 13, the PHP module is complemented with security context viewer module that provides a rolling window view of the security context. This allows easy access and update of security context data to PDSP firmware as the window is directly mapped to PDSP registers.

Following are the commands that can be issued by PDSP to adjust the position of window and indicate DONE to the security context viewer module Context Viewer in FIG. 13. A security context viewer command register has one byte designated Offset and another byte designated Operation. The Offset byte specifies an offset (e.g., 0 to 255) from start of security context (FIG. 6 or 7) where the window is to be positioned. The Operation byte specifies a command code signaling the type of operation to perform: SCV_CMD_POSITION_WINDOW 0x1, and SCV_CMD_DONE 0x2. (SCV refers to the security context viewer.)

Context RAM 570 of FIG. 1 also supports the PHP module of FIG. 13 with a data structure of TABLE 19 pre-stored by Host 100 or Context Cache Module 510 in the Context RAM 570 before packets are forwarded for a particular Security Context ID. The data structure information is in the PHP module-specific section in FIG. 6 or FIG. 7 and is used to process the data block using the information in TABLE 19.

TABLE 20

SYSTEM CONSTANTS FOR ADDRESS RANGES

| C0 | Scratch1_LRAM0 BASE |
|---|---|
| C1 | Scratch2_LRAM1 BASE |
| C20 | TRNG True Random number generator base address |
| C21 | PKA Public key accelerator base address |

The following constants hold pairs of ranges for PHP1 and PHP2. PHP2 Ditto for each of these:

| C6 | PHP1 CDE_Sideband RXPKT |
|---|---|
| C7 | PHP1_CDE_Sideband TXPKT |
| C8 | PHP1_CDE_Sideband HELDPKT |
| C10 | PHP1 Random Number FIFO control Block |
| C11 | PHP1 Packet Instance Base Address |
| C12 | PHP1 Temporary storage of Aux (ICV) Data |
| C13 | PHP1 Temporary storage of Command Label Table |
| C14 | PHP1 Global Statistics |
| C15 | PHP1 Random Number FIFO base address |
| C16 | PHP1 IPSEC ESP Tx Command Label Processing Table |
| C17 | PHP1 IPSEC ESP Rx Command Label Processing Table |
| C18 | PHP1 IPSEC AH Tx Command Label Processing Table |
| C19 | PHP1 IPSEC AH Rx Command Label Processing Table |

Returning to FIG. 1, CP_ACE subsystem 200 hosts a Public key accelerator module PKA that is accessible via memory mapped registers. The PKA module provides a high-performance public key engine to accelerate the large vector math processing that is involved in Public Key computations.

The public key engine of PKA provides the following basic operations: Large vector add, Large vector subtract, Large vector compare (XOR), Vector shift left or right, Large vector multiply, Large vector divide, and Large vector exponentiation. PKA can execute a Diffie-Hellman exponentiation operation for high security based on modulus sizes up to large numbers of bits and large exponents. A small amount of additional software processing is executed on the Host 100 processor as well. Operand and result vectors are stored in a multi-Kbytes vector RAM. The vectors are sequentially cycled through the processing engines of the PKA, with intermediate products from large or complex operations temporarily stored a RAM as well. The Host configures PKA for the intended operation, providing proper operand data, and allocating space for the result vector.

In FIG. 1, a True Random number (TRNG) Module provides a non-deterministic random number generator to assist host with key derivation operations like IKE etc. This can also be used to create initialization vector for certain encryption modes. CP_ACE hosts true random number

TABLE 19

DATA STRUCTURE FOR PHP MODULE 410 or 460

| Field Name | Write Access | Description |
|---|---|---|
| SCCTL | s/w (ctxctrl) | Multiple bytes. As in context cache module, SCCTL field contains SCID, SCPTR and other control flags, TABLE 10 |
| FirmwareReadWriteSpace | s/w and H/w | Multiple bytes. Firmware Read and write space. This information is used by firmware to maintain dynamic parameters like rolling window markers etc. This section is updated by hardware when the context is evicted to external memory. |

A set of address ranges (each is a pair of numbers [:]) are adopted as pre-specified system constants for the PDSP, as templated in TABLE 20. RXPKT means Receive Packet (Ingress), TXPKT means Transmit Packet (Egress). PHP1 is IPSEC PHP 410, PHP2 is Air Cipher PHP 460 in FIG. 1.

generator TRNG, which can accessed via memory mapped registers MMR.

Some memory mapped registers MMR to configure and control various features of cryptographic engine CP_ACE of FIG. 1 are described hereinbelow.

TABLE 21

| MEMORY MAPPED REGISTERS | |
|---|---|
| CMD_STATUS | See TABLE 22. |
| CTXCACH_CTRL | See TABLE 23. |
| CTXCACH_SC_ID | See TABLE 24. |
| CTXCACH_SC_PTR | Context Cache Security Context Pointer Register for MMR based fetch RW 0x0. |
| CTXCACH_MISSCNT | Context Cache miss count. |
| BLKMGR_PA_BLKS | Number M of packet blocks reserved for PA Port in units of 4 blocks to ensure that PA and CDMA flows do not stall each other. CP_ACE system has N total blocks. CDMA Port flow gets N/4 − M such units. See also Block Manager 380. |
| PA_FLOWID | PA Port default CPPI Flow ID used for packet coming from PA Ingress port. RW 0x0 |
| CDMA_FLOWID | CDMA Port default CPPI Flow ID, ditto. |
| PA_ENG_ID | PA Port default Next engine ID to select first processing engine within CP_ACE if Default Engine ID select code is detected in incoming CPPI SW word0 word. RW 0x10 |
| CDMA_ENG_ID | Ditto for CDMA Port default Next engine ID |

Command Status Register CMD_STATUS from TABLE 21 includes for each of the following blocks of TABLE 22 a read-only busy status bit (_BUSY) generated by respective block and an enable_EN bit that is R/W read/writeable by firmware, the bits forming a bit-pair. All resets are to non-busy, non-enabled statuses.

TABLE 22

| COMMAND STATUS REGISTER |
|---|
| BLOCK BIT-PAIR _BUSY, _EN |
| PA CPPI Ingress port |
| PA CPPI Egress port |
| CDMA CPPI Ingress port |

TABLE 22-continued

| COMMAND STATUS REGISTER |
|---|
| CDMA CPPI Egress port |
| Security context cache module |
| PHP1 IPSEC Packet Header Processing module |
| PHP2 Air Cipher Packet Header Processing module |
| PKA module* |
| TRNG module* |
| Encryption module* |
| Authentication module* |
| Air Cipher hardware module* |

*E-fused enable _EN. Also, an e-fuse enable is provided to enable the subsystem 200.

The Context Cache Control Register CTXCACH_CTRL from TABLE 21 is detailed in TABLE 23.

TABLE 23

| CONTEXT CACHE CONTROL REGISTER | | | |
|---|---|---|---|
| Field Name | Description | Type | Reset |
| BUSY | Bit, if set, indicates that context cache engine is busy. | R | 0x0 |
| CTX_CNT | Current cached security context multi-bit count. | R | 0x0 |
| CLR_STATS | Setting this bit clears context cache statistics. Auto-cleared. | RW | 0x0 |
| CDMA_PORT_EN | Enable CDMA ctxcach port. If this port is disabled, no look-up nor auto-fetch will happen for security context for packets coming on this port. | RW | 0x1 |
| PA_PORT_EN | Enable PA ctxcach port. If port is disabled, no look-up nor auto-fetch will happen for security context for packets coming on this port. | RW | 0x1 |
| CLR_CACHE_TABLE | Clear internal cache table. This bit clears after operation is completed. Cache table is auto cleared after reset. | RW | 0x0 |
| AUTO_FETCH_EN | Enable Auto fetch for security context | RW | 0x1 |

The Context Cache Security Context Identification Register CTXCACH_SC_ID from TABLE 21 is detailed in TABLE 24.

TABLE 24

| CONTEXT CACHE SECURITY CONTEXT IDENTIFICATION REGISTER | | |
|---|---|---|
| Field Name | Description | Type** |
| DONE | Done bit set indicates operation is completed. | R |
| SC_ERRORCODE | Return Error code bits. return of zero mean success. | R |
| SC_RAMIDX | Return Ram index byte. | R |
| GO | Go bit. Setting this bit will execute selected action. | RW |
| SC_TEAR | Tear-down selected SCID. | RW |
| SC_FETCH_EVICT | If set Evicts selected SCID. If reset Fetch selected SCID. | RW |

TABLE 24-continued

CONTEXT CACHE SECURITY CONTEXT IDENTIFICATION REGISTER

| Field Name | Description | Type** |
|---|---|---|
| SC_ID | SCID for MMR based fetch | RW |
| BUSY | If set, Busy bit indicates that context cache engine is busy. | R |
| CTX_CNT | Current cached security context multi-bit count. | R |
| CLR_STATS | Setting this bit clears context cache statistics. Auto cleared. | RW |
| CDMA_PORT_EN | Enable CDMA ctxcach port. If this port is disabled then no look-up nor auto-fetch will happen for security context | RW |

**Types are R: Read; RW: Read/Write. Reset for all fields is to 0x0, except PORT_EN which is reset-enabled to 0x1.

Host polls the system of FIG. 1, for example. Other embodiments may provide for interrupts to Host. Different embodiments or options provided therein support a specified or configured endian type. Security context is formed as shown in context cache section. Host swaps words based on system width configuration to ensure that memory print of security context is same in either endian.

CP_ACE is suitably clocked by a main clock (e.g., 350 MHz) and a synchronous divide-by-two off main clock to drive cryptographic cores like PKA, PKA RAM, and TRNG. Internal clock gating shuts down clock to any of various cryptographic cores in response to Host/PDSP via a memory mapped register MMR based on current operational mode, and provided a Done acknowledgment is received from an affected core. See, e.g., TABLE 22 with module-specific enable '_EN'=0.

In FIG. 1, the CDMA Ingress CPPI Streaming interface is used to receive packet data from CPPI DMA (CDMA) for packets coming from Host and has controls tabulated in TABLE 25.

In FIG. 1, the PA Ingress CPPI Streaming interface is used to receive packet data from PA port. TABLE 26 tabulates controls for this interface.

TABLE 26

CONTROLS FOR PA INGRESS CPPI STREAMING INTERFACE
(Analogous to TABLE 25 for simplicity of architecture. Substitute "pa" for "cdma" in TABLE 25 wherever "cdma" occurs in TABLE 25 to obtain TABLE 26.)

| | | |
|---|---|---|
| cp_ace_pktstrm_inpa_thread_sready | Out | This signal indicates that CP_ACE's PA Ingress port currently have buffering to accept a block of data. |
| . . . etc. | | |

Controls for CDMA Egress CPPI streaming interface are listed in TABLE 27. Notice that for simplicity of architecture, these controls substitute "out" for "in" in TABLE 25 wherever "in" occurs in TABLE 25 field designators to obtain TABLE 27. Note that the first control entry in TABLE 27 is somewhat differently worded than the first control entry in TABLE 25.

TABLE 25

CONTROLS FOR CDMA INGRESS CPPI STREAMING INTERFACE

| Signal Pin Name | In/Out Type | Function |
|---|---|---|
| cp_ace_pktstrm_incdma_thread_sready | Out. | Indicates that CP_CE's CDMA Ingress port currently have buffering to accept a block of data. |
| cp_ace_pktstrm_incdma_thread_id | In. | Thread ID: Indicates the thread that is currently occupying the streaming interface. Multi-bit with log2 number of threads. |
| cp_ace_pktstrm_incdma_req | In. | Request: when asserted indicates that all of the other information on the bus is valid. |
| cp_ace_pktstrm_incdma_data_type | In. | Data Type indicates the type of data that is being transferred on the data bus. Multi-bit. |
| cp_ace_pktstrm_incdma_req_thread_id | In. | Request Thread ID indicates the target thread to which data will be transferred on the following clock cycle. |
| cp_ace_pktstrm_incdma_worden | In. | Word Enable: Indicates which 32-bit words on the interface are valid. Primarily used on interfaces wider than 32-bits to allow one or more optional words to be included/excluded during the data phase transfer. Not used for the payload data data phases. |
| cp_ace_pktstrm_incdma_xcnt | In. | Data Phase Byte Count: Indicates how many payload bytes are transferred during the current data phase. Pertinent for payload data data phases. |
| cp_ace_pktstrm_incdma_data | In. | Data: The info, control, PS, and payload data word. |
| cp_ace_pktstrm_incdma_sop | In. | Start of Packet Indicator: Asserted co-incident with the start for the block, to indicate that a new packet is starting. |
| cp_ace_pktstrm_incdma_eop | In. | End of Packet Indicator: Asserted to indicate the close of a packet. |
| cp_ace_pktstrm_incdma_drop | In. | Drop Packet Indicator: Asserted to indicate that the current packet in this thread should be dropped at the destination. |
| cp_ace_pktstrm_incdma_pkt_error[3:0] | In. | Packet Error Indicator bit indicates if an error occurred during reception of this packet. 0 = No error occurred, 1 = Error occurred. Additional information about different errors may be encoded in the error flags fields. |

TABLE 27

CONTROLS FOR CDMA EGRESS CPPI STREAMING INTERFACE

| | | |
|---|---|---|
| cp_ace_pktstrm_outcdma_thread_mready | Out. | Master Thread Ready: Indicates which threads currently have valid information waiting to be transferred to the slave. Multi-bit field with number of bits equal to number of threads. |
| etc. | | |

TABLE 28

CONTROLS FOR PA EGRESS CPPI STREAMING INTERFACE (Analogous to TABLE 27 for simplicity of architecture. Substitute "pa" for "cdma" in TABLE 27 wherever "cdma" occurs in TABLE 27 field designators to obtain TABLE 28.)

The memory map of the FIG. 1 subsystem is suitably allocated to the various storage structures, such as in TABLE 29, so they are addressable. AIHM means "All internal hardware modules." AHE means "All hardware engines." Respective sizes are suitably adopted for the various structures in the design process, and their values are accumulated to determine address offsets from some base address to establish addresses for all the memory-mapped structures.

TABLE 29

MEMORY MAPPED STORAGE STRUCTURES

| Offset Size Region | Primary Access |
|---|---|
| MMR/Ctxcach registers | Host/PDSP |
| PDSP 0,1 Control/Status Registers | Host/Debugger |
| PDSP 0,1 Debug Registers | Debugger |
| PDSP 0,1 Program Memory | Host/Debugger |
| PDSP Scratch Memory 0, 1 | Host/PDSP/CDE |
| CDE 0,1 Sideband Memory Interface | PDSPO, 1 respectively |
| PKA module, Vector RAM starts at offset. | Host/PDSP |
| TRNG module | Host/PDSP |
| PA Ctxcach module Lookup Port | AIHM |
| PA Ctxcach module EOP Port | AIHM |
| CDMA Ctxcach module Lookup | All internal Port Hardware modules |
| CDMA Ctxcach module EOP Port | AIHM |
| Block Manager module | AIHM |
| Packet RAMs 0-5 | AHE Host/PDSP can read-only |
| PA CPPI Egress Port | AIHM |
| CDMA CPPI Egress Port | AIHM |
| IPSEC PRP scheduler port | AIHM |
| Encryption module scheduler port | AIHM |

TABLE 29-continued

MEMORY MAPPED STORAGE STRUCTURES

| Offset Size Region | Primary Access |
|---|---|
| Authentication module scheduler port | AIHM |
| SRTP/Air Cipher PHP scheduler port | AIHM |
| Air cipher module port | AIHM |

In FIG. 1, the subsystem can provide 1.4 Gbits/sec high performance on Ethernet traffic while running at 350 MHz for IPSEC and SRTP protocols. This subsystem also can process 400 Mbits/sec of air cipher traffic as defined by 3GPP in parallel to IPSEC. In order to provide the IPSEC/SRTP performance, the internal hardware cores like AES, 3DES, SHA1 etc are able to saturate the ingress traffic bit rate while running at 350 MHz.

Projected performance of various cores based on packet size is discussed next. The number of packets to be processed by the subsystem each second is called the packet rate. The packet rate for 1.4 Gbit/sec is a function of packet size. For 1.4 Gbits/sec Ethernet traffic, the subsystem processes 2.08 million 64-bytes packets per second. The number of packets per second decreases approximately inversely with increasing packet size.

Performance is also considered for the individual hardware cores in FIG. 1 on a most-burdensome case basis in various modes to process the 1.4 Gbits/sec of Ethernet traffic. In AES-CCM mode of encryption, for instance, a same packet payload is run twice for AES processing. In hashing, SHA1 using HMAC uses an additional hashing round to close the keyed hash.

TABLE 30 describes the performance of each individual core running at 350 MHz. Air cipher cores (Kasumi and Snow3G) are run at half the clock of the CP_ACE clock in this example. Size refers to Block size in bits. Cycles refers to cycles per block. Modes overhead is entitled Modes. Frequency (MHz) is entitled Freq. "Actual" refers to Actual Throughput (Mbits/sec), and "Goal" refers to Throughput Goal (Mbits/sec). Modules are also called cores.

TABLE 30

PERFORMANCE OF CORES

| Module | Size | Cycles | Modes | Freq | Actual | Goal | Remarks |
|---|---|---|---|---|---|---|---|
| AES core | 128 | 15 | 1 | 350 | 2,800.0 | 1,365.0 | 256-bit key nrs case |
| 3DES core | 64 | 14 | 1 | 350 | 1,493.3 | 1,365.0 | 3 key nrs, case |
| Galois | 128 | 8 | 1 | 350 | 4,977.8 | 1,365.0 | Galois mult., GCM mode |
| AES-CCM 128/192bits | 128 | 13 | 1 | 350 | 1,600.0 | 1,365.0 | Run twice for 1 key block |
| AES-CCM-256 bits | 128 | 15 | 1 | 350 | 1,400.0 | 1,365.0 | Run twice for 1 key block |
| Kasumi | 64 | 16 | 2 | 350 | 1,244.4 | 400.0 | Kasumi in F8 mode same |
| Snow3G** | 320 | 96 | 2 | 350 | 1,142.9 | 400.0 | See Note. |
| SHA1 | 512 | 81 | 1 | 350 | 2,185.4 | 1,386.0 | SHA 1 core |
| MD5 | 512 | 65 | 1 | 350 | 2,715.2 | 1,386.0 | MD5 core |
| SHA2 | 512 | 65 | 1 | 350 | 2,715.2 | 1,386.0 | SHA 2 core |

TABLE 30-continued

PERFORMANCE OF CORES

| Module | Size | Cycles | Modes | Freq | Actual | Goal | Remarks |
|---|---|---|---|---|---|---|---|
| HMACSHA1 | 512 | 81 | 1 | 350 | 2,185.4 | 2,133.0 | SHA 1 core |
| HMAC-MD5 | 512 | 65 | 1 | 350 | 2,715.2 | 2,133.0 | MD5 core |
| HMACSHA2 | 512 | 65 | 1 | 350 | 2,715.2 | 2,133.0 | SHA 2 core |

**Note for Snow3G: 40 bytes in one block (38 cycles for first 4 bytes, 2 cycles each for subsequent 4 bytes, 40 cycles for store/restore), most-burdensome case store/restore each 40 bytes.

In FIGS. 15-19, description now turns to process embodiments for integration of the CP_ACE into a chip level context of FIG. 20.

Figure 15:
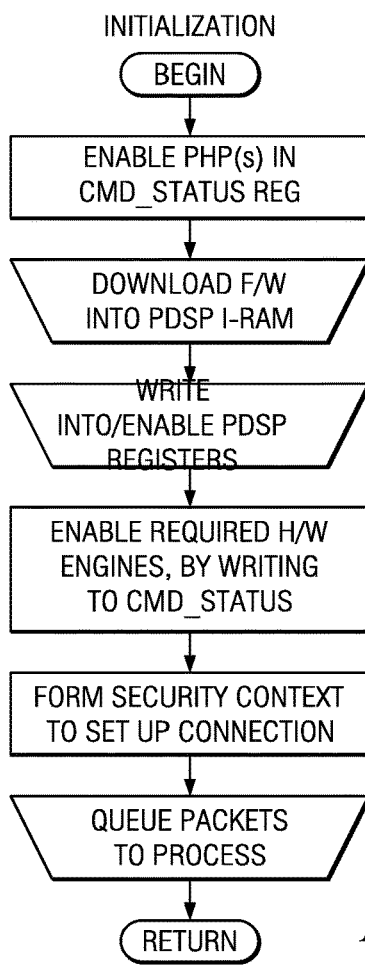
FIG. 15 is a flow diagram of an inventive process for initialization of the subsystem of FIG. 1.

In FIG. 15, an Initialization process embodiment has the following steps:

INITIALIZATION PROCESS, FIG. 15
1. Enable PHP1SS_EN and/or PHP2SS_EN in CMD_STATUS Register. (TABLE 22).
2. Download Firmware into PDSP's instruction RAM, see I-RAM, FIG. 13.
3. Enable PDSP by writing into PDSP registers.
4. Enable support by other hardware engine(s) by writing into CMD_STATUS Register.
5. Set up connection by forming CP_ACE specific security context in RAM 570, 575, using format in FIG. 6 or 7.
6. Queue packets to be processed by CP_ACE, e.g. by ingress into Packet RAM 265 and chunking using format in FIG. 9.

Figure 16:
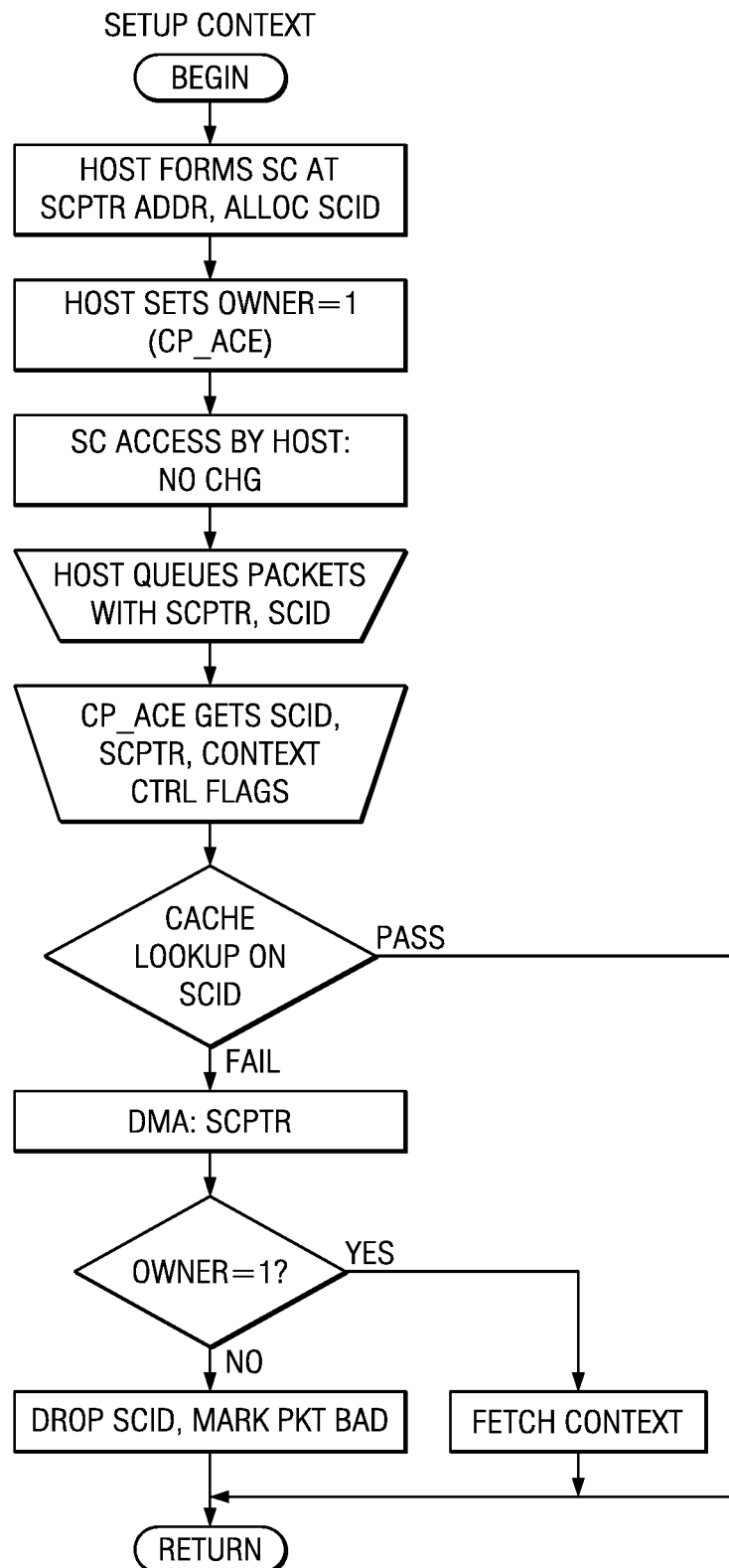
FIG. 16 is a flow diagram of an inventive process for setting up a security context for the subsystem embodiment of FIG. 1.

In FIG. 16, a security context setup process embodiment has the following steps, wherein Host and CP_ACE handshake to avoid race conditions.

SETTING UP SECURITY CONTEXT: PROCESS, FIG. 16
1. Host forms security context in Host memory at SCPTR address and allocates SCID.
2. Host (not SA) relinquishes ownership to CP_ACE by setting Owner bit in SCCTL to 1. (See TABLE 10.)
3. Host cannot make any more changes to security context after CP_ACE has been made owner.
4. Host queues packets with above SCPTR and SCID whenever packet is meant for this connection. Alternatively, Host can add security context via Memory map registers MMR.
5. CP_ACE gets SCID, SCPTR along with context control flags, per SCCTL in TABLE 10.
6. CP_ACE does internal look-up on SCID to check for cached connection.
7. Since this is first packet for given connection, internal look-up fails.
8. CP_ACE issue DMA to fetch security context using SCPTR.
9. CP_ACE checks for owner to be CP_ACE (i.e. Owner bit is set to 1 by host).
10. If owner is not CP_ACE (Owner bit is 0), CP_ACE drops the security context and mark packet as bad by setting corresponding error code.
11. If owner bit is CP_ACE (Owner bit is 1), CP_ACE fetches the complete security context.

In FIG. 17, a security context tear-down process embodiment has the following steps:

TEAR DOWN PROCESS, FIG. 17
1. Host sends tear-down packet to CP_ACE with No Payload and Tear-down bit set, see TABLE 3 and TABLE 9. Alternatively, Host can set tear-down bit in last packet.
2. Host ensures that no new packets are sent to this security context after tear-down packet has been sent.
3. CP_ACE records that given security context is to be subject to tear-down.
4. CP_ACE ensures that all packet within CP_ACE buffers are processed before tear-down action is executed.
5. Finally, CP_ACE clears owner bit (Owner bit, SCCTL, TABLE 10) to give control back to Host. Host is programmed so that, after launching the tear-down packet, host waits for an Ownership bit (Owner bit SCCTL) to be cleared as indication that the tear-down operation has been completed.
6. Host ensures that the same SCID is not used until tear-down operation is completed as indicated by clearing of Owner bit.

In FIG. 18, a process embodiment to evict security context has the following steps:

EVICT SECURITY CONTEXT: PROCESS, FIG. 18
1. Host writes all 1's in Evict Done bits in SCCTL, see TABLE 10.
2. Host Send packet with Force Evict flag set, alternatively host can set evict information via memory mapped register
3. When hardware completes evict operation, it changes Evict Done to all 0's.
4. Host senses change in state of Evict Done from all 1's to all 0's to know evict has been completed.

Figure 19:
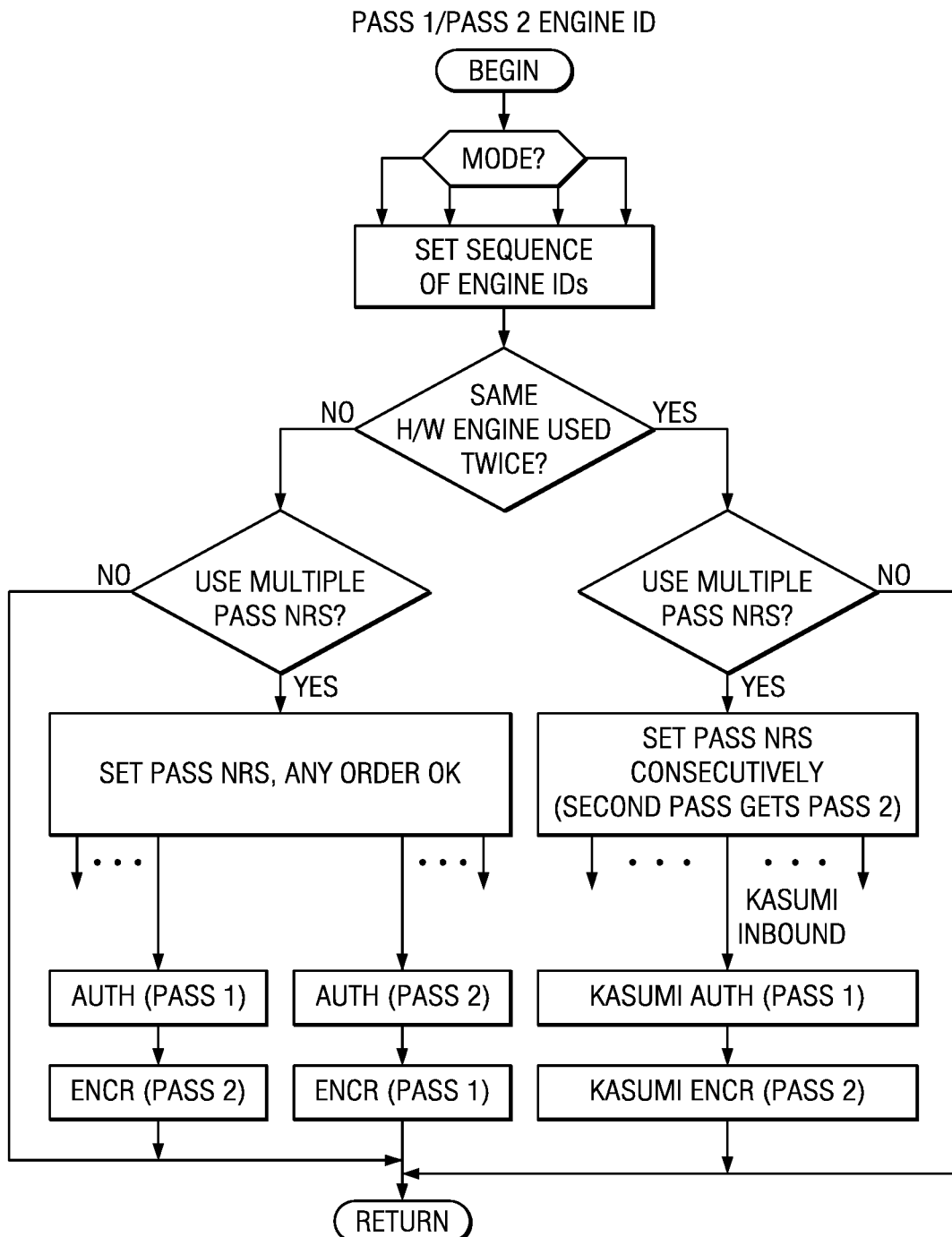
FIG. 19 is a flow diagram of an inventive process for issuing Engine IDs for multiple execution passes for the subsystem embodiment of FIG. 1.

In FIG. 19, a process embodiment to choose Pass1/Pass2 engine ID, see TABLE 5, for data processing engines has the following steps:

CHOOSE PASS1/PASS2 ENGINE ID: PROCESS, FIG. 19
1. Pass1 and Pass2 can be used in any order if same hardware engine is not used twice in the flow, for instance AUTH (Pass2)→ENCR (Pass1) and AUTH(Pass1) →ENCR(Pass2) are permissible.
2. If same hardware engine is used for both Encryption and Authentication, then second pass uses Pass2 engine ID. (See TABLE 5.) For instance, if Air Cipher hardware engine is used for both Kasumi-encryption and Kasumi-authentication for inbound flow (AUTH 4 ENCR), then Kasumi-authentication uses Pass1 code value, and Kasumi-encryption uses Pass2 code value.

Further a process embodiment to remove last chunk has the following steps:

This process is performed because the last chunk might have 1-byte.

REMOVE LAST CHUNK: PROCESS
1. Set "EOP: in CDE descriptor for second-last chunk.
2. Set "SOP", "EOP" and "Drop" for last chunk (chunk to be removed).

CPPI/CP_ACE architectural parameters are listed next.
1. CPPI streaming control length may have a maximum for ingress packet length, e.g., some (power of two)-bytes) or other number of bytes.
2. Regarding byte alignment, CPPI streaming control in some embodiments may have a desirable alignment (e.g., 8-bytes aligned).

3. Within CP_ACE, PHP PS length may be established as, e.g., multiple of 8-bytes. For PS Word, see FIG. 9.
4. Egress CPPI streaming control+CPPI streaming status length may have a maximum, e.g., some (power of two)-bytes or other number of bytes.
5. Egress CPPI streaming status may be established, e.g., as a multiple of 4-bytes. Notice this is different than internal PHP PS length of 8-bytes aligned.
6. CP_ACE outputs packet length as all-ones to CPPI DMA, thereby allowing CPPI DMA to count packet data length.

TABLE 31 explains CDE descriptor fields and mapping to Ingress CPPI streaming descriptor from the viewpoint of the FIG. 13 PHP PDSP. TABLE 31 also describes firmware processing for each of the fields. TABLE 31 helps describe Descriptor Area of FIG. 9 as well as the other fields/words/areas in FIG. 9.

TABLE 31

CDE AND INGRESS CPPI STREAMING DESCRIPTORS

| CDE word | Field | Value Set by HW at Ingress | Valid at chunk | FW access | FW must edit | Description |
|---|---|---|---|---|---|---|
| | | | WORD 0: | | | |

In Word 0, Thread ID field is HW-allocated, valid at All chunks, and FW does not access nor edit. Thread ID chooses DMA channel on Egress.

In Word 0, a CPPI Egress status length field is set at Ingress to CPPI streaming SW 2 "Status length", if SW2 is not present then this field is set to zeroes. Valid at SOP chunk only. FW accesses to specify the valid PS Data size for EOP chunk Trailer section. FW need not edit this field, which specifies the Valid PS Data Size that is included from PS section of the EOP chunk. CPPI gets informed up-front with upcoming Egress status length. Egress status length is multiple of a predetermined number of bytes and specified in units of bytes as master length of status words and overrides any other PS (status) length.

Further in Word 0, HW loads a Full Packet Length field with a value of complete packet length as reported by Ingress CPPI streaming word1 Pkt Length. This is valid at SOP chunk only. FW does not access and need not edit this field. This field represents Total Reassembled packet length as informed by ingress CPPI DMA, which computes full packet size in its egress flow.

WORD 1:

In Word 1, a Next Engine ID is loaded by HW from CPPI Packet streaming SW0 Engine ID or from Interface Default register if Use-Default is present in SWO Engine ID. Valid at all chunks. Firmware accesses this Next Engine ID field to specify the next engine and edits this field if firmware is in the chunk path.

Word 1 has a Command label Info field. HW inserts CPPI Packet streaming SW0 Cmdlb1 Info valid at SOP Chunk only. Firmware specifies this command label info and edits it if firmware is in the chunk path. Command label info is made up of Command Label Present and Command Label Offset.

Word 1 has a Valid PS Data Size field. At Ingress, HW inserts Zeroes. Field is valid at EOP chunk only. FW can access and change the Valid PS Size but may omit to do so. This Valid PS Data Size value goes out as a form of CPPI streaming status on EOP chunk.

Further, Word 1 has a Physical PS Data size field. HW loads a value, e.g. 32 valid for all chunks. FW does not access nor edit this field, which is a hole that is used by HW to insert a computed hash value.

WORD 2:

In Word 2, a Packet Type field is loaded by HW from CPPI streaming Word 0 Pkt Type, valid at SOP chunk only. FW does not access nor edit.

A Word 2 field called Drop Bit is set by HW if No Payload is set in CPPI Packet streaming SW0. Valid for all chunks. FW can access this field in case FW would like to drop current packet, but FW does not edit this field. FW can set Drop Bit in any chunk. HW takes care to abort complete packet.

HW sets a Word 2 SOP Bit field upon first chunk of packet, valid for SOP chunk only. FW can access this field in case FW is about to abort last chunk, but does not edit this indicator of first chunk of packet. FW uses this field to decode first chunk.

HW sets a Word 2 EOP bit field at last chunk of packet, field valid for EOP Chunk only. FW can access this field in case FW is about to abort last chunk, but does not edit this indicator of last chunk of packet. FW uses this field to decode last chunk.

HW sets a Word 2 PS Flags field with CPPI Packet streaming Word 0 PS Flags and the field is valid on all chunks. FW accesses to alter PS flags. This will change Error Code in CPPI descriptor. The last updated value goes out.

A Word 2 Error Flags field is set by HW to Zeroes, valid on SOP chunk only. FW does not access nor edit Error Flags. Hardware engine (like Encryption) reports error in this field.

HW sets a Word 2 Source ID field to the CPPI Packet streaming Word 0 Src-ID, valid on SOP chunk only. FW does not access nor edit Error Flags.

A Word 2 Flow Index is set by HW with CPPI Packet streaming SW2 Flow Index, and if SW2 is not present then from MMR Flow Index register. Valid on SOP chunk only. FW accesses this field and specifies a new Flow Index if firmware is in the chunk path. CPPI Flow index is used to select destination queue parameters.

TABLE 31-continued

CDE AND INGRESS CPPI STREAMING DESCRIPTORS

| CDE word | Field | Value Set by HW at Ingress | Valid at chunk | FW access | FW must edit | Description |
|---|---|---|---|---|---|---|

WORD 3:

In Word 3, at ingress, HW sets a Control Data Size to CPPI Packet streaming PS length, counted by Ingress module, valid on SOP chunk only. CDE engine changes this value on Insert/Remove command. FW need not edit this field. CPPI PS data on ingress is used as CDE CTL data for PHP.
Also in Word 3, at ingress, HW sets a Packet Data Size to Number of packet data bytes packed in current chunk, valid on all chunks. CDE engine changes this value on Insert/Remove command. FW need not edit this field. Ingress module packs up to 252 bytes of packet data into current chunk.

WORD 4:

In Word 4, at ingress, HW sets a Packet Id/Destination Tag to CPPI Packet streaming Word 2 Dst_Tag, valid on SOP chunk only. FW does not access nor edit this field. Packet ID is set by PA instead.
Also in Word 4, at ingress, HW sets a Word Destination Queue Manager field to the queue number represented by CPPI Packet streaming word SW2 Dest Queue Num. If SW2 is not present, then the field is set to all 1's. Valid on SOP chunk only. FW accesses this field to specify this CPPI destination queue info if FW is in the chunk path.

TIMESTAMP:

The Timestamp word has a Timestamp field. On ingress, HW loads the Timestamp field with contents of a CPPI Packet streaming word Extended Packet Info Word 0, valid on SOP chunk only. FW do not access nor alter this field.

SOFTWARE DATA WORDS 0, 1:

The Software Data Word 0 and 1 are loaded by HW on Ingress with contents of CPPI Packet streaming word Extended Packet Info Word 1 and 2 respectively, valid on SOP chunk only. FW can optionally access this field to pass custom data to other peripherals. SW 0 word, SW 1 word are not altered by hardware.

TRAILER SECTION WORDS:

On ingress, HW loads Trailer section words (e.g. 8) with PS info Trailer section from CDE, valid on EOP chunk only. FW accesses optionally to change trailer data. HW sends trailer (CDE PS info) as CPPI streaming status on Egress side. Trailer section (if present) in EOP chunk only goes as status. Trailer section of all other chunks is ignored and not altered by hardware.

CONTROL SECTION

On ingress, HW loads the control section words (e.g. up to 16) from CPPI Packet streaming words called PS Section, valid on SOP chunk only. FW accesses optionally to change control data. HW on egress automatically removed control data from start of control until end of current command label.

PACKET DATA

On ingress, HW loads the Packet data with CPPI Packet streaming word called Packet Data, Valid on all chunks. FW accesses optionally to change packet data. HW packs maximum number of bytes, e.g. 252-bytes, in one chunk, to allow FW to bypass whole chunk if desired.

In FIG. 20, an embodiment improved as in the other Figures herein has one or more video codecs implemented in IVA hardware, video codec 3520.4, and/or otherwise appropriately to form more comprehensive system and/or system-on-chip embodiments for larger device and system embodiments. In FIG. 20, a system embodiment 3500 improved as in the other Figures has an MPU subsystem and the IVA subsystem, and DMA (Direct Memory Access) subsystems 3510.i. The MPU subsystem suitably has one or more processors with CPUs such as RISC or CISC processors 2610, and having superscalar processor pipeline(s) with L1 and L2 caches. The IVA subsystem has one or more programmable digital signal processors (DSPs), such as processors having single cycle multiply-accumulates for image processing, video processing, and audio processing. IVA provides multi-standard (H.264, H.263, AVS, MPEG4, WMV9, RealVideo®) encode/decode at D1 (720×480 pixels), and 720p MPEG4 decode, for some examples. A video codec for IVA is improved for high speed and low real-estate impact as described in the other Figures herein. Also integrated are a 2D/3D graphics engine, a Mobile DDR Interface, and numerous integrated peripherals as selected for a particular system solution.

Digital signal processor cores suitable for some embodiments in the IVA block and video codec block may include a Texas Instruments TMS32055x™ series digital signal processor with low power dissipation, and/or TMS320C6000 series and/or TMS320C64x™ series VLIW digital signal processor, and have the circuitry and processes of the FIGS. 1-19 and 22 coupled with them as taught herein. For example, a 32-bit eight-way VLIW (Very Long Instruction Word) pipelined processor has a program fetch unit, instruction dispatch unit, an instruction decode unit, two data paths and a register files for them. The data paths execute the instructions. Each data path includes four functional units L, S, M, D, suffixed 1 or 2 for the respective data path. Control registers and logic, test logic, interrupt logic, and emulation logic are also included. Plural pixel data is packed into each processor data word. Luma and chroma pixel data may be expressed in 8 bits and packed into each, e.g., 32-bit data word. The data processing apparatus includes many instructions that operate in single instruction multiple data (SIMD) mode by separately considering plural parts of the processor data word. For example, and ADD instruction can operate separately on four 8-bit parts of the 32-bit data word by breaking the carry chain between 8-bit sections. Various manipulation instructions and circuits for the packed data are also provided. The IVA subsystem is suitably provided with L1 and L2 caches, RAM and ROM, and hardware accelerators as desired such as for motion estimation, variable length codec, and other processing.

DMA (direct memory access) performs target accesses via target firewalls 3522.$i$ and 3512.$i$ of FIG. 20 connected on interconnects 2640. A target is a circuit block targeted or accessed by another circuit block operating as an initiator. In order to perform such accesses the DMA channels in DMA subsystems 3510.$i$ are programmed. Each DMA channel specifies the source location of the Data to be transferred from an initiator and the destination location of the Data for a target. Some Initiators are MPU 2610, DSP DMA 3510.2, SDMA 3510.1, Universal Serial Bus USB HS, virtual processor data read/write and instruction access, virtual system direct memory access, display 3510.4, DSP MMU (memory management unit), camera 3510.3, and a secure debug access port to emulation block EMU for testing and debug (not to be confused with emulation prevention pattern insertion and removal).

Data exchange between a peripheral subsystem and a memory subsystem and general system transactions from memory to memory are handled by the System SDMA 3510.1. Data exchanges within a DSP subsystem 3510.2 are handled by the DSP DMA 3518.2. Data exchange to store camera capture is handled using a Camera DMA 3518.3 in camera subsystem CAM 3510.3. The CAM subsystem 3510.3 suitably handles one or two camera inputs of either serial or parallel data transfer types, and provides image capture hardware image pipeline and preview. Data exchange to refresh a display is handled in a display subsystem 3510.4 using a DISP (display) DMA 3518.4. This subsystem 3510.4, for instance, includes a dual output three layer display processor for 1×Graphics and 2×Video, temporal dithering (turning pixels on and off to produce grays or intermediate colors) and SDTV to QCIF video format and translation between other video format pairs. The Display block 3510.4 feeds an LCD (liquid crystal display), plasma display, DLP™ display panel or DLP™ projector system, using either a serial or parallel interface. Also television output TV and Amp provide CVBS or S-Video output and other television output types.

In FIG. 20, a hardware security architecture including SSM 2460 propagates Mreqxxx qualifiers on the interconnect 3521 and 3534. The MPU 2610 issues bus transactions and sets some qualifiers on Interconnect 3521. SSM 2460 also provides one or more MreqSystem qualifiers. The bus transactions propagate through the L4 Interconnect 3534 and line 3538 then reach a DMA Access Properties Firewall 3512.1. Transactions are coupled to a DMA engine 3518.$i$ in each subsystem 3510.$i$ which supplies a subsystem-specific interrupt to the Interrupt Handler 2720. Interrupt Handler 2720 is also fed one or more interrupts from Secure State Machine SSM 2460 that performs security protection functions. Interrupt Handler 2720 outputs interrupts for MPU 2610. In FIG. 20, firewall protection by firewalls 3522.$i$ is provided for various system blocks 3520.$i$, such as GPMC (General Purpose Memory Controller) to Flash memory 3520.1 for firmware and updates, ROM 3520.2 for firmware, on-chip RAM 3520.3 for working run-time contexts and data, Video Codec 3520.4, WCDMA/HSDPA 3520.6, device-to-device SAD2D 3520.7 to Modem chip 1100, and a DSP 3520.8 and DSP DMA 3528.8. In some system embodiments, Video Codec 3520.4 has codec embodiments as shown in the other Figures herein. A System Memory Interface SMS with SMS Firewall 3555 is coupled to SDRC 3552.1 (External Memory Interface EMIF with SDRAM Refresh Controller) and to system SDRAM 3550 (Synchronous Dynamic Random Access Memory).

In FIG. 20, interconnect 3534 is also coupled to Control Module 2765 and FIG. 1 cryptographic accelerator CP_ACE 3540 (200) and PRCM 3570. Power, Reset and Clock Manager PCRM 3570 is coupled via L4 interconnect 3534 to Power IC circuitry in chip 1200, which supplies controllable supply voltages VDD1, VDD2, etc. PRCM 3570 is coupled to L4 Interconnect 3534 and coupled to Control Module 2765. PRCM 3570 is coupled to a DMA Firewall 3512.1 to receive a Security Violation signal, if a security violation occurs, and to respond with a Cold or Warm Reset output. Also PRCM 3570 is coupled to the SSM 2460.

In FIG. 20, some embodiments have symmetric multi-processing (SMP) core(s) such as RISC processor cores in the MPU subsystem. One of the cores is called the SMP core. A hardware (HW) supported secure hypervisor runs at least on the SMP core. Linux SMP HLOS (high-level operating system) is symmetric across all cores and is chosen as the master HLOS in some embodiments.

The embodiments are suitably employed in gateways, decoders, set top boxes, receivers for receiving satellite video, cable TV over copper lines or fiber, DSL (Digital subscriber line) video encoders and decoders, television broadcasting and audio/video multicasting, optical disks and other storage media, encoders and decoders for video and multimedia services over packet networks, in video teleconferencing, and video surveillance. Some embodiments, such as fed from video surveillance sources, prepare numerous packet data streams for efficient transmission for remote reception point(s). Some embodiments handle numerous packet data streams for reception and distribution to multiple audio/visual display locations over an extended user space. Some embodiments handle and integrate numerous incoming packet data streams for concurrent intelligible delivery to the user experience in a more confined space.

Accordingly, it is emphasized that, although FIG. 1 for convenience has legends somewhat oriented toward the particular application of security and cryptographic processing, subsystem 200 is also applicable or extendable to other forms of pipelined multiple packet-stream processing. In such other forms, for instance, processing contexts other than or additional to security contexts are handled by module 510. Also, any particular modules or engines 310, 320, 370, etc., suitably can have different cores than, or additional cores beyond, the particular Crypto cores shown in the middle of FIGS. 10, 12 and 14. Various embodiments are prepared as subsystems and/or systems for all applications to which their advantages commend them now and in the future.

The system embodiments of and for FIG. 20 are also provided in a communications system and implemented as various embodiments in any one, some or all of cellular mobile telephone and data handsets, a cellular (telephony and data) base station, a WLAN AP (wireless local area network access point, IEEE 802.11 or otherwise), a Voice over WLAN Gateway with user video/voice over packet telephone, and a video/voice enabled personal computer (PC) with another user video/voice over packet telephone, that communicate with each other. A camera CAM provides video pickup for a cell phone or other device to send over the internet to another cell phone, personal digital assistant/personal entertainment unit, gateway and/or set top box STB with television TV. Video storage and other storage, such as hard drive, flash drive, high density memory, and/or compact disk (CD) is provided for digital video recording (DVR) embodiments such as for delayed reproduction, transcoding, and retransmission of video to other handsets and other destinations. An STB embodiment includes a system interface, front end hardware, a framer, a multiplexer, a multi-stream bidirectional cable card (M-Card), and a demultiplexer. The STB includes a main processor(s), a transport packet parser, and a decoder, improved as taught herein and provided on a printed circuit board (PCB), a printed wiring board (PWB), and/or in an integrated circuit on a semiconductor substrate.

In FIG. 20, a Modem integrated circuit (IC) 1100 supports and provides wireless interfaces for any one or more of GSM, GPRS, EDGE, UMTS, and OFDMA/MIMO embodiments. Codecs for any or all of CDMA (Code Division Multiple Access), CDMA2000, and/or WCDMA (wideband CDMA or UMTS) wireless are provided, suitably with HSDPA/HSUPA (High Speed Downlink Packet Access, High Speed Uplink Packet Access) (or 1×EV-DV, 1×EV-DO or 3×EV-DV) data feature via an analog baseband chip and RF GSM/CDMA chip to a wireless antenna. Replication of blocks and antennas is provided in a cost-efficient manner to support MIMO OFDMA of some embodiments. Modem 1100 also includes an television RF front end and demodulator for HDTV and DVB (Digital Video Broadcasting) to provide H.264 and other packetized compressed video/audio streams for Start Code detection, slice parsing, and entropy decoding by the circuits of the other Figures herein. An audio block in an Analog/Power IC 1200 has audio I/O (input/output) circuits to a speaker, a microphone, and/or headphones as illustrated in FIG. 20. A touch screen interface is coupled to a touch screen XY off-chip in some embodiments for display and control. A battery provides power to mobile embodiments of the system and battery data on suitably provided lines from the battery pack.

DLP™ display technology from Texas Instruments Incorporated is coupled to one or more imaging/video interfaces. A transparent organic semiconductor display is provided on one or more windows of a vehicle and wirelessly or wireline-coupled to the video feed. WLAN and/or WiMax integrated circuit MAC (media access controller), PHY (physical layer) and AFE (analog front end) support streaming video over WLAN. A MIMO UWB (ultra wideband) MAC/PHY supports OFDM in 3-10 GHz UWB bands for communications in some embodiments. A digital video integrated circuit provides television antenna tuning, antenna selection, filtering, RF input stage for recovering video/audio and controls from a DVB station.

Various embodiments are thus used with one or more microprocessors, each microprocessor having a pipeline, and selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

A packet-based communication system can be an electronic (wired or wireless) communication system or an optical communication system.

Various embodiments as described herein are manufactured in a process that prepares RTL (register transfer language or hardware design language HDL) and netlist for a particular design including circuits of the Figures herein in one or more integrated circuits or a system. The design of the encoder and decoder and other hardware is verified in simulation electronically on the RTL and netlist. Verification checks contents and timing of registers, operation of hardware circuits under various configurations, packet parsing, and data stream detection, bit operations and encode and/or decode for H.264 and other video coded bit streams, proper responses to Host and to MCE, real-time and non-real-time operations and interrupts, responsiveness to transitions through confidentiality modes and other modes, sleep/wakeup, and various attack scenarios. When satisfactory, the verified design dataset and pattern generation dataset go to fabrication in a wafer fab and packaging/assembly produces a resulting integrated circuit and tests it with real time voice, video and data. Testing verifies operations directly on first-silicon and production samples such as by using scan chain methodology on registers and other circuitry until satisfactory chips are obtained. A particular design and printed wiring board (PWB) of the system unit, has a video codec applications processor coupled to a modem, together with one or more peripherals coupled to the processor and a user interface coupled to the processor. A storage, such as SDRAM and Flash memory is coupled to the system and has VLC tables, configuration and parameters and a real-time operating system RTOS, image codec-related software such as for processor issuing Commands and Instructions as described elsewhere herein, public HLOS, protected applications (PPAs and PAs), and other supervisory software. System testing tests operations of the integrated circuit(s) and system in actual application for efficiency and satisfactory operation of fixed or mobile video display for continuity of content, phone, e-mails/data service, web browsing, voice over packet, content player for continuity of content, camera/imaging, audio/video synchronization, and other such operation that is apparent to the human user and can be evaluated by system use. Also, various attack scenarios are applied. If further increased efficiency is called for, parameter(s) are reconfigured for further testing. Adjusted parameter(s) are loaded into the Flash memory or otherwise, components are assembled on PWB to produce resulting system units.

The packet filtering described herein facilitates operations in RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as cores or standalone integrated circuits, and in other integrated circuits and arrays.

The cryptographic accelerator CPE_ACE is useful in other types of integrated circuits such as ASICs (application specific integrated circuits) and gate arrays and to all circuits to which the advantages of the improvements described herein commend their use.

Figure 22:
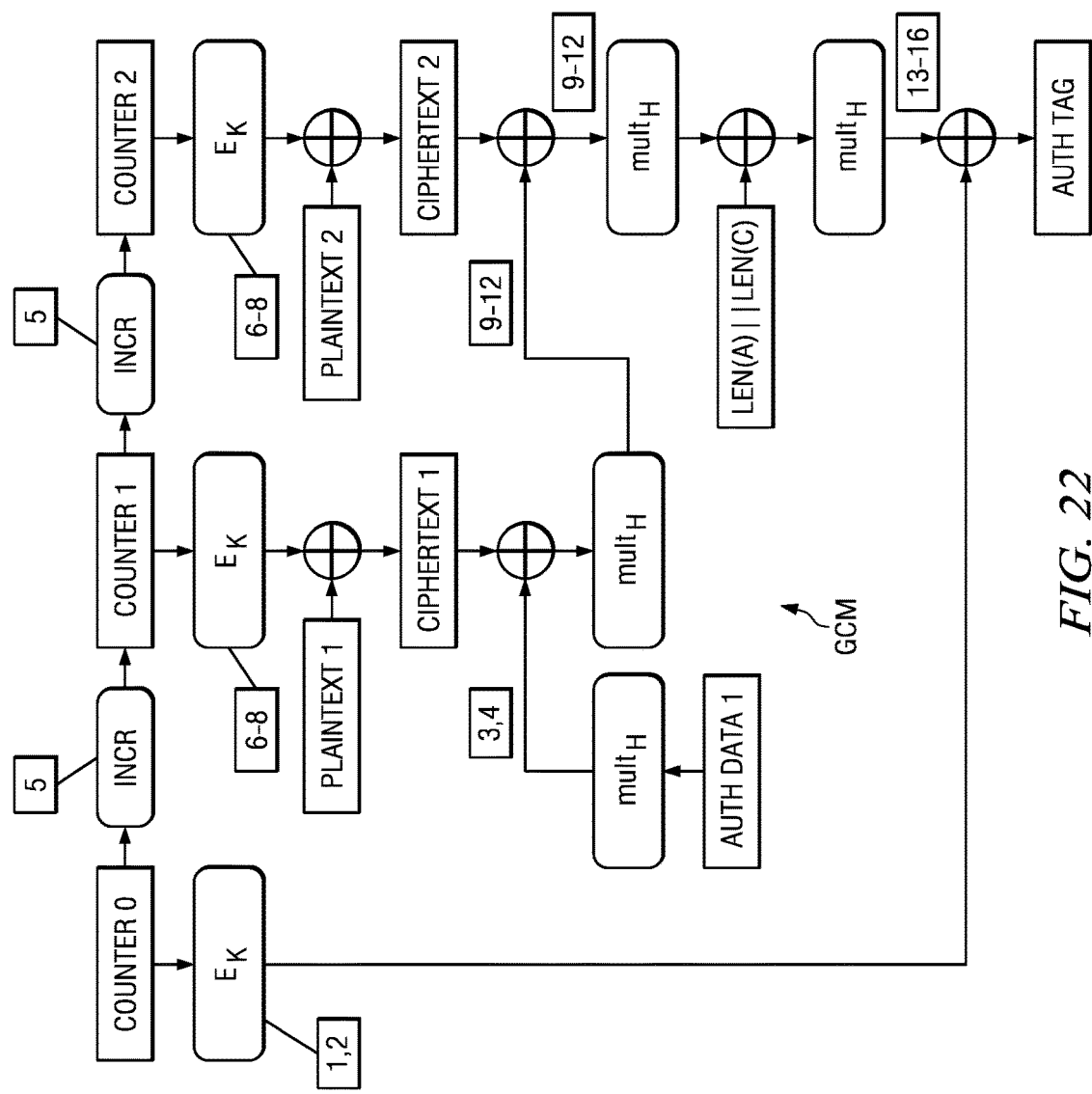
FIG. 22 is a flow diagram of a process for inventive mode processing in FIGS. 1 and 11 by the MCE embodiment according to assembly code generated according to FIG. 21.
Figure 21:
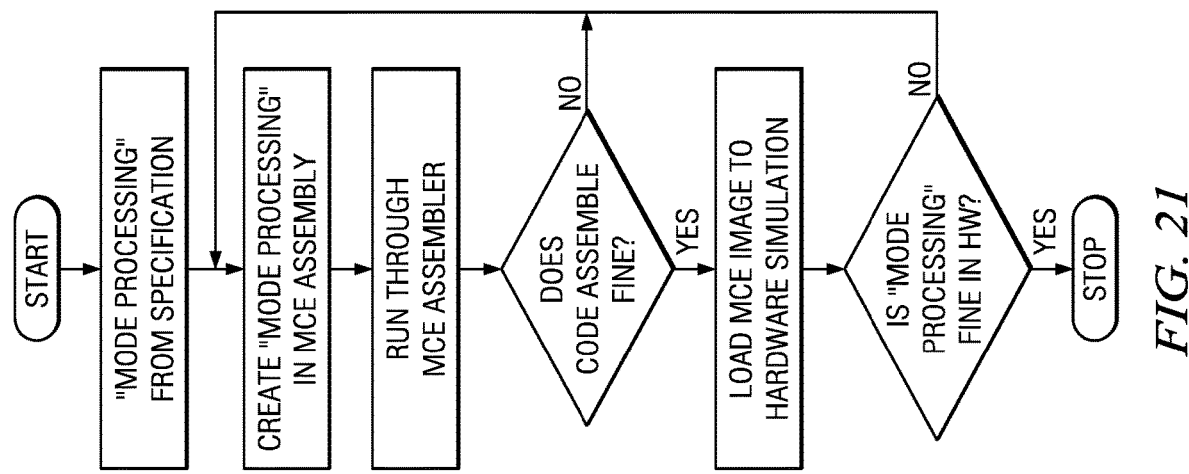
FIG. 21 is a flow diagram of a process for inventive mode processing code assembly for the FIG. 11 MCE embodiment.

Turning to FIGS. 21-22, an assembler is created to compile and assemble MCE assembly code to machine code. The assembler is written, for instance in Perl, for the MCE architecture to efficiently convert the MCE assembly code to optimized machine code.

The assembly instructions follow a specific syntax format. Each field in the instruction is separated by comma. Lines that start with # are comments and will not be processed. The decimal number at the leftmost column is shown in this example only for reference. The MCE Assembler allows user to specify one of three starting points: SOP, MOP and EOP by adding a corresponding label at the front of the starting section.

TABLE 32 Aux1, 2, 3, 4, see also TABLE 11 and FIG. 10 blocks for Context Controller and Context Update and FIG. 11 path 570, 640, 620, 660, 570. For Plaintext, see also FIG. 9, and FIG. 10 In Packer and FIG. 11 path 260, 650, 620. PROC instructions (TABLE 32, TABLE 13) call cores in FIG. 10 that return outputs, such as Ek or multH of FIG. 22, and thereafter see FIG. 10 Out Packer and FIG. 11 output delivery path 620, 670, 260.

TABLE 32

MCE ASSEMBLY CODE EXAMPLE FOR GCM

```
# Aux1[255:128] = hash key H (used in Galois multiplication)
# Aux1[127:0 ] = Len(A)||Len(C)
# Aux2        = Reg1 = AAD Additional Authenticated Data
# Aux3        = Reg2 = {IV, CTR}
# Aux4        = Reg3 -> Ek(counter0) operation
# Plaintext   = Reg0 -> loaded in every round (each round is 16-byte).
# ****  First block of input use the following operations *****
# Process counter0 using AES, store it in Aux4
1   MCE_PROC,   MISC_AESKEY_128,  CORE_AES_KEY_KEYIN,                  REG2
2   MCE_WAIT,   REG3,             SRC2_ZERO,                       SRC1_DFC
# Process the AAD and store the result in R2 (Aux3)
3   MCE_PROC,   MISC_00,          CORE_GM_KEY_AUXIN,                   REG1
4   MCE_WAIT,   REG1,             SRC2_ZERO,                       SRC1_DFC
# **** Round 2 and later use the following operations *****
5   MCE_INC,    REG2,             000,                                 REG2
6   MCE_PROC_MASK,
            MISC_AESKEY_128,  CORE_AES_KEY_KEYIN,                      REG2
7   MCE_WAIT,   REG0,             REG0,                 SRC1_DFC_XOR_SRC2
8   MCE_XOR,    REG1,             REG0,                                REG1
9   MCE_PROC,   MISC_00,          CORE_GM_KEY_AUXIN,                   REG1
10  MCE_JUMP,   01100,            IF_EOP
# Only does the following if this is NOT the last round.
11  MCE_OUTSET, REG2,             DATAOUT_DFC,                         REG0
12  MCE_WOUT,   REG1,             SRC2_ZERO,                       SRC1_DFC
# The jump instruction above goes to here if this is the last round (EOP).
13  MCE_WAIT,   REG2,             SRC2_AUX1_LOWER,      SRC1_DFC_XOR_SRC2
14  MCE_PROC,   MISC_00,          CORE_GM_KEY_AUXIN,                   REG2
15  MCE_OUTSET, REG0,             DATAOUT_DFC_XOR_WOUT_SRC2,           REG0
16  MCE_WOUT,   REG0,             REG3,                            SRC1_DFC
```

In FIG. 21, a process of creating the MCE instructions involves the following steps for example: Based on the mode and algorithm specification as input, the mode operations are converted to logical operations in MCE instruction format. The logical operations are converted into machine code using the MCE assembler, and finally simulated in hardware to verify the output.

In FIG. 22, an MCE example is described here for GCM (Galois-Counter Mode) to provide confidentiality and authentication in IPSEC. GCM involves two main functions: block cipher encryption which typically uses AES algorithm and a Galois multiplication procedure. GCM delivers two outputs: encrypted text (ciphertext) and an authentication tag. The authenticated encryption operation is shown in FIG. 22 wherein the Ek notation denotes the block cipher encryption using the key K, 'multH' denotes a Galois multiplication by the hash key H, and "incr" denotes a counter increment operation.

Implementation of the FIG. 22 GCM operation using MCE assembly code is shown below as TABLE 32. Refer to TABLE 13 for instruction description corresponding to assembly code entries of the type MCE_<Instruction Name>. The instruction line numbers in TABLE 32 are correlated to enumeration boxes marked on FIG. 22. The instruction line numbers in TABLE 32 also represent locations of 12-bit machine coded instruction in the Instruction Array of FIG. 11 that are decoded by Decode block and executed by Execute block in the FIG. 11 MCE. Regarding In the assembly code above, sixteen assembly instructions realize GCM mode. Since the operations for the first round differ from the later rounds, the offsets are specified as: start of packet (SOP) offset=0, middle of packet (MOP) and end of packet (EOP) offset=4. That means instruction number 1 (MCE_PROC) through 12 (MCE_WOUT) executes sequentially in the first round. In the second and later round, instruction number 5 (MCE_INC) through instruction number 12 (MCE_WOUT) executes sequentially. However, when instruction number 10 (MCE JUMP) is encountered and when this round is the last round, it will skip instructions 11 and 12 and jump to instruction 13 (MCE WAIT) and continue until instruction #16 (MCE_WOUT). The output of the Perl assembler is a sequence of a number of machine-code instructions in binary form and equal in number to the number of instructions listed in the assembly code like that listed above, each machine-code instruction including its opcode and its bit-fields Field2, 1, 0.

Mode Control Engine MCE of FIG. 11 provides a significant advantage in flexibility and control to program a sequence of operations through uncomplicated software. MCE can thus implement any mode that uses a cipher core inside the encryption engine. Thus, the same security accelerator is re-usable in devices with different security requirements.

Moreover, MCE (mode control engine) can add or support new cryptographic operational modes in the field by changing the micro-instructions, thereby adjusting the hardware at run-time to support new modes at high performance in native hardware.

Since the MCE instructions are devised specifically for cryptographic mode processing in this example, MCE delivers high performance and adds low or little overhead over the native cryptographic processing (AES, 3DES etc.) cores together with which cores MCE processes its mode operations. The cryptographic engine using MCE occupies much smaller area compared to hardware cores respectively dedicated for each mode and useless for the other modes.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

Aspects (See Notes Paragraph at End of this Aspects Section.)

1A. The electronic circuit claimed in claim 1 wherein said security context cache module includes a data lookup cache portion and a security context cache portion, and arbitrated port controllers coupled to said data lookup cache portion and to said security context cache portion.

1B. The electronic circuit claimed in claim 1 further comprising a security context cache module that is operable on a demand basis to fetch and later evict a respective control data structure for each security context.

1B1. The electronic circuit claimed in claim 1B further comprising an external memory coupled with said host processor, and at least one such control data structure holding a cryptographic key and a cryptographic mode indication from said external memory.

1C. The electronic circuit claimed in claim 1 wherein said control plane engine is operable to programmably organize a logical topology of data plane engines.

1C1. The electronic circuit claimed in claim 1C wherein under such topology, buffers are re-arranged into programmably-specified operational order to establish a particular process.

1C2. The electronic circuit claimed in claim 1C further comprising a multiple-buffer circuit having multiple inputs and outputs wherein the logical topology includes a selectable sequence of couplings formed in said multiple-buffer circuit for at least two of said engines.

1C3. The electronic circuit claimed in claim 1C further comprising ingress streaming interfaces and egress streaming interfaces, said ingress streaming interfaces operable so that multiple packet flows stream into said ingress streaming interfaces, and said ingress streaming interfaces are coupled to the logical topology for approximately concurrent data flow and processing that in turn supply respective output data streams to said egress streaming interfaces.

1D. The electronic circuit claimed in claim 1 wherein said subsystem is adaptive by allowing firmware controlled security header processing and hardware-driven, any-order data staging, cipher block formatting and cryptographic processing.

1E. The electronic circuit claimed in claim 1 wherein processes can be in one or in plural security contexts.

1F. The electronic circuit claimed in claim 1 further comprising a context cache, and wherein a sequence order for the processing by said engines is established by the at least one said control plane engine using information in at least the context cache.

1G. The electronic circuit claimed in claim 1 wherein said data-plane engine and said control-plane engine are together operationally scalable to provide more processing for additional data streams.

1H. The electronic circuit claimed in claim 1 wherein said data-plane engine and said control-plane engine are together operable for anti-replay protection against a replay attack.

1J. The electronic circuit claimed in claim 1 further comprising a chunking circuit operable to store at least some input packets as smaller chunks and responsive to a quality-of-service (QoS) input by switching within a packet to schedule the data chunks for processing by said data-plane engine based on the QoS input, whereby the response to the QoS input is made more swiftly effective.

1K. The electronic circuit claimed in claim 1 further comprising an external memory and a context cache, said context cache operable to fetch and evict a control data structure from and to said external memory, and wherein said data-plane engine and said control-plane engine are together operable to cryptographically process the control data structure to safeguard at least part of said control data structure in the external memory.

1L. The electronic circuit claimed in claim 1 wherein the at least one said data-plane engine has functional units, the at least one said control-plane engine further operable to configurably establish any of a plurality of different effectively-coiled sequences of and selected from said functional units and said control-plane engine.

1M. The electronic circuit claimed in claim 1 wherein said host processor has a host memory and is operable to store a key and control structure in said host memory, and the at least one said data plane engine and control plane engine are operable to access the key and control structure to encrypt and decrypt such key, provide connection-specific control flags, anti-replay windows, and firmware parameters, and establish static connection values (nonce/salt).

1N. The electronic circuit claimed in claim 1 further comprising a configuration circuit coupled with the least one said control-plane engine, and a public key accelerator module coupled to said configuration circuit, and wherein said host processor is operable to store configuration data in said configuration circuit.

1N1. The electronic circuit claimed in claim 1N further comprising a random number generator module coupled to said configuration circuit.

1P. The electronic circuit claimed in claim 1 further comprising a scheduler having inputs and outputs operable to selectively couple said engines in an operational sequence, and a block manager module coupled to said scheduler circuit.

3A. The electronic circuit claimed in claim 3 wherein hardware-driven, any-order data staging is thereby effectuated.

22A. The security context cache module claimed in claim 22 further comprising a request-fetch circuit operable to fetch at least another security context and associate each such other security context with an ingress packet, as and when requested by the host processor.

23A. The security context cache module claimed in claim 23 wherein said eviction circuit is responsive to control flags to indicate a start-of-packet, to force-evict, and to force teardown of a security context.

25A. The security context cache module claimed in claim 25 further comprising a logic circuit for setting and resetting an ownership bit for host processor control or local processor control.

27A. The streaming interface claimed in claim 27 wherein said control circuit is operable to lock a high-speed connection.

27B. The streaming interface claimed in claim 27 further comprising a scatter-gather direct memory access circuit coupled with said control circuit.

29A. The streaming interface claimed in claim 27 wherein said control logic is operable to execute tear down only after all buffered packets from the packet stream are processed.

30A. The control method claimed in claim 30 wherein the host-loading, supplying, operating, and processing involve plural contexts.

30B. The control method claimed in claim 30 wherein at least one packet in the stream of packets includes an identification of a particular cryptographic process, and the processing includes responding to the identification of the particular cryptographic process to generate a set of engine identifications ordered in a particular order to specify the processing topology, and processing the stream of packets using a set of engines in the subsystem operated in a pipeline order represented by the set of ordered engine identifications, whereby to effectuate the particular cryptographic process.

30C. The control method claimed in claim 30 further comprising storing at least some individual packets in chunks of a packet, and wherein the control data in the context includes at least one offset, and said processing includes selectively applying the offset to access different parts of the program instructions to process a chunk depending on a position in its packet from which the chunk is stored.

30D. The control method claimed in claim 30 wherein the access to the context includes loading a copy of the context from the first storage area into the subsystem.

30E. The control method claimed in claim 96 wherein the operating includes using an ownership flag to transfer ownership of the stream to the subsystem.

39A. The communication method claimed in claim 39 wherein the at least one command includes a Pass1 engine identification and a Pass2 engine identification wherein Pass1 and Pass2 can be used in any order if a same hardware engine is not used twice in the flow including a process selected from the group consisting of 1) AUTH (Pass2) 4 ENCR (Pass1), and 2) AUTH(Pass1) 4 ENCR(Pass2), and when instead a same hardware engine is used for both Encryption and Authentication then second pass uses Pass2 engine identification.

39A1. The communication method claimed in claim 39 wherein one of said engines is an air cipher engine operable for both Kasumi-authentication and Kasumi-encryption for inbound flow, and Kasumi-authentication uses Pass1 engine identification, and Kasumi-encryption uses Pass2 engine identification.

42A. The electronic buffering circuit claimed in claim 42 further comprising configuration bus, configuration registers, said configuration registers coupled with at least one of said processors.

43A. The electronic buffering circuit claimed in claim 43 further comprising a direct memory access (DMA) circuit and at least two additional buffers respectively coupling said two ingress interface circuits to said selection circuit.

43B. The electronic buffering circuit claimed in claim 43 further comprising a storage for packet information, said storage coupled with said ingress interface circuits.

Notes about Aspects above: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms including, includes, having, has, with, or variants thereof are used in the detailed description and/or the claims to denote non-exhaustive inclusion in a manner similar to the term comprising. The appended claims and their equivalents should be interpreted to cover any such embodiments, modifications, and embodiments as fall within the scope of the invention.

What is claimed is:

1. A cryptographic engine comprising:
    (a) a first ingress interface having a data input and having a first output and a second output;
    (b) a second ingress interface having a streaming data input and having a first output and a second output;
    (c) a packet header processor having an input and having an output;
    (d) scheduler circuitry having a first input coupled to the first output of the first ingress interface, having a second input coupled to the first output of the second ingress interface, having a third input, having a fourth input, having a fifth input, and having an output coupled to the packet header processor input;
    (e) first buffer circuitry having an input coupled to the second output of the first ingress interface, and having an output coupled to the third input of the scheduler circuitry;
    (f) second buffer circuitry having an input coupled to the output of the packet header processor and having an output coupled to the fourth input of the scheduler circuitry; and
    (g) third buffer circuitry having an input coupled to the second output of the second ingress interface, and having an output coupled to the fifth input of the scheduler circuitry.

2. The cryptographic engine of claim 1 including a host processor coupled to the input of the second ingress interface.

3. The cryptographic engine of claim 1 in which the first buffer circuitry is a first in first out buffer, and the second buffer circuitry is a first in first out buffer.

4. The cryptographic engine of claim 1 including an integrated circuit that includes the second ingress interface, the packet header processor, the scheduler circuitry, the first buffer circuitry, and the second buffer circuitry.

5. The cryptographic engine of claim 1 in which the first buffer circuitry is separate from the second buffer circuitry.

6. The cryptographic engine of claim 1 in which the first ingress interface is a packet accelerator Ingress CPPI Streaming Interface.

7. The cryptographic engine of claim 1 in which the second ingress interface is a CDMA Ingress CPPI Streaming Interface.

8. The cryptographic engine of claim 1 in which the packet header processor is an IPSec packet header processor.

9. The cryptographic engine of claim 1 in which the scheduler circuitry has a packet accelerator output and including a PA Egress CPPI streaming interface having an input coupled to the packet accelerator output and having a packet accelerator streaming output.

10. The cryptographic engine of claim 1 in which the scheduler circuitry has a Code Division Multiple Access (CDMA) output and including a CDMA Egress CPPI streaming interface having an input coupled to the CDMA output and having a CDMA streaming output.

11. The cryptographic engine of claim 1 in which the scheduler circuitry has a block manager interface and including a block manager coupled to the block manager interface.

12. The cryptographic engine of claim 1 in which the scheduler circuitry has a packet RAM interface and including packet RAM circuitry coupled to the packet RAM interface.

13. The cryptographic engine of claim 1 in which the packet header processor is part of a control plane.

14. The cryptographic engine of claim 1 in in which the packet header processor is an Air Cipher packet header processor.

15. The cryptographic engine of claim 1 including configuration circuitry having a configuration output and the packet header processor having an input coupled to the configuration output.

* * * * *